United States Patent
Noguchi et al.

(10) Patent No.: US 6,737,143 B2
(45) Date of Patent: May 18, 2004

(54) OPTICAL RECORDING MEDIUM, OPTICAL RECORDING METHOD AND OPTICAL RECORDING DEVICE

(75) Inventors: Soh Noguchi, Kanagawa (JP); Tsutomu Sato, Kanagawa (JP); Tatsuya Tomura, Tokyo (JP); Yasunobu Ueno, Kanagawa (JP); Ikuo Shimizu, Mie (JP); Motoharu Kinugasa, Mie (JP); Hiroshi Toyoda, Mie (JP); Shiho Yamada, Mie (JP)

(73) Assignee: Ricoh Company Ltd., Tokyo (JP)

( * ) Notice: Subject to any disclaimer, the term of this patent is extended or adjusted under 35 U.S.C. 154(b) by 0 days.

(21) Appl. No.: 10/166,742

(22) Filed: Jun. 11, 2002

(65) Prior Publication Data

US 2003/0157291 A1 Aug. 21, 2003

(30) Foreign Application Priority Data

| Jun. 14, 2001 | (JP) | 2001-180475 |
|---|---|---|
| Jun. 14, 2001 | (JP) | 2001-180538 |
| Jun. 14, 2001 | (JP) | 2001-180565 |
| Jun. 14, 2001 | (JP) | 2001-180606 |

(51) Int. Cl.$^7$ ................................................. B32B 3/00
(52) U.S. Cl. ................. 428/64.1; 428/64.8; 430/270.14
(58) Field of Search ................. 428/64.1, 64.4, 428/64.8, 913; 430/270.14, 270.16, 495.1, 945

(56) References Cited

U.S. PATENT DOCUMENTS

| 4,735,839 A | 4/1988 | Sato et al. |
|---|---|---|
| 4,737,444 A | 4/1988 | Satoh et al. |
| 4,891,305 A | 1/1990 | Oba et al. |
| 4,940,691 A | 7/1990 | Iiyama et al. |
| 5,002,812 A | 3/1991 | Umehara et al. |

(List continued on next page.)

FOREIGN PATENT DOCUMENTS

| EP | 0729139 A1 | 10/1995 |
|---|---|---|
| EP | 0837463 A1 | 10/1997 |
| EP | 0995612 | 4/2002 |

(List continued on next page.)

OTHER PUBLICATIONS

U.S. patent appl. No. 09/609,419 of Satoh et al., filed Jul. 5, 2000.

(List continued on next page.)

*Primary Examiner*—Elizabeth Mulvaney
(74) *Attorney, Agent, or Firm*—Cooper & Dunham LLP

(57) ABSTRACT

An optical recording medium having a substrate and at least a recording layer disposed on the substrate, the recording layer comprising at least one squarylium metal chelate compound which comprises a squarylium compound and a metal; and at least one azo metal chelate compound which comprises another metal and an azo compound expressed by the following formula (A-I):

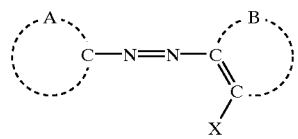

(A-I)

where A and B each independently expresses a residue forming one of a) a heterocyclic ring which may comprise a substituent and b) aromatic ring which may comprise a substituent, by combination with corresponding carbon atoms respectively bonded to A or B, and X expresses an active-hydrogen-containing substituent group. An optical recording method, and optical recording device using the same optical recording medium.

52 Claims, 3 Drawing Sheets

U.S. PATENT DOCUMENTS

| | | | |
|---|---|---|---|
| 5,028,467 A | 7/1991 | Maruyama et al. | |
| 5,085,909 A | 2/1992 | Satoh et al. | |
| 5,137,798 A | 8/1992 | Duggan et al. | |
| 5,149,819 A | 9/1992 | Satoh et al. | |
| 5,190,849 A | 3/1993 | Santoh et al. | |
| 5,256,794 A | 10/1993 | Satoh et al. | |
| 5,260,165 A | 11/1993 | Satou et al. | |
| 5,500,325 A | 3/1996 | Chapman et al. | |
| 5,510,229 A | 4/1996 | Satoh et al. | |
| 5,786,123 A | 7/1998 | Burns et al. | |
| 5,863,703 A | 1/1999 | Tomura et al. | |
| 5,939,163 A | 8/1999 | Ueno et al. | |
| 5,998,093 A | 12/1999 | Tomura et al. | |
| 6,057,020 A | 5/2000 | Ueno et al. | |
| 6,197,477 B1 | 3/2001 | Satoh et al. | |
| 6,225,022 B1 | 5/2001 | Tomura et al. | |

FOREIGN PATENT DOCUMENTS

| | | |
|---|---|---|
| JP | 57-82093 | 5/1982 |
| JP | 58-056892 | 4/1983 |
| JP | 58-112790 | 7/1983 |
| JP | 58-114989 | 7/1983 |
| JP | 59-085791 | 5/1984 |
| JP | 60-083236 | 5/1985 |
| JP | 60-089842 | 5/1985 |
| JP | 61-025886 | 2/1986 |
| JP | 61-177287 | 8/1986 |
| JP | 61-246091 | 11/1986 |
| JP | 62-039286 | 2/1987 |
| JP | 63-037991 | 2/1988 |
| JP | 01-159842 | 6/1989 |
| JP | 01-176585 | 7/1989 |
| JP | 02-042652 | 2/1990 |
| JP | 02-168446 | 6/1990 |
| JP | 03-215466 | 9/1991 |
| JP | 04-046186 | 2/1992 |
| JP | 04-113886 | 4/1992 |
| JP | 04-141489 | 5/1992 |
| JP | 04-226390 | 8/1992 |
| JP | 04-361088 | 12/1992 |
| JP | 05-001272 | 1/1993 |
| JP | 05-116456 | 5/1993 |
| JP | 05-171052 | 7/1993 |
| JP | 05-067438 | 9/1993 |
| JP | 05-279580 | 10/1993 |
| JP | 07-037272 | 2/1995 |
| JP | 07-051682 | 5/1995 |
| JP | 07-161069 | 6/1995 |
| JP | 07-268227 | 10/1995 |
| JP | 07-314897 | 12/1995 |
| JP | 08-156408 | 6/1996 |
| JP | 08-231866 | 9/1996 |
| JP | 08-295079 | 11/1996 |
| JP | 08-295811 | 11/1996 |
| JP | 08-332772 | 12/1996 |
| JP | 09-058123 | 3/1997 |
| JP | 09-095520 | 4/1997 |
| JP | 09-175031 | 7/1997 |
| JP | 09-193545 | 7/1997 |
| JP | 09-193546 | 7/1997 |
| JP | 09-267562 | 10/1997 |
| JP | 09-274732 | 10/1997 |
| JP | 09-277703 | 10/1997 |
| JP | 09-309268 | 12/1997 |
| JP | 09-323478 | 12/1997 |
| JP | 10-000856 | 1/1998 |
| JP | 10-006644 | 1/1998 |
| JP | 10-006650 | 1/1998 |
| JP | 10-006651 | 1/1998 |
| JP | 10-036693 | 2/1998 |
| JP | 10-044606 | 2/1998 |
| JP | 10-058828 | 3/1998 |
| JP | 10-083577 | 3/1998 |
| JP | 10-086517 | 4/1998 |
| JP | 10-086519 | 4/1998 |
| JP | 10-109475 | 4/1998 |
| JP | 10-109476 | 4/1998 |
| JP | 10-119434 | 5/1998 |
| JP | 10-134413 | 5/1998 |
| JP | 10-149583 | 6/1998 |
| JP | 10-149584 | 6/1998 |
| JP | 10-157293 | 6/1998 |
| JP | 10-157300 | 6/1998 |
| JP | 10-157301 | 6/1998 |
| JP | 10-157302 | 6/1998 |
| JP | 10-162430 | 6/1998 |
| JP | 10-166732 | 6/1998 |
| JP | 10-166739 | 6/1998 |
| JP | 10-181199 | 7/1998 |
| JP | 10-181201 | 7/1998 |
| JP | 10-181203 | 7/1998 |
| JP | 10-181206 | 7/1998 |
| JP | 10-188339 | 7/1998 |
| JP | 10-188340 | 7/1998 |
| JP | 10-188341 | 7/1998 |
| JP | 10-188358 | 7/1998 |
| JP | 10-208303 | 8/1998 |
| JP | 10-214423 | 8/1998 |
| JP | 10-226172 | 8/1998 |
| JP | 10-228671 | 8/1998 |
| JP | 10-244752 | 9/1998 |
| JP | 10-278426 | 10/1998 |
| JP | 10-287819 | 10/1998 |
| JP | 10-297103 | 11/1998 |
| JP | 10-309871 | 11/1998 |
| JP | 10-309872 | 11/1998 |
| JP | 10-337958 | 12/1998 |
| JP | 11-012483 | 1/1999 |
| JP | 11-034499 | 2/1999 |
| JP | 11-042858 | 2/1999 |
| JP | 11-208111 | 3/1999 |
| JP | 11-092682 | 4/1999 |
| JP | 11-165465 | 6/1999 |
| JP | 11-195242 | 7/1999 |
| JP | 11-227332 | 8/1999 |
| JP | 11-227333 | 8/1999 |
| JP | 11-250505 | 9/1999 |
| JP | 11-255774 | 9/1999 |
| JP | 11-256057 | 9/1999 |
| JP | 200159776 | 6/2000 |
| JP | 2000-168237 | 6/2000 |
| JP | 2000-190641 | 7/2000 |
| JP | 2000-190642 | 7/2000 |
| JP | 2000-198273 | 7/2000 |
| JP | 200345059 | 12/2000 |
| JP | 2001023235 | 1/2001 |
| WO | WO98/29257 | 7/1998 |

OTHER PUBLICATIONS

U.S. patent appl. No. 09/798,565 of Noguchi et al., filed Mar. 2, 2001.

U.S. patent appl. No. 09/925,425 of Tomura et al., filed Aug. 9, 2001.

"Development of DVD–Recordable", Pioneer R&D, vol. 6, No. 2 (1996).

"Fundamental Development of DVD–R dye disc", Pioneer R&D, vol. 6, No. 2 (1996).

"High density optical recording on Dye material Disc Approach for 4.7GB", ISOM/ODS'96 (1996).

OPTICAL RECORDING MEDIUM, OPTICAL RECORDING METHOD AND OPTICAL RECORDING DEVICE

BACKGROUND OF THE INVENTION

1. Field of the Invention

The present invention relates to an optical recording medium, an optical recording method, and an optical recording device, and particularly to an optical recording medium capable of recording information therein, reproducing the information thereof, and overwriting therein by exposing them to light beams, thereby causing a change in optical properties in the transmittance and reflectivity of the recording material constituting the media.

2. Description of the Related Art a. Related Art Concerning an Optical Recording Medium Having Overwritable Capability (for Information Recording):

(1) A recording medium using a cyanine dye as a recording material: disclosed in Japanese Patent Laid-Open Nos. 82093/1982, 56892/1983, 112790/1983, 114989/1983, 85791/1984, 83236/1985, 89842/1985, and 25886/1986.

(2) A recording medium using a phthalocyanine dye as a recording material: disclosed in Japanese Patent Laid-Open Nos. 150243/1986, 177287/1986, 154888/1986, 246091/1986, 39286/1987, 37991/1988, and 39888/1988.

b. Related Art Concerning Compact Disc Recordable (CD-R) Which is Overwritable:

(1) Those using the combination of a cyanine dye and a metal reflective layer as a recording material: disclosed in Japanese Patent Laid-Open Nos. 159842/1989, 42652/1990, 13656/1990, and 168446/1990.

(2) Those using a phthalocyanine dye (azaanulene dye) as a recording material: disclosed in Japanese Patent Laid-Open Nos. 176585/1989, 215466/1991, 113886/1992, 226390/1992, 1272/1993, 171052/1993, 116456/1993, 268227/1995, and 314897/1995.

(3) Those using an azo metal chelate dye as a recording material: disclosed in Japanese Patent Laid-Open Nos. 46186/1992, 141489/1992, 361088/1992, 279580/1993, 51673/1995, 161069/1995, 37272/1995, 71867/1995, 231866/1996, and 295811/1996.

c. Related Art Concerning a Digital Versatile Disc Recordable (DVD-R) Having a Large Capacity:

(1) Those using the combination of a cyanine dye and a metal reflective layer as a recording material: reported in PIONEER R&D vol. 6, No. 2 (1996), "Development of DVD-Recordable" and "Fundamental Development of DVD-R dye disc"; ISOM/ODS '96 (1996), and "High Density of Recording on Dye Material Disc Approach for 4.7G".

(2) Those using a polymethine dye as a recording material: disclosed in Japanese Patent Laid-Open Nos. 83577/1998, 119434/1998, 149583/1998, 188339/1998 and 278426/1998.

(3) Those using the combination of a polymethine dye and an optical stabilizing material as a recording material: disclosed in Japanese Patent Laid-Open No. 109475/1998, 109476/1998, 134413/1998 and 166739/1998.

(4) Those using the combination of an azo metal chelate dye and a metal reflective layer as a recording material; disclosed in Japanese Patent Publication No. 67438/1993 and Japanese Patent Laid-Open Nos. 161069/1995, 156408/1996, 231866/1996, 332772/1996, 58123/1997, 175031/1997, 193545/1998, 274732/1998, 277703/1997, 6644/1998, 6650/1998, 6651/1998, 36693/1998, 44606/1998, 58828/1998, 86519/1998, 149584/1998, 157293/1998, 157300/1998, 157301/1998, 157302/1998, 181199/1998, 181201/1998, 181203/1998, 181206/1998, 188340/1998, 188341/1998, 188358/1998, 208303/1998, 214423/1998, 228671/1998, and 12483/1999.

(5) Those using the combination of a tetraazaporphyrin (polphyrazine) dye and a metal reflective layer as a recording material: disclosed in Japanese Patent Laid-Open No. 267562/1997, 309268/1997 and 856/1998.

(6) Those using, as a recording material, the combination of a dye other than those described above and a metal reflective layer: disclosed in Japanese Patent Laid-Open Nos. 86517/1998, 93788/1998, 226172/1998, 244752/1998, 287819/1998, 297103/1998, 309871/1998, and 309872/1998.

(7) Those using, as a recording material, the combination of a cyanine dye, an azo metal chelate dye (salt forming dye) and a metal reflective layer: disclosed in Japanese Patent Publication No. 51682/1995 and Japanese Patent Laid-Open No. 34499/1999, WO98/29257, Japanese Patent Laid-Open Nos. 323478/1997, 195242/1999, 250505/1999, 168237/2000, 190641/2000, 190642/2000 and 198273/2000.

(8) Those using, as a recording material, the combination of a formazan (metal chelate) dye and a dye other than those described above: disclosed in Japanese Patent No. 2791944, Japanese Patent Laid-Open Nos. 295079/1996, 95520/1997, 193546/1997 and 337958/1998.

(9) Those using, as a recording material, the combination of a dipyrromethene (metal chelate) dye and a dye other than those described above: Japanese Patent Laid-Open Nos. 162430/1998, 166732/1998, 226172/1998, 42858/1999, 92682/1999, 165465/1998, 208111/1999, 227332/1999, 227333/1999, 255774/1999 and 256057/1999.

As described above, a number of optical recording media have been so far proposed. Now, DVD-R is under development as a next generation disc with a large capacity. To increase the recording capacity of DVD-R, development of various recording materials that can minimize the size of a recording pit, adoption of image compression techniques such as MPEG 2 and technical development to shorten the wavelength of a semiconductor laser for the recording pit reading are necessary.

An AlGaInP laser diode having a wavelength of 670 nm is the only red semiconductor laser available in the market for use in a bar code reader and a measuring instrument. With a trend toward high-density optical discs, the red semiconductor laser has been introduced into the optical storage market.

To standardize a driving system for a DVD, laser diodes having wavelengths of 630 and 670 nm are employed now for a light source. On the other hand, driving systems for a read-only DVD-ROM are put on the market, with the light sources for the driving systems having a wavelength of about 650 nm. Under such circumstances, the most preferred are DVD-R media capable of recording information therein and reading the information therefrom at wavelengths of 630 to 690 nm. A squarylium compound can be given as one example of the materials used for a recording layer of an optical recording medium which carries out recording and reading by the light pickup using a laser having a wavelength of 630 to 690 nm. The squarylium compound however is not generally suited for use in an optical recording medium because of insufficient photo stability. An azo metal chelate compound, on the other hand, can be given as one example of a dye having high light resistance. However, it involves the problem that the reflectivity is insufficient when it is used alone as a recording material.

SUMMARY OF THE INVENTION

An object of the present invention is therefore to provide a recording material for an optical recording medium suited for a DVD-R system using a semiconductor laser having an oscillation wavelength in a short wavelength region compared with the above-described conventional system, an optical recording medium showing excellent light resistance and shelf life, in particular, when it contains a squarylium compound; an optical recording method and an optical recording device each using the above-described optical recording medium.

The present inventors have carried out an extensive investigation. As a result, it has been found that an optical recording medium with high reliability, high reflectivity and low jitter can be provided by using a metal-chelated squarylium compound, thereby improving optical stability; by mixing therewith an azo metal chelate compound having high light resistance, thereby imparting the recording medium with higher light resistance and higher shelf life; and by using a metal-chelated squarylium compound, thereby improving the absorption coefficient of the recording medium, leading to the completion of the first and second optical recording media of the present invention.

It has also been found that an optical recording medium suitable for use in a next-generation optical disc system with a large capacity using a semiconductor laser having an oscillation wavelength of 690 nm or less and at the same time having excellent light resistance and shelf life is available by using, as a main component of a recording layer, a mixture of a dye obtained by metal chelating a squarylium compound and a formazan metal chelate compound, leading to the completion of the third optical recording medium of the present invention.

It has further been found that an optical recording medium suitable for use in a next-generation optical disc system with a large capacity using a semiconductor laser having an oscillation wavelength of 690 nm or less is available by using as the main component of a recording layer, a mixture of a squarylium compound and a formazan metal chelate compound, leading to the completion of the fourth optical recording medium of the present invention.

The first recording medium of the present invention is described below in <A-1>. Preferred embodiments of the first optical recording medium will be described below in <A-2> to <A-12>.

<A-1>

An optical recording medium comprising a substrate and at least a recording layer disposed on the substrate, the recording layer comprises: at least one squarylium metal chelate compound which comprises a squarylium compound and a metal; and at least one azo metal chelate compound which comprises another metal and an azo compound expressed by the following formula (A-I):

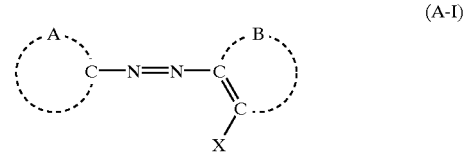

(A-I)

where A and B each independently expresses a residue forming one of a) a heterocyclic ring which may comprise a substituent and b) aromatic ring which may comprise a substituent, by combination with corresponding carbon atoms respectively bonded to A or B, and X expresses an active-hydrogen-containing substituent group.

<A-2>

The optical recording medium according to <A-1>, wherein a contained amount of the squarylium metal chelate compound and the azo metal chelate compound are at a weight ratio ranging from 90:10 to 20:80.

<A-3>

The optical recording medium according to <A-1>, wherein the metal atom of the azo metal chelate compound is at least one metal atom selected from the group consisting of manganese, cobalt, nickel and copper.

<A-4>

The optical recording medium according to <A-1>, wherein the azo metal chelate compound is ionized and forms a salt with another compound ion.

<A-5>

The optical recording medium according to <A-4>, wherein the another compound ion has an amino group.

<A-6>

The optical recording medium according to <A-1>, wherein the squarylium metal chelate compound is expressed by the following formula (A-II):

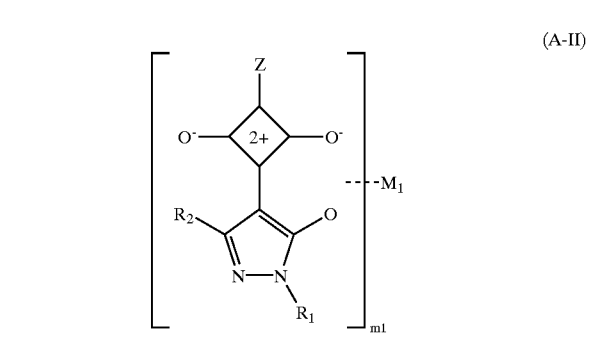

(A-II)

where, $R_1$ and $R_2$ are substituent groups which may be the same or may be different, and each expresses a hydrogen atom, an alkyl group which may have a substituent, an aralkyl group which may have a substituent, an aryl group which may have a substituent, or a heterocyclic group which may have a substituent; $M_1$ expresses a metal atom having a coordination capacity; Z expresses an aryl group which may have a substituent, a heterocyclic group which may have a substituent, or Y=CH— (Y expresses a heterocyclic group which may have a substituent); and m1 stands for an integer of 2 or 3.

<A-7>

The optical recording medium of according to <A-6>, wherein Z in the formula (A-II) is expressed by the following formula (A-II—II):

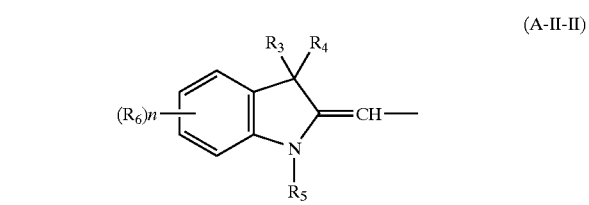

(A-II-II)

where, $R_3$ and $R_4$ may be the same or may be different and each expresses an alkyl group which may have a substituent, or $R_3$ and $R_4$ may form an alicyclic hydrocarbon ring or a heterocyclic ring by combination with adjacent carbon atoms; $R_5$ expresses a hydrogen atom, an alkyl group which may have a substituent, an aralkyl group which may have a substituent, or an aryl group which may have a substituent; $R_6$ expresses a halogen atom, an alkyl group which may have a substituent, an aralkyl group which may have a substituent, an aryl group which may have a substituent, a nitro group, a cyano group, or an alkoxy group which may have a substituent, n stands for an integer of 0 to 4, with the proviso that when n stands for 2 to 4, $R_6$ may be the same or may be different to each other and by combination with the adjacent two carbon atoms form an aromatic ring which may have a substituent.

<A-8>

The optical recording medium according to <A-6>, wherein $M_1$ expresses aluminum.

<A-9>

The optical recording medium of according to <A-1>, wherein a single layer of the recording layer has a refractive index (n) of $1.5 \leq n \leq 3.0$ a refractive index (n) of a single layer of the recording layer is $1.5 \leq n \leq 3.0$, and an extinction coefficient (k) is $0.02 \leq k \leq 0.3$ against a light having a wavelength in the range of recording or reproducing wavelength ±5 nm.

<A-10>

The optical recording medium according to <A-1>, further comprising a reflective layer containing gold, silver, copper, aluminum or an alloy thereof

<A-11>

The optical recording medium according to <A-1>, wherein a track pitch on the substrate falls within a range of 0.7 to 0.8 μm, and a groove width at a half bandwidth falls within a range of 0.18 to 0.40 μm.

<A-12>

The optical recording medium according to <A-1>, wherein the optical recording medium can be recorded at a wavelength of 600 to 720 nm.

In the embodiments <A-1> to <A-8> and <A-12>, optical information recording media capable of recording and reading by a laser light within a wavelength range of 600 nm to 720 nm, and having excellent light resistance and shelf life can be provided. In particular, the optical recording media obtained above are superior in light resistance to those using a squarylium metal chelate compound alone.

In the embodiments <A-9> to <A-11>, optical recording media, in addition to having the above-described advantages, capable of recording and reading at a stably high reflectivity and high degree of modulation can be provided.

The second optical recording medium of the present invention is described below in <B-1>. The preferred embodiments of the second optical recording medium will be described below in <B-2> to <B-10>.

<B-1>

An optical recording medium having a substrate and at least a recording layer disposed on the substrate, the recording layer comprising: at least one squarylium metal chelate compound which comprises a squarylium compound and a metal; and at least one azo metal chelate compound which comprises another metal and an azo compound expressed by the following formula (B-I):

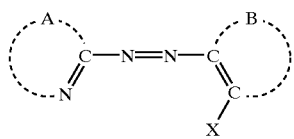

(B-I)

where A expresses a residue forming a heterocyclic ring which may have a substituent by combination with both the carbon atom and the nitrogen atom bonded to A, and B expresses a residue forming one of a) an aromatic ring which may have a substituent and b) a heterocyclic ring which may have a substituent, by combination with the two carbon atoms bonded to B, and X expresses an active-hydrogen-containing substituent group.

<B-2>

The optical recording medium according to <B-1>, wherein the squarylium metal chelate compound and the azo metal chelate compound are contained in the recording layer at a weight ratio of 90:10 to 20:80.

<B-3>

The optical recording medium according to <B-1>, wherein the metal atom of the azo metal chelate compound is at least one metal atom selected from the group consisting of manganese, cobalt, nickel and copper.

<B-4>

The optical recording medium according to <B-1>, wherein the squarylium metal chelate compound is expressed by the following formula (A-II):

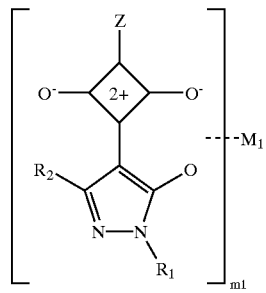

(A-II)

where, $R_1$ and $R_2$ are substituent groups which may be the same or may be different, and each expresses a hydrogen atom, an alkyl group which may have a substituent, an aralkyl group which may have a substituent, an aryl group which may have a substituent or a heterocyclic group which may have a substituent; $M_1$ expresses a metal atom having a coordination capacity; Z expresses an aryl group which may have a substituent, a heterocyclic group which may have a substituent, or Y=CH— (Y expresses a heterocyclic group which may have a substituent); and m1 stands for an integer of 2 or 3.

<B-5>

The optical recording medium of <B-3>, wherein Z in the formula (A-II) is expressed by the following formula (A-II-II):

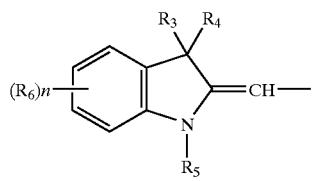

(A-II-II)

where, $R_3$ and $R_4$ may be the same or may be different and each expresses an alkyl group which may have a substituent, or $R_3$ and $R_4$ form an alicyclic hydrocarbon ring or a heterocyclic ring by combination with the adjacent carbon atoms; $R_5$ expresses a hydrogen atom, an alkyl group which may have a substituent, an aralkyl group which may have a substituent or an aryl group which may have a substituent; $R_6$ expresses a halogen atom, an alkyl group which may have a substituent, an aralkyl group which may have a substituent, an aryl group which may have a substituent, a nitro group, a cyano group, or an alkoxy group which may have a substituent, n stands for an integer of 0 to 4, with the proviso that when n stands for 2 to 4, $R_6$ may be the same or may be different to each other and form an aromatic ring which may have a substituent, by combination with the adjacent two carbon atoms.

<B-6>

The optical recording medium according to <B-3>, wherein $M_1$ expresses aluminum.

<B-7>

The optical recording medium according to <B-1>, wherein a refractive index (n) of a single layer of the recording layer is $1.5 \leq n \leq 3.0$ and an extinction coefficient (k) is $0.02 \leq k \leq 0.3$ against the light having a wavelength range of a recording or reproducing wavelength ±5 nm.

<B-8>

The optical recording medium of <B-1>, further comprising a reflective layer containing gold, silver, copper, aluminum or an alloy thereof.

<B-9>

The optical recording medium according to <B-1>, wherein a track pitch on the substrate falls within a range of 0.7 to 0.8 μm, and groove width at a half bandwidth falls within a range of 0.18 to 0.40 μm.

<B-10>

The optical recording medium according to <B-1>, wherein the optical recording medium is recordable at a wavelength of 600 to 720 nm.

In the embodiments of <B-1> to <B-6> and <B-10>, optical information recording media capable of recording and reading by a laser light within a wavelength range of 600 nm to 720 nm, and having excellent light resistance and shelf life can be provided. In particular, the optical recording media obtained above are superior in light resistance to those using a squarylium metal chelate compound alone.

In the embodiments <B-7> to <B-9>, optical recording media, in addition to having the above-described advantages, capable of recording and reading at a stably high reflectivity and high degree of modulation can be provided.

The third optical recording medium of the present invention is described below in <C-1>. The preferred embodiments of the second optical recording medium will be described below in <C-2> to <C-10>.

<C-1>

An optical recording medium comprising a substrate and at least a recording layer disposed on the substrate, the recording layer comprises: at least one squarylium metal chelate compound which comprises a squarylium compound and a metal; and at least one formazan metal chelate compound which comprises another metal and at least one of a formazan compound expressed by one of the following formulae (C-I) and (C-II):

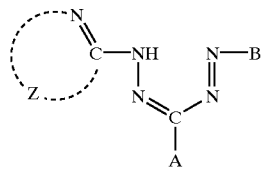

(C-I)

where, Z expresses a residue forming a 5-membered or 6-membered nitrogen-containing heterocyclic ring which may have a substituent by combination with both the carbon atom and the nitrogen atom bonded to Z, and may be condensed with another aromatic ring; A expresses an alkyl group which may have a substituent, an aryl group which may have a substituent, an alkylcarbonyl group which may have a substituent, an arylcarbonyl group which may have a substituent, an alkenyl group which may have a substituent, a heterocyclic residue which may have a substituent, or an alkoxycarbonyl group which may have a substituent; and B expresses an alkyl group which may have a substituent, an alkenyl group which may have a substituent or an aryl group which may have a substituent, (C-II)

where, $Z_1$ and $Z_2$ each expresses a residue forming a 5-membered or 6-membered nitrogen-containing heterocyclic ring which may have a substituent by combination with both the carbon atom and the nitrogen atom bonded to $Z_1$ and $Z_2$, respectively, and may be condensed with another aromatic ring; $A_1$ and $A_2$ each independently expresses an alkyl group which may have a substituent, an aryl group which may have a substituent, an alkylcarbonyl group which may have a substituent, an arylcarbonyl group which may have a substituent, an alkenyl group which may have a substituent, a heterocyclic residue which may have a substituent, or an alkoxycarbonyl group which may have a substituent; $B_1$ and $B_2$ each independently expresses an alkylene group which may have a substituent or an arylene group which may have a substituent; W expresses —$CH_2$— or —$SO_2$—; and n stands for an integer of 0 or 1.

<C-2>

The optical recording medium according to <C-1>, wherein the squarylium metal chelate compound and the formazan metal chelate compound are contained in the recording layer at a weight ratio of 90:10 to 50:50.

<C-3>

The optical recording medium according to <C-1>, wherein the metal atom of the formazan metal chelate compound is at least one metal atom selected from the group consisting of vanadium, manganese, iron, cobalt, nickel, copper, zinc and palladium, and oxides or halides thereof.

<C-4>

The optical recording medium according to <C-1>, wherein the squarylium metal chelate compound is expressed by the following formula (A-II):

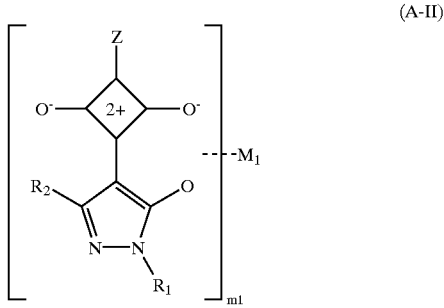

(A-II)

where, $R_1$ and $R_2$ are substituent groups which may be the same or may be different, and each expresses a hydrogen atom, an alkyl group which may have a substituent, an aralkyl group which may have a substituent, an aryl group which may have a substituent or a heterocyclic group which may have a substituent; $M_1$ expresses a metal atom having a coordination capacity; Z expresses an aryl group which may have a substituent, a heterocyclic group which may have a substituent, or Y=CH— (Y representing a heterocyclic group which may have a substituent); and m1 stands for an integer of 2 or 3.

<C-5>

The optical recording medium according to <C-4>, wherein Z in the formula (A-II) is expressed by the following formula (A-II-II):

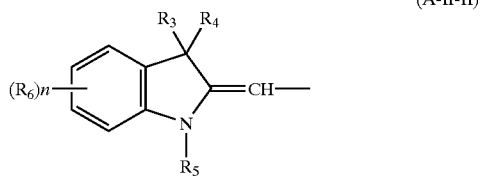

(A-II-II)

where, $R_3$ and $R_4$ may be the same or may be different and each expresses an alkyl group which may have a substituent, or $R_3$ and $R_4$ form an alicyclic hydrocarbon ring or a heterocyclic ring by combination with the adjacent carbon atoms; $R_5$ expresses a hydrogen atom, an alkyl group which may have a substituent, an aralkyl group which may have a substituent, or an aryl group which may have a substituent; $R_6$ expresses a halogen atom, an alkyl group which may have a substituent, an aralkyl group which may have a substituent, an aryl group which may have a substituent, a nitro group, a cyano group, or an alkoxy group which may have a substituent, n stands for a n integer of 0 to 4, with the proviso that when n stands for 2 to 4, $R_6$ may be the same or may be different to each other and form an aromatic ring which may have a substituent by combination with the adjacent two carbon atoms.

<C-6>

The optical recording medium according to <C-4>, wherein $M_1$ expresses aluminum.

<C-7>

The optical recording medium according to <C-1>, wherein a refractive index (n) of a single layer of the recording layer is $1.5 \leq n \leq 3.0$ and an extinction coefficient (k) is $0.02 \leq k \leq 0.3$ against the light having a wavelength range of a recording or reproducing wavelength ±5 nm.

<C-8>

The optical recording medium according to <C-1>, further comprising a reflective layer containing gold, silver, copper, aluminum, or an alloy thereof.

<C-9>

The optical recording medium according to <C-1>, wherein a track pitch on the substrate falls within a range of 0.7 to 0.8 µm, and groove width at a half bandwidth falls within a range of 0.18 to 0.40 µm.

<C-10>

The optical recording medium according to <C-1>, wherein the optical recording medium is recordable at a wavelength of 600 to 720 nm.

In the embodiments of <C-1> to <C-6> and <C-10>, optical information recording medium capable of recording and reading by a laser light within a wavelength range of 600 nm to 720 nm, and having excellent light resistance and shelf life can be provided. In particular, the optical recording media obtained above are superior in light resistance to those using a squarylium metal chelate compound alone.

In the embodiments <C-7> and <C-8>, optical recording media, in addition to having the above-described advantage, capable of recording and reading information at a stably high reflectivity and high degree of modulation can be provided.

In the embodiment <C-9>, an optical recording medium, in addition to having the above-described advantages, capable of stably recording and reading information can be provided.

The fourth optical recording medium of the present invention is described below in <D-1>. The preferred embodiments of the fourth optical recording medium will be described below in <D-2> to <D-8>.

An optical recording medium comprising a substrate and at least a recording layer disposed on the substrate, the recording layer comprises: at least one squarylium compound; and at least one formazan metal chelate compound which comprises a metal and at least one of a formazan compound expressed by one of the following formulae (D-I) and (D-II):

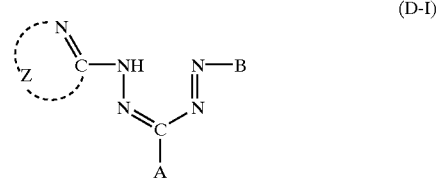

(D-I)

where, Z expresses a residue forming a 5-membered or 6-membered nitrogen-containing heterocyclic ring which may have a substituent by combination with both the carbon atom and the nitrogen atom bonded to Z, and may be condensed with another aromatic ring; A expresses an alkyl group which may have a substituent, an aryl group which may have a substituent, an alkylcarbonyl group which may have a substituent, an arylcarbonyl group which may have a substituent, an alkenyl group which may have a substituent, a heterocyclic residue which may have a substituent, or an alkoxycarbonyl group which may have a substituent; and B expresses an alkyl group which may have a substituent or aryl group which may have a substituent;

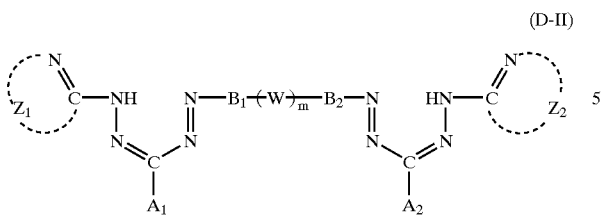

(D-II)

where, $Z_1$ and $Z_2$ each expresses a residue forming a 5-membered or 6-membered nitrogen-containing heterocyclic ring which may have a substituent by combination with both the carbon atom and the nitrogen atom bonded to $Z_1$ and $Z_2$, respectively, and may be condensed with another aromatic ring; $A_1$ and $A_2$ each independently expresses an alkyl group which may have a substituent, an aryl group which may have a substituent, an alkylcarbonyl group which may have a substituent, an arylcarbonyl group which may have a substituent, an alkenyl group which may have a substituent, a heterocyclic residue which may have a substituent, or an alkoxycarbonyl group which may have a substituent; $B_1$ and $B_2$ each independently expresses an alkylene group which may have a substituent or an arylene group which may have a substituent; W expresses —$CH_2$— or —$SO_2$—; and m stands for an integer of 0 or 1.

<D-2>

The optical recording medium according to <D-1>, wherein the squarylium compound and the formazan metal chelate compound are contained in the recording layer at a weight ratio of 90:10 to 50:50.

<D-2>

The optical recording medium according to <D-1>, wherein the metal atom of the formazan metal chelate compound is at least one selected from the group consisting of vanadium, manganese, iron, cobalt, nickel, copper, zinc and palladium, and oxides or halides thereof.

<D-3>

The optical recording medium according to <D-1>, wherein the metal atom of the formazan metal chelate compound is at least one selected from the group consisting of vanadium, manganese, iron, cobalt, nickel, copper, zinc and palladium, and oxides or halides thereof.

<D-4>

The optical recording medium according to <D-1>, wherein the squarylium compound is at least one of a compound expressed by one of the following formulae (D-III) and (D-VI):

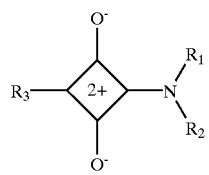

(D-III)

where, $R_1$ and $R_2$ may be the same or may be different, and each expresses a hydrogen atom, an alkyl group which may have a substituent, an aralkyl group which may have a substituent, an aryl group which may have a substituent, or a heterocyclic residue which may have a substituent, or $R_1$ and $R_2$ form a heterocyclic ring which may have a substituent by combination with the adjacent nitrogen atom; and $R_3$ is a compound expressed by one of the following formulae (D-IV) and (D-V):

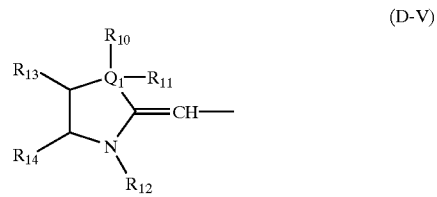

(D-IV)

where, $R_4$ and $R_5$ may be the same or may be different and each independently expresses a hydrogen atom or an alkyl group which may have a substituent, or $R_4$ and $R_5$ form a heterocyclic ring which may have a substituent by combination with the adjacent nitrogen atom; and $R_6$, $R_7$, $R_8$ and $R_9$ may be the same or may be different and each independently expresses a hydrogen atom, an alkyl group which may have a substituent, an alkoxy group which may have a substituent, a hydroxyl group or a halogen atom, a pair of $R_4$ and $R_6$ or a pair of $R_5$ and $R_7$ may form a nitrogen-containing heterocyclic ring by combination with the adjacent N—C—C, the nitrogen-containing heterocyclic ring which may have a substituent:

(D-V)

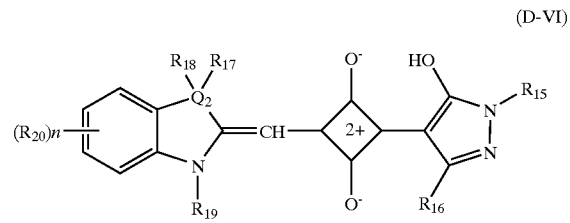

where, $Q_1$ expresses a carbon atom or a nitrogen atom, $R_{10}$ and $R_{11}$ may be the same or may be different and each independently expresses a hydrogen atom an alkyl group which may have a substituent, an aryl group which may have a substituent, an aralkyl group which may have a substituent or a hydroxyl group, with the proviso that when $Q_1$ expresses a nitrogen atom, $R_{11}$ does not exist, $R_{12}$ expresses a hydrogen atom, an alkyl group which may have a substituent, an aryl group which may have a substituent or an aralkyl group which may have a substituent; $R_{13}$ and $R_{14}$ may be the same or may be different and each independently expresses a hydrogen atom, an alkyl group which may have a substituent, an alkoxy group which may have a substituent or a halogen atom, or $R_{13}$ and $R_{14}$ may form an alicyclic hydrocarbon ring, or an aromatic ring which may have a substituent, or a heterocyclic ring which may have a substituent, by combination with the adjacent two carbon atoms;

(D-VI)

where, $Q_2$ expresses a carbon atom or a nitrogen atom, $R_{15}$ expresses a hydrogen atom, an alkyl group which may have a substituent, an aryl group which may have a substituent or a heterocyclic group which may have a substituent, $R_{16}$ expresses a hydrogen atom, a halogen atom, an alkyl group which may have a substituent, an alkoxy group which may have a substituent, an aralkyl group which may have a substituent, an aryl group which may have a substituent, an amino group which may have a substituent or a heterocyclic group which may have a substituent, $R_{17}$ and $R_{18}$ may be the same or may be different and each independently expresses an alkyl group which may have a substituent, or $R_{17}$ and $R_{18}$ may form an alicyclic hydrocarbon ring or a heterocyclic ring which may have a substituent by combination with the adjacent carbon atom, with the proviso that $Q_2$ expresses a nitrogen atom, $R_{18}$ does not exist, $R_{19}$ expresses a hydrogen atom, an alkyl group which may have a substituent, an aralkyl group which may have a substituent, or an aryl group which may have a substituent, $R_{20}$ expresses a halogen atom, an alkyl group which may have a substituent, an aralkyl group which may have a substituent, an aryl group which may have a substituent, a trifluoromethyl group, a nitro group, a cyano group, or an alkoxy group which may have a substituent, n stands for an integer of 0 to 4 with the proviso that when n stands for an integer of 2 to 4, $R_{20}$s may be the same or may be different from each other and any adjacent two $R_{20}$s may form an aromatic ring which may have a substituent by combination with the adjacent two carbon atoms.

<D-5>

The optical recording medium according to <D-1>, wherein a refractive index (n) of a single layer of the recording layer is $1.5 \leq n \leq 3.0$ and an extinction coefficient (k) is $0.02 \leq k \leq 0.3$ against the light having a wavelength range of a recording or reproducing wavelength ±5 nm.

<D-6>

The optical recording medium according to <D-1>, further comprising a reflective layer containing gold, silver, copper, or aluminum, or an alloy thereof.

<D-7>

The optical recording medium according to <D-1>, wherein a track pitch on the substrate falls within a range of 0.7 to 0.8 μm, and a groove width at a half bandwidth falls within a range of 0.18 to 0.40 μm.

In the embodiments of <D-1> to <D-4> and <D-8>, optical information recording media capable of recording and reading by a laser light within a wavelength range of 600 nm to 720 nm, and having excellent light resistance and shelf life can be provided. In particular, the optical recording media obtained above are superior in light resistance to those using a squarylium metal chelate compound alone.

In the embodiments <D-5> and <D-6>, optical recording media, in addition to having the above-described advantages, capable of recording and reading information at a stably high reflectivity and high degree of modulation can be provided.

In the embodiment <D-7>, an optical recording medium, in addition to having the above-described advantages, capable of stably recording and reading information can be provided.

The optical recording method of the present invention comprises exposing the optical recording medium of the present invention to light beams of 600 to 720 nm, thereby recording information. Accordingly, a novel optical recording method permitting exhibition of the advantages of the above-described optical recording media can be provided.

The optical recording device of the present invention comprises the optical recording medium of the present invention mounted on the substrate. Accordingly, a novel optical recording device permitting exhibition of the advantages of the above-described optical recording medium can be provided.

Figure 1:
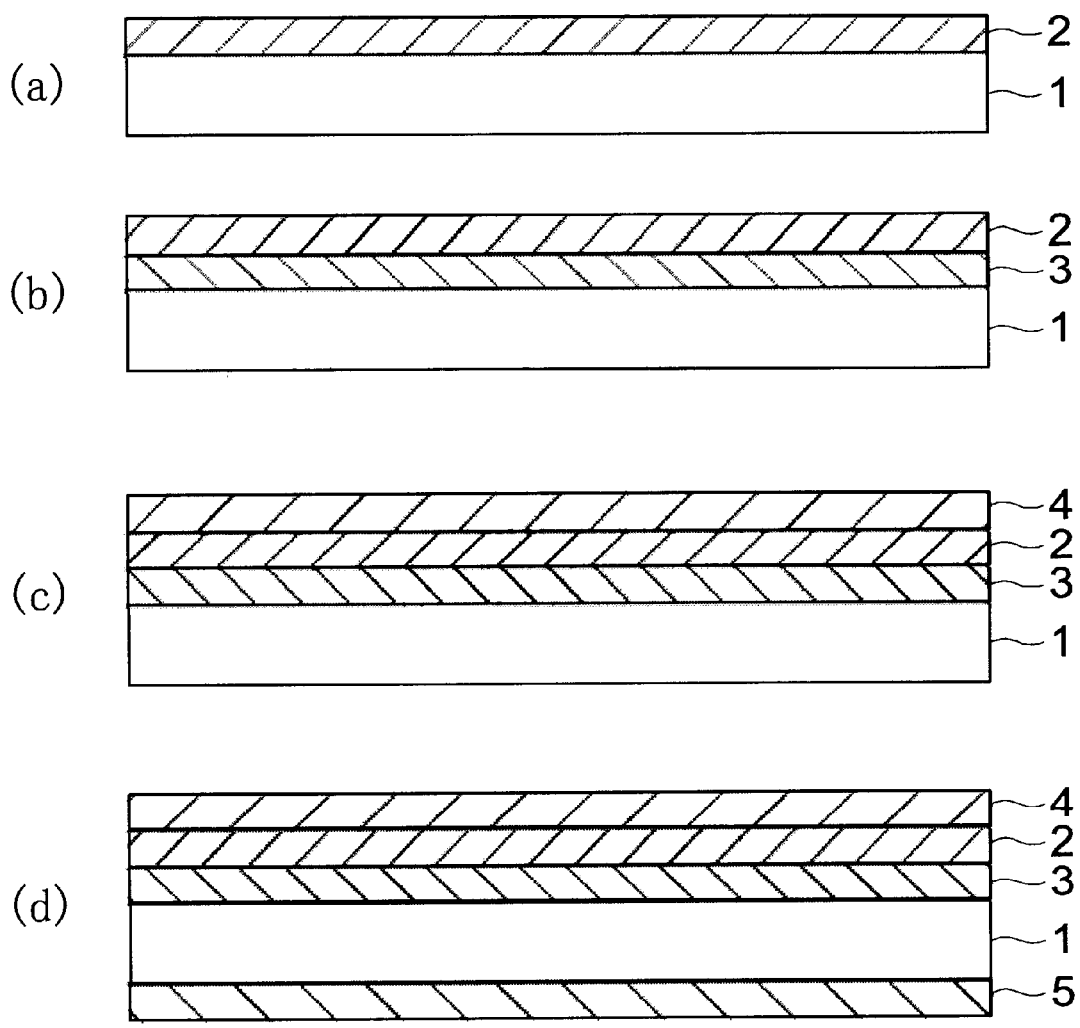
FIG. 1(a) to FIG. 1(d) are schematic cross-sectional views showing one example of the general overwritable optical recording media to which the optical recording medium of the present invention has been applied.

In the figures, numerals respectively represents the following elements.

1: substrate
2: recording layer
3: undercoat layer
4: protective layer
5: hard coat layer
6: reflective layer
7: protective layer
8: adhesive layer

DESCRIPTION OF THE PREFERRED EMBODIMENTS

The first optical recording medium of the present invention comprises a substrate and at least a recording layer disposed on the substrate, the recording layer comprising at least one squarylium metal chelate compound which comprises a squarylium compound and a metal and at least one azo metal chelate compound which comprises another metal and an azo compound expressed by the following formula (A-I):

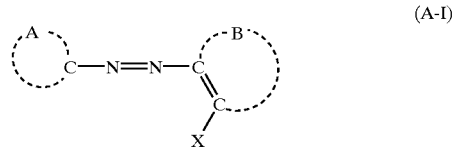

(A-I)

where A and B each independently expresses a residue forming one of a) a heterocyclic ring which may have a substituent and b) an aromatic ring which may have a substituent, by combination with corresponding carbon atoms bonded to A or B, and X represents an active-hydrogen-containing substituent group.

The above-described squarylium metal compound is preferably expressed by the following formula (A-II):

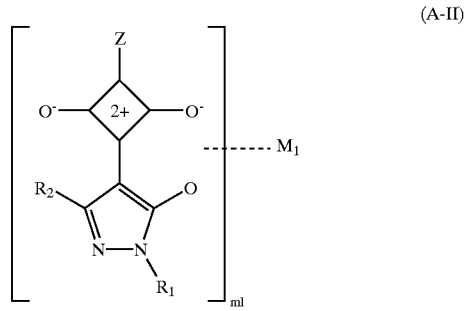

(A-II)

where, $R_1$ and $R_2$ are substituent groups which may be the same or may be different, and each expresses a hydrogen atom, an alkyl group which may have a substituent, an aralkyl group which may have a substituent, an aryl group which may have a substituent or a heterocyclic group which may have a substituent; $M_1$ expresses a metal atom having a coordination capacity; Z expresses an aryl group which may have a substituent, a heterocyclic group which may have a substituent, or Y=CH— (Y representing a heterocyclic group which may have a substituent); and m1 stands for an integer of 2 or 3.

It is preferred that Z in the formula (A-II) is expressed by the following formula (A-II—II):

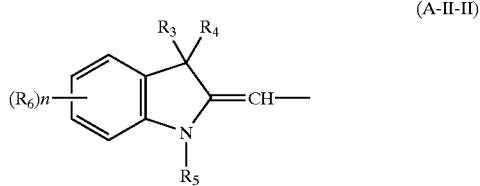

(A-II-II)

where, $R_3$ and $R_4$ may be the same or may be different and each expresses an alkyl group which may have a substituent, or $R_3$ and $R_4$ may form an alicyclic hydrocarbon ring or heterocyclic ring by combination with the adjacent carbon atoms; $R_5$ expresses a hydrogen atom, an alkyl group which may have a substituent, an aralkyl group which may have a substituent or an aryl group which may have a substituent; $R_6$ expresses a halogen atom, an alkyl group which may have a substituent, an aralkyl group which may have a substituent, an aryl group which may have a substituent, nitro group, cyano group, or an alkoxy group which may have a substituent, n stands for an integer of 0 to 4, with the proviso that when n stands for 2 to 4, $R_6$s may be the same or may be different to each other and may form an aromatic ring which may have a substituent by combination with the adjacent two carbon atoms.

The present invention will hereinafter be described more specifically. The term "compound expressed by the formula (A-I)" as used herein will be called "Compound (A-I)", which will be applied equally to a compound with another formula number. The term "azo metal chelate compound which comprises Compound (A-I) and a metal" will hereinafter be called "azo metal chelate compound (A-I)".

First, a description will be made of Compound (A-I). The definition of the substituents in the formula (A-I) are as described above.

The ion pair structure in Compound (A-I), that is, an ion which forms a pair to an azo metal chelate compound when it is a salt forming compound may be a hydrogen atom, an amino-containing compound or a counter ion of another dye such as cyanine or styryl dye. As the counter ion, if any, an amino-containing compound is particularly preferred from the viewpoint of solubility control, because in the case of another dye, cost matters and optical properties must be taken into consideration. Hydrogen atom and a counter ion of another dye are next preferred in that order.

Of the above-described cyanine dyes and styryl dyes, those having absorption in a short wavelength region than a recording or reproducing wavelength are generally preferred. Trimethinecyanine is more preferred as the cyanine dye, while an indolenine-containing dyes are preferred as the styryl dye.

When hydrogen is used as the counter ion, introduction of a soluble substituent such as a long-chain alkyl group into an azo structure is sometimes necessary. When a salt forming compound with another dye is used as the counter ion, the optical properties of the another dye have an influence on the recording layer so that optical properties of such a dye mixture cannot be forecast easily and simply. Amino-containing compounds such as alkylamine are, on the other hand, accompanied with such advantages that large degree of freedom in selection of the length of the alkyl carbon chain facilitates solubility control; and since the alkylamino group itself hardly exhibits absorption in a recording and reproducing wavelength, the optical properties of the recording layer can be controlled easily and the resulting optical recording medium is able to have improved reflectivity, degree of modulation and jitter.

Specific examples of A and B in formula (A-I) include residues capable of forming a benzene ring, a naphthalene ring, a pyridine ring, and a quinoline ring. These aromatic rings or heterocyclic rings may have a substituent. Specific examples of such a substituent for the aromatic ring or heterocyclic ring include a hydrogen atom, halogen atoms, nitro group, cyano group, hydroxyl group, carboxyl group, amino group, carbamoyl group, alkyl group which may have a substituent, aryl group which may have a substituent, residues of a heterocyclic group which may have a substituent, alkoxy group which may have a substituent, aryloxy group which may have a substituent, alkylthio group which may have a substituent, arylthio group which may have a substituent, alkylamino group which may have a substituent, arylamino group which may have a substituent, alkoxycarbonyl group which may have a substituent, aryloxycarbonyl group which may have a substituent, alkylcarboxamide group which may have a substituent, arylcarboxamide group which may have a substituent, alkylcarbamoyl group which may have a substituent, arylcarbamoyl group which may have a substituent, alkenyl group which may have a substituent, and alkylsulfamoyl group which may have a substituent.

Examples of the alkyl group include groups having $C_{1-15}$. Specific examples include straight chain alkyl group such as methyl, ethyl, n-propyl, n-butyl, n-pentyl, n-hexyl, n-heptyl, n-octyl, n-nonyl, and n-decyl; branched alkyl groups such as isobutyl, isoamyl, 2-methylbutyl, 2-methylpentyl, 3-methylpentyl, 4-methylpentyl, 2-ethylbutyl, 2-methylhexyl, 3-methylhexyl, 4-methylhexyl, 5-methylhexyl, 2-ethylpentyl, 3-ethylpentyl, 2-methylheptyl, 3-methylheptyl, 4-methylheptyl, 5-methylheptyl, 2-ethylhexyl, 3-ethylhexyl, isopropyl, sec-butyl, 1-ethylpropyl, 1-methylbutyl, 1,2-dimethylpropyl, 1-methylheptyl, 1-ethylbutyl, 1,3-dimethylbutyl, 1,2-dimethylbutyl, 1-ethyl-2-methylpropyl, 1-methylhexyl, 1-ethylheptyl, 1-propylbutyl, 1-isopropyl-2-methylpropyl, 1-ethyl-2-methylbutyl, 1-propyl-2-methylpropyl, 1-methylheptyl, 1-ethylhexyl, 1-propylpentyl, 1-isopropylpentyl, 1-isopropyl-2-methylbutyl, 1-isopropyl-3-methylbutyl, 1-methyloctyl, 1-ethylheptyl, 1-propylhexyl, 1-isobutyl-3-methylbutyl, neopentyl, tert-butyl, tert-hexyl, tert-amyl, and tert-octyl; and cycloalkyl groups such as cyclohexyl, 4-methylcyclohexyl, 4-ethylcyclohexyl, 4-tert-butylcyclohexyl, 4-(2-ethylhexyl)cyclohexyl, bornyl, isobornyl, and adamantyl. Of these, $C_{1-8}$ alkyl groups are preferred.

The above-described straight or branched alkyl groups may have a substituent such as hydroxyl group, halogen atom, nitro group, carboxyl group, cyano group, aryl group optionally having a specific substituent (for example, halogen atom or nitro group), or a residue of a heterocyclic ring. Further, they may be substituted further with the above-described alkyl groups via an oxygen atom, sulfur atom, or nitrogen atom.

Examples of the alkyl group substituted via an oxygen atom include methoxymethyl group, methoxyethyl group, ethoxymethyl group, ethoxyethyl group, butoxyethyl group, ethoxyethoxyethyl group, methoxypropyl group, and ethoxypropyl group. Examples of the alkyl group substituted via a sulfur atom include methylthioethyl group, ethylthioethyl group, and ethylthiopropyl group. Examples of the alkyl group substituted via a nitrogen atom include dimethylaminoethyl group, diethylaminoethyl group, and diethylaminopropyl group. Examples of the alkylene group include a hydrogen atom deleted alkyl group which is above-mentioned.

Examples of the aryl group include phenyl group, naphthyl group, anthryl group, fluorenyl group, phenalenyl group, phenanthranyl group, triphenylenyl group, and pyrenyl group.

These aryl groups may each be substituted by hydroxyl group, halogen atom, nitro group, carboxyl group, cyano group, aryl group which may have a specific substituent (for example, halogen atom or nitro group), or residue of a heterocyclic ring. Further, they may be substituted with the above-described alkyl group via an oxygen atom, sulfur atom or nitrogen atom.

Specific examples of the residue of the heterocyclic ring include furyl group, thienyl group, pyrrolyl group, benzofuranyl group, isobenzofuranyl group, benzothienyl group, indolinyl group, isoindolinyl group, carbazolyl group, pyridyl group, piperidyl group, quinolyl group, isoquinolyl group, oxazolyl group, isoxazolyl group, thiazolyl group, isothiazolyl group, imidazolyl group, pyrazolyl group, benzimidazolyl group, pyrazinyl group, pyrimidinyl group, pyridazinyl group, and quinoxalinyl group. Moreover, these residues of the heterocyclic ring may have a substituent such as hydroxyl group, a halogen atom, nitro group, carboxyl group, cyano group, an aryl group which may have a specific substituent (for example, halogen atom or nitro group), or a residue of a heterocyclic ring. Further, they may be substituted with the above-described alkyl group via an oxygen atom, sulfur atom, or nitrogen atom.

Specific examples of the alkenyl group include groups having $C_{2-6}$ such as vinyl group, allyl, 1-propenyl group, methacryl group, crotyl group, 1-butenyl group, 3-butenyl group, 2-pentenyl group, 4-pentenyl group, 2-hexenyl group and 5-hexenyl group. The substituents for these alkenyl group are the same with aforementioned alkyl group.

Specific examples of the halogen atom include fluorine, chlorine, bromine, and iodine.

As the alkoxy group which may have a substituent, those having an alkyl group, which may have a substituent, directly bonded to an oxygen atom may be used. Specific examples of the alkyl group and substituent are similar to those described above.

As the aryloxyl group which may have a substituent, those having an aryl group, which may have a substituent, directly bonded to an oxygen atom may be used. Specific examples of the aryl group and substituent are similar to those described above.

As the alkylthio group which may have a substituent, those having an alkyl group, which may have a substituent, directly bonded to a sulfur atom may be used. Specific examples of the alkyl group and substituent are similar to those described above.

As the arylthio group which may have a substituent, those having an aryl group, which may have a substituent, directly bonded to a sulfur atom may be used. Specific examples of the aryl group and substituent are similar to those described above.

As the alkylamino group which may have a substituent, those having an alkyl group, which may have a substituent, directly bonded to a nitrogen atom may be used. Specific examples of the alkyl group and substituent are similar to those described above. In this case, alkyl groups may be bonded each other to form a ring such as piperidino group, morpholino group, pyrrolidinyl group, piperazinyl group, indolinyl group, or isoindolinyl group.

For the arylamino group which may have a substituent, those having an aryl group, which may have a substituent, directly bonded to a nitrogen atom may be used. Specific examples of the aryl group and substituent are similar to those described above.

As the alkoxycarbonyl group which may have a substituent, those having an alkyl group, which may have a substituent, directly bonded to an oxygen atom may be used. Specific examples of the alkyl group and substituent are similar to those described above.

As the aryloxycarbonyl group which may have a substituent, those having an aryl group, which may have a substituent, directly bonded to an oxygen atom may be used. Specific examples of the aryl group and substituent are similar to those described above.

As the alkylcarboxamide group which may have a substituent, those having an alkyl group, which may have a substituent, directly bonded to a carbon atom may be used. Specific examples of the alkyl group and substituent are similar to those described above.

As the arylcarboxamide group which may have a substituent, those having an aryl group, which may have a substituent, directly bonded to a carbon atom may be used. Specific examples of the aryl group and substituent are similar to those described above.

As the alkylcarbamoyl group which may have a substituent, those having an alkyl group, which may have a substituent, directly bonded to a nitrogen atom may be used. Specific examples of the alkyl group and substituent are similar to those described above. In this case, alkyl groups may be bonded to each other to form a ring such as piperidino group, morpholino group, pyrrolidinyl group, piperazinyl group, indolinyl group, or isoindolinyl group.

As the arylcarbamoyl group which may have a substituent, those having an aryl group, which may have a substituent, directly bonded to a nitrogen atom may be used. Specific examples of the aryl group and substituent are similar to those described above.

As the alkylsulfamoyl group which may have a substituent, those having an alkyl group, which may have a substituent, directly bonded to a nitrogen atom of the sulfamoyl group may be used. Specific examples of the aryl group and substituent are similar to those described above.

Specific examples of the active-hydrogen-containing substituent expressed by X include hydroxyl group, carboxyl group, amino group, alkylcarboxamide groups, arylcarboxamide groups, alkylsulfonamide groups, arylsulfonamide groups, carbamoyl group, alkylcarbamoyl groups, arylcarbamoyl groups, sulfo group, sulfino group, sulfeno group, and sulfamoyl group.

Specific examples of the alkylcarboxamide group, arylcarboxamide group, alkylcarbamoyl group, and arylcarbamoyl group are similar to those described above.

As the alkylsulfonamide group which may have a substituent, those having an alkyl group, which may have a substituent, directly bonded to a sulfur atom may be used. Specific examples of the alkyl group and substituent are similar to those described above.

As the arylsulfonamide group which may have a substituent, those having an aryl group which may have a substituent directly bonded to the sulfur atom of the sulfonamide may be used. Specific examples of the alkyl group and substituent are similar to those described above.

As a metal atom for forming, by combination with the compound (A-I), aluminum, titanium, vanadium, chromium, manganese, iron, cobalt, nickel, copper, zinc, zirconium, niobium, molybdenum, ruthenium, rhodium, and palladium may be employed. Of these, manganese, nickel, copper, aluminum and vanadium are preferred. In particular, an azo metal chelate compound containing a metal such as manganese, cobalt, nickel, or copper exhibits excellent optical properties as an optical recording material.

The compound (A-I) of the present invention is a recording material markedly suited for providing an inexpensive optical recording medium having an excellent productivity, because the raw materials for use upon synthesis of the compound are cheap and the number of synthesizing steps is very small.

Of the squarylium metal chelate compounds, Compound (A-II) is preferred. A description will next be made of Compound (A-II).

In the definition of the substituents cited in formulas (A-II) or (A-II—II), examples of the alkyl group or the alkyl moiety of the alkoxy group include straight or branched $C_{1-6}$ alkyl groups and cyclic $C_{3-8}$ alkyl groups.

Specific examples include methyl, ethyl, propyl, isopropyl, butyl, iso-butyl, sec-butyl, tert-butyl, pentyl, isopentyl, 1-methylbutyl, 2-methylbutyl, tert-pentyl, hexyl, cyclopropyl, cyclobutyl, cyclopentyl, cyclohexyl, cycloheptyl, and cyclooctyl.

Examples of the aralkyl group include $C_{7-15}$ aralkyl groups such as benzyl, phenethyl, phenylpropyl and naphthylmethyl.

Examples of the aryl group include phenyl, naphthyl, anthryl and azulenyl.

Examples of the halogen atom include chlorine, bromine, fluorine and iodine.

The substituents for the aralkyl group, aryl group, alkoxy group, aromatic ring or heterocyclic group may be the same or may be different. Examples include $C_{1-5}$ substituents such as hydroxyl group, carboxyl group, halogen atoms, alkyl groups, alkoxy groups, nitro group, a trifluoromethyl group, and amino group which may have a substituent. The halogen atoms, alkyl groups and alkoxy groups are similar to those described above, respectively.

The alkyl group may be substituted by 1 to 3 substituents which may be the same or may be different. Examples include hydroxyl group, carboxyl group, halogen atoms and alkoxy groups. The halogen atoms and alkoxy groups are similar to those described above, respectively.

The amino group may be substituted by 1 to 2 alkyl groups which may be the same or may be different. The alkyl groups usable here are similar to those described above.

Examples of the metal atom ($M_1$) having a coordination capacity include aluminum, zinc, copper, iron, nickel, chromium, cobalt, manganese, iridium, vanadium and titanium, of which aluminum, copper, nickel and cobalt are preferred, with aluminum being more preferred.

As for the aromatic ring formed by two adjacent $R_6$s combined with two carbon atoms adjacent thereto, a benzene ring may be mentioned as an example.

Examples of the heterocyclic ring in the heterocyclic group which may have a substituent and is expressed by Y in the formula (A-II), or the heterocyclic ring in the formula (A-II-II) formed by $R_3$ and $R_4$ combined with an adjacent carbon atom include 5- or 6-membered monocyclic aromatic or aliphatic heterocyclic rings containing at least one atom selected from a nitrogen atom, an oxygen atom, and a sulfur atom; and 3- to 8-membered-ring-condensed, bicyclic or tricyclic, aromatic or aliphatic heterocyclic rings containing at least one atom selected from a nitrogen atom, an oxygen atom, and a sulfur atom. Specific examples include pyridine ring, pyrazine ring, pyrimidine ring, pyridazine ring, quinoline ring, isoquinoline ring, phthalazine ring, quinazoline ring, quinoxaline ring, naphthyridine ring, cinnoline ring, pyrrole ring, pyrazole ring, imidazole ring, triazole ring, tetrazole ring, thiophene ring, furan ring, thiazole ring, oxazole ring, indole ring, isoindole ring, indazole ring, benzimidazole ring, benzotriazole ring, benzothiazole ring, benzoxazole ring, purine ring, carbazole ring, pyrrolidine ring, piperidine ring, piperazine ring, morpholine ring, thiomorpholine ring, homopiperidine ring, homopiperazine ring, tetrahydropyridine ring, tetrahydroquinoline ring, tetrahydroisoquinoline ring, tetrahydrofurane ring, tetrahydropyrane ring, dihydrobenzofurane and tetrahydrocarbazole ring.

Examples of the heterocyclic group expressed by Y in the formula (A-II) include indolin-2-ylidene, benz[e]indolin-2-ylidene, 2-benzothiazolinylidene, naphtho[2,1-d]thiazol-2(3H)-ylidene, naphtho[1,2-d]thiazol-2(1H)-ylidene, 1,4-dihydroquinolin-4-ylidene, 1,2-dihydroquinolin-2-ylidene, and 2-benzoselenazolinylidene.

Examples of the alicyclic hydrocarbon ring formed by $R_3$ and $R_4$ combined with the adjacent carbon atom include $C_{3-8}$ rings which may be saturated or unsaturated, more specifically, cyclopropane ring, cyclobutane ring, cyclopentane ring, cyclohexane ring, cycloheptane ring, cyclooctane ring, cyclopentene ring, 1,3-cyclopentaadiene ring, cyclohexene ring, and cyclohexadiene ring.

An ordinarily employed process for preparing Compound (A-II) will next be described.

[Chemical formula 7]

Reaction scheme (1-a):

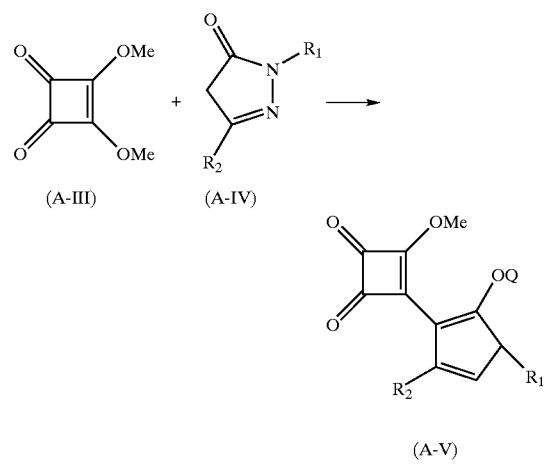

(A-III)      (A-IV)

(A-V)

[Chemical formula 8]

Reaction scheme (1-b):
[Chemical formula 8]

Compound (A-V) ⟶

-continued

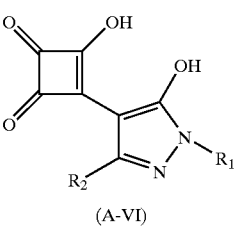

(A-VI)

Reaction scheme (1-c):
[Chemical formula 9]

[Chemical Formula 9]

Compound (A-VI) + Z—H ⟶

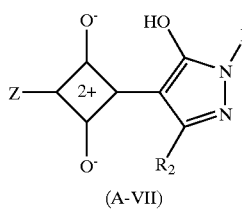

(A-VII)

[Chemical Formula 10]

Reaction scheme (1-d):
[Chemical formula 10]

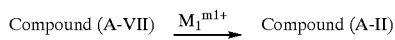

In the above-described reaction schemes, $R_1$, $R_2$, Z, $M_1$ and m1 have the same meanings as described above, Q expresses hydrogen, potassium or sodium, and Me expresses methyl.

In the reaction scheme (1-a), Compound (A-V) is available by reacting Compound (A-III) with 0.5 to 2 times the mole of Compound (A-IV), in the presence of a base if necessary, in a solvent at room temperature to 40° C. for 30 minutes to 15 hours.

Examples of the base include inorganic bases such as potassium carbonate, sodium carbonate and potassium hydroxide and organic bases such as triethylamine and sodium methoxide. As the solvent, methanol, ethanol and dimethylformamide may be used.

In the above-described reaction scheme (1-b), Compound (A-VI) is available by treating Compound (A-V) in an alkaline solvent or an acid solvent at room temperature to 40° C. for 30 minutes to 15 hours.

Examples of the alkaline solvent usable here include aqueous solution of potassium carbonate, aqueous solution of sodium carbonate, and aqueous solution of potassium hydroxide, while those of the acid solvent include a 50% vol/vol dimethyl sulfoxide solution of hydrochloric acid and a 50% vol/vol dimethylformamide solution of hydrochloric acid.

In the reaction scheme (1-c), Compound (A-VII) is available by reacting Compound (A-VI) with 0.5 to 2 times the mole of Z-H in the presence of 0.5 to 2 times the mole of a base if necessary, in a solvent, at 80 to 120° C. for 1 to 15 hours.

Examples of the solvent include $C_{2-8}$ alcohol solvents such as ethanol, propanol, isopropanol, butanol and octanol and mixed solvents of any one of these alcohol solvents with benzene, toluene or xylene (containing at least 50 vol/vol % of the alcohol). Examples of the base include organic bases such as quinoline, triethylamine and pyridine and inorganic bases such as potassium carbonate, potassium bicarbonate and sodium bicarbonate.

In the above-described reaction scheme (1-d), Compound (A-II) is available by reacting Compound (A-VII) with 0.5 to 2 times the mole of $M_1^{m1+}$ in the presence of 0.5 to 2 times the mole of acetic acid if necessary, in a solvent at room temperature to 120° C. for 1 to 15 hours.

Examples of the material for providing $M_1^{m1+}$ include aluminum trisacetylacetonate, aluminum trisethylacetoacetate, aluminum isopropoxide, aluminum sec-butoxide, aluminum ethoxide, aluminum chloride, copper chloride, copper acetate and nickel acetate.

Example of the solvent include halogen solvents such as chloroform and dichloromethane, aromatic solvents such as toluene and xylene, ether solvents such as tetrahydrofuran and methyl-tert-butyl ether and ester solvents such as ethyl acetate.

The optical recording medium of the present invention is characterized in that it has, in its recording layer, at least one azo metal chelate compound (A-I) and at least one squarylium metal chelate compound. Incorporation of the azo metal chelate compound (A-I) in the squarylium metal chelate compound suppresses photo deterioration of the squarylium metal chelate compound, making it possible to obtain an optical recording medium excellent in light resistance.

In the optical recording medium of the present invention, the weight ratio of the squarylium metal chelate compound to the azo metal chelate compound (A-I) preferably falls within a range of 90:10 to 20:80, with 80:20 to 30:70 being more preferred. At weight ratios within the above-described range, the resulting optical recording medium has desirable light resistance, reflectivity and degree of modulation.

Specific examples of the azo metal chelate compound (A-I) to be used in the first optical recording medium of the present invention are shown below in Tables 1 to 3. In Tables, Me, $Et_3BU$ and t-Bu represent methyl, ethyl, n-butyl and tert-butyl.

TABLE 1

| Compound | Azo Compound | Counterion | Coordinated metal: $M_2$ |
|---|---|---|---|
| I-1 | 4-Cl, 2-OH-phenyl—N=N—2-OH, 4-N(Et)₂-phenyl | — | Co |
| I-2 | 4-NO₂, 2-OH-phenyl—N=N—2-OH, 4-N(Et)₂-phenyl | $N^+H(CH_3)_3$ | Co |
| I-3 | 4-NO₂, 2-OH-phenyl—N=N—2-OH, 4-N(Me)₂-phenyl | $N^+H_2(CH_3)_2$ | Co |
| I-4 | 4-NO₂, 2-OH-phenyl—N=N—2-OH, 4-N(Bu)₂-phenyl | $CH_3(CH_2)_3N^+H(CH_3)_2$ | Co |
| I-5 | 4-CH₃, 2-OH-phenyl—N=N—2-OH, 4-N(Et)₂-phenyl | — | Mn |
| I-6 | 4-Cl, 2-OH-phenyl—N=N—1-(2-OH-naphthyl) | — | Ni |
| I-7 | 4-Br, 2-OH-phenyl—N=N—2-OH, 4-N(Et)₂-phenyl | — | Ni |
| I-8 | 4-Cl, 2-OH-phenyl—N=N—2-OH, 4-N(Me)₂-phenyl | $(CH_3)_2N^+(CH_2)_6NH(CH_3)_2$ | VO |

TABLE 2

| Compound | Azo Compound | Counterion | Coordinated metal: $M_2$ |
|---|---|---|---|
| I-9 | 4-$NO_2$-2-OH-C$_6$H$_3$-N=N-2-OH-4-N(Et)$_2$-C$_6$H$_3$ | $CH_3(CH_2)_5N^+H(CH_3)_2$ | Co |
| I-10 | 7-Cl-quinolin-8-yl-N=N-2-OH-4-N(Et)$_2$-C$_6$H$_3$ | $CH_3(CH_2)_7N^+H(CH_3)_2$ | Co |
| I-11 | 4-tBu-2-OH-C$_6$H$_3$-N=N-2-OH-4-N(Bu)$_2$-C$_6$H$_3$ | $H^+$ | Co |
| I-12 | 4-Cl-2-OH-C$_6$H$_3$-N=N-(3-OH-2-CONHPh-naphth-1-yl) | $(CH_3)_2N(CH_2)_4N^+H(CH_3)_2$ | Co |
| I-13 | 4-Cl-2-COOH-C$_6$H$_3$-N=N-(2-OH-naphth-1-yl) | N-methylpyridinium | Al |
| I-14 | 4-$NO_2$-2-OH-C$_6$H$_3$-N=N-2-OH-4-N(Bu)$_2$-C$_6$H$_3$ | N-butylpyridinium | Co |
| I-15 | (2-OH-naphth-1-yl)-N=N-2-OH-4-N(Et)$_2$-C$_6$H$_3$ | — | Cu |

TABLE 3

| Compound | Azo Compound | Counterion | Coordinated metal: $M_2$ |
|---|---|---|---|
| I-16 | [structure: NO₂-substituted phenyl-N=N-phenyl with OH, HO, and N(Et)₂ groups] | $N^+H(CH_3)_3$ | Co |
| I-17 | [structure: Cl-substituted phenyl-N=N-phenyl with OH, HO, and N(Et)₂ groups] | [structure: indolium with CH=CH-phenyl-N(Me)₂, N-CH₃, gem-dimethyl] | Co |
| I-18 | [structure: NO₂-substituted phenyl-N=N-phenyl with OH, HO, and N(Me)₂ groups] | [structure: indolium-CH=CH-CH=benzindoline, both N-CH₃, gem-dimethyl] | Cu |

In the below-described Tables 4 to 6, shown are specific examples of the squarylium metal chelate compound to be used in the first optical recording medium of the present invention. In tables, II-16 is a squarylium compound of Comparative Example. In tables, Me, Et, nPr, iPr, Bu, nBu and tBu represent methyl, ethyl, n-propyl, isopropyl, butyl, n-butyl, tert-butyl groups, respectively.

TABLE 4

| Compound | Squarylium compound | ml | Coordinated metal: $M_1$ |
|---|---|---|---|
| II-1 | [structure: indoline-CH=squarylium(2+)-pyrazole with NH, CH₃] | 3 | Al |
| II-2 | [structure: indoline-CH=squarylium(2+)-pyrazole with N-phenyl, iPr] | 3 | Al |
| II-3 | [structure: H₃C-substituted indoline-CH=squarylium(2+)-pyrazole with N-CH₃, nPr] | 3 | Al |

TABLE 4-continued

| Compound | Squarylium compound | ml | Coordinated metal: $M_1$ |
|---|---|---|---|
| II-4 | (structure) | 3 | Al |
| II-5 | (structure) | 3 | Al |
| II-6 | (structure) | 3 | Al |

TABLE 5

| Compound | Squarylium compound | ml | Coordinated metal: $M_1$ |
|---|---|---|---|
| II-7 | (structure) | 2 | Ni |
| II-8 | (structure) | 3 | Co |
| II-9 | (structure) | 3 | Al |

TABLE 5-continued

| Compound | Squarylium compound | ml | Coordinated metal: $M_1$ |
|---|---|---|---|
| II-10 | 5-Cl, 1,3,3-trimethylindoline=CH—(squarylium 2+, O⁻, O⁻)—pyrazole (N-tBu, 3-CH₃) | 2 | Cu |
| II-11 | 1,1,3-trimethyl-benz[e]indoline=CH—(squarylium)—pyrazole (N-(4-CF₃-phenyl), 3-nPr) | 3 | Al |
| II-12 | 1,3,3-trimethylindoline=CH—(squarylium)—pyrazole (N-nPr, 3-CH₃) | 3 | Al |

TABLE 6

| Compound | Squarylium compound | ml | Coordinated metal: $M_1$ |
|---|---|---|---|
| II-13 | 1,3,3-trimethylindoline=CH—(squarylium)—pyrazole (N-(4-OCH₃-phenyl), 3-nPr) | 3 | Al |
| II-14 | 5-Cl, 1,3,3-trimethylindoline=CH—(squarylium)—pyrazole (N-phenyl, 3-iPr) | 3 | Al |
| II-15 | 5-Br, 1,3,3-trimethylindoline=CH—(squarylium)—pyrazole (N-phenyl, 3-Et) | 3 | Al |

TABLE 6-continued

| Compound | Squarylium compound | ml | Coordinated metal: $M_1$ |
|---|---|---|---|
| II-16 | | 1 | なし |
| II-17 | | 3 | Al |
| II-18 | | 2 | Cu |

The second optical recording medium of the present invention has a substrate and at least a recording layer disposed on the substrate, the recording layer comprises at least one squarylium metal chelate compound which comprises a squarylium compound and a metal and an azo metal chelate compound which comprises another metal and an azo compound expressed by the following formula (B-I):

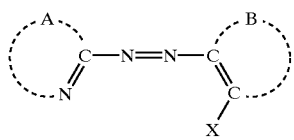
(B-I)

where A expresses a residue forming a heterocyclic ring which may have a substituent by combination with both the carbon atom and the nitrogen atom bonded to A, and B expresses a residue forming one of a) an aromatic ring which may have a substituent and b) a heterocyclic ring which may have a substituent, by combination with the two carbon atoms bonded to B, and X expresses an active-hydrogen-containing substituent group.

The present invention will hereinafter be described more specifically. The term "compound expressed by the formula (B-I)" as used herein will be called "Compound (B-I)", which will be applied equally to compounds with another formula number. The term "azo metal chelate compound which comprises Compound (B-I) and another metal" will hereinafter be called "azo metal chelate compound (B-I)".

First, a description will be made of Compound (B-I). The definition of the substituents in the formula (B-I) are as described above.

Specific examples of A in the formula (B-I) include residues for forming a thiazole ring, benzothiazole ring, imidazole ring, benzimidazole ring, thiadiazole ring, oxazole ring, benzoxazole ring, triazole ring, pyrazole ring, oxadiazole ring, pyridine ring, pyridazine ring, pyrimidine ring, pyrazine ring, triazine ring and quinoline ring. These nitrogen-containing heterocyclic rings may have a substituent.

Specific examples of the substituent for these nitrogen-containing heterocyclic rings include a hydrogen atom, halogen atoms, nitro group, cyano group, hydroxyl group, carboxyl group, amino group, carbamoyl group, alkyl groups which may have a substituent, aryl groups which may have a substituent, residues of a heterocyclic group which may have a substituent, alkoxy groups which may have a substituent, aryloxy groups which may have a substituent, alkylthio groups which may have a substituent, arylthio groups which may have a substituent, alkylamino groups which may have a substituent, arylamino groups which may have a substituent, alkoxycarbonyl groups which may have a substituent, aryloxycarbonyl groups which may have a substituent, alkylcarboxamide groups which may have a substituent, arylcarboxamide groups which may have a substituent, alkylsulfonamide groups which may have a substituent, alkylcarbamoyl groups which may have a substituent, arylcarbamoyl groups which may have a substituent, alkenyl groups which may have a substituent, and alkylsulfamoyl groups which may have a substituent.

As the alkyl group, $C_{1-15}$ alkyl groups can be given as examples. Specific examples include straight chain alkyl groups such as methyl, ethyl, n-propyl, n-butyl, n-pentyl, n-hexyl, n-heptyl, n-octyl, n-nonyl, and n-decyl group; branched alkyl groups such as isobutyl, isoamyl, 2-methylbutyl, 2-methylpentyl, 3-methylpentyl, 4-methylpentyl, 2-ethylbutyl, 2-methylhexyl, 3-methylhexyl, 4-methylhexyl, 5-methylhexyl, 2-ethylpentyl, 3-ethylpentyl, 2-methylheptyl, 3-methylheptyl, 4-methylheptyl, 5-methylheptyl, 2-ethylhexyl, 3-ethylhexyl, isopropyl, sec-butyl, 1-ethylpropyl, 1-methylbutyl, 1,2-dimethylpropyl, 1-methylheptyl, 1-ethylbutyl, 1,3-dimethylbutyl, 1,2-dimethylbutyl, 1-ethyl-2-methylpropyl, 1-methylhexyl, 1-ethylheptyl, 1-propylbutyl, 1-isopropyl-2-methylpropyl, 1-ethyl-2-methylbutyl, 1-propyl-2-methylpropyl, 1-methylheptyl, 1-ethylhexyl, 1-propylpentyl, 1-isopropylpentyl, 1-isopropyl-2-methylbutyl, 1-isopropyl-3-methylbutyl, 1-methyloctyl, 1-ethylheptyl, 1-propylhexyl, 1-isobutyl-3-methylbutyl, neopentyl, tert-butyl, tert-hexyl, tert-amyl, and tert-octyl; and cycloalkyl groups such as cyclohexyl, 4-methylcyclohexyl, 4-ethylcyclohexyl, 4-tert-butylcyclohexyl, 4-(2-ethylhexyl)cyclohexyl, bornyl, isobornyl, and adamantyl. Of these, $C_{1-8}$ alkyl groups are preferred.

These straight or branched alkyl groups may have a substituent such as hydroxyl group, a halogen atom, nitro group, carboxyl group, cyano group, an aryl group which may have a specific substituent (for example, a halogen atom or nitro group), or a residue of a heterocyclic ring. Further, they may be substituted by the above-described alkyl or aryl group via an oxygen atom, sulfur atom, or nitrogen atom.

Examples of the alkyl group substituted via an oxygen atom include methoxymethyl group, methoxyethyl group, ethoxymethyl group, ethoxyethyl group, butoxyethyl group, ethoxyethoxyethyl group, methoxypropyl group, and ethoxypropyl group. Examples of the alkyl group substituted via a sulfur atom include methylthioethyl group, ethylthioethyl group, and ethylthiopropyl group. Examples of the alkyl group substituted via a nitrogen atom include dimethylaminoethyl group, diethylaminoethyl group, and diethylaminopropyl group.

Examples of the aryl group include phenyl group, naphthyl group, anthryl group, fluorenyl group, phenalenyl group, phenanthranyl group, triphenylenyl group, and pyrenyl group. These aryl groups may each be substituted by an alkyl group, hydroxyl group, a halogen atom, nitro group, carboxyl group, cyano group, an aryl group which may have a specific substituent (for example, a halogen atom or nitro group), or a residue of a heterocyclic ring. Further, they may be substituted by the above-described alkyl group via an oxygen atom, sulfur atom or nitrogen atom.

Specific examples of the residue of a heterocyclic ring include furyl group, thienyl group, pyrrolyl group, benzofuryl group, isobenzofuranyl group, benzothienyl group, indolinyl group, isoindolinyl group, carbazolyl group, pyridyl group, piperidyl group, quinolyl group, isoquinolyl group, oxazolyl group, isoxazolyl group, thiazolyl group, isothiazolyl group, imidazolyl group, pyrazolyl group, benzimidazolyl group, pyrazinyl group, pyrimidinyl group, pyridazinyl group, and quinoxalinyl group. These residues of the heterocyclic ring may be substituted by hydroxyl group, a halogen atom, nitro group, carboxyl group, cyano group, an aryl group which may have a specific substituent (for example, a halogen atom or nitro group), or a residue of a heterocyclic ring. Further, they may be substituted with the above-described alkyl group via an oxygen atom, sulfur atom, or nitrogen atom.

Specific examples of the halogen atom include fluorine, chlorine, bromine and iodine atoms.

As the alkoxy group which may have a substituent, those having an alkyl group, which may have a substituent, directly bonded to an oxygen atom may be used. Specific examples of the alkyl group and substituent are similar to those described above.

As the aryloxyl group which may have a substituent, those having an aryl group, which may have a substituent, directly bonded to an oxygen atom may be used. Specific examples of the aryl group and substituent are similar to those described above.

As the alkylthio group which may have a substituent, those having an alkyl group, which may have a substituent, directly bonded to a sulfur atom may be used. Specific examples of the alkyl group and substituent are similar to those described above.

As the arylthio group which may have a substituent, those having an aryl group, which may have a substituent, directly bonded to a sulfur atom may be used. Specific examples of the aryl group and substituent are similar to those described above.

As the alkylamino group which may have a substituent, those having an alkyl group, which may have a substituent, directly bonded to a nitrogen atom may be used. Specific examples of the alkyl group and substituent are similar to those described above. In this case, alkyl groups may be bonded each other to form a ring such as piperidino group, morpholino group, pyrrolidinyl group, piperazinyl group, indolinyl group, or isoindolinyl group.

As the arylamino group which may have a substituent, those having an aryl group, which may have a substituent, directly bonded to a nitrogen atom may be used. Specific examples of the aryl group and substituent are similar to those described above.

As the alkoxycarbonyl group which may have a substituent, those having an alkyl group, which may have a substituent, directly bonded to an oxygen atom may be used. Specific examples of the alkyl group and substituent are similar to those described above.

As the aryloxycarbonyl group which may have a substituent, those having an aryl group, which may have a substituent, directly bonded to an oxygen atom may be used. Specific examples of the aryl group and substituent are similar to those described above.

As the alkylcarboxamide group which may have a substituent, those having an alkyl group, which may have a substituent, directly bonded to a carbon atom may be used. Specific examples of the alkyl group and substituent are similar to those described above.

As the arylcarboxamide group which may have a substituent, those having an aryl group, which may have a substituent, directly bonded to a carbon atom may be used. Specific examples of the aryl group and substituent are similar to those described above.

As the alkylsulfonamide group which may have a substituent, those having an alkyl group, which may have a substituent, directly bonded to a carbon atom may be used. Specific examples of the alkyl group and substituent are similar to those described above.

As the alkylcarbamoyl group which may have a substituent, those having an alkyl group, which may have a substituent, directly bonded to a nitrogen atom may be used. Specific examples of the alkyl group and substituent are similar to those described above. In this case, alkyl groups may be bonded each other to form a ring such as piperidino group, morpholino group, pyrrolidinyl group, piperazinyl group, indolinyl group, or isoindolinyl group.

As the arylcarbamoyl group which may have a substituent, those having an aryl group, which may have a substituent, directly bonded to a nitrogen atom may be used. Specific examples of the aryl group and substituent are similar to those described above.

As the alkylsulfamoyl group which may have a substituent, those having an alkyl group, which may have a substituent, directly bonded to the nitrogen atom of the sulfamoyl group may be used. Specific examples of the aryl group and substituent are similar to those described above.

Specific examples of the alkenyl group include $C_{2-6}$ ones such as vinyl, allyl, 1-propenyl, methacryl, crotyl, 1-butenyl, 3-butenyl, 2-pentenyl, 4-pentenyl, 2-hexenyl and 5-hexenyl. As the substituent for these alkenyl groups, those described as the substituents for the alkyl group may be used.

Specific examples of B include residues for forming a benzene ring, naphthalene ring, pyridine ring or quinoline ring. These aromatic or heterocyclic rings may have a substituent. Specific examples of the substituent are similar to those described above as the substituents for A.

Specific examples of the active-hydrogen-containing substituent group expressed by X include hydroxyl group, carboxyl group, amino group, alkylcarboxamide groups, arylcarboxamide groups, alkylsulfonamide groups, arylsulfonamide groups, carbamoyl group, alkylcarbamoyl groups, arylcarbamoyl groups, sulfo group, sulfino group, sulfeno group, and sulfamoyl group, and the like.

Specific examples of the alkylcarboxamide groups, arylcarboxamide groups, alkylcarbamoyl groups, and arylcarbamoyl groups are similar to those described above.

As the alkylsulfonamide group which may have a substituent, those having an alkyl group, which may have a substituent, directly bonded to a sulfur atom may be used. Specific examples of the alkyl group and substituent are similar to those described above.

As the arylsulfonamide group which may have a substituent, those having an aryl group, which may have a substituent, directly bonded to a sulfur atom may be used. Specific examples of the alkyl group and substituent are similar to those described above.

As a metal atom for forming, by combination with the compound (B-I), an azo metal chelate compound, aluminum, titanium, vanadium, chromium, manganese, iron, cobalt, nickel, copper, zinc, zirconium, niobium, molybdenum, ruthenium, rhodium, and palladium can be employed. Of these, manganese, cobalt, nickel, copper, aluminum, and vanadium are preferred. Manganese, cobalt, nickel and copper are more preferred, because azo metal chelate compound (B-I) containing any one of them exhibits excellent optical properties as an optical recording material.

The azo metal chelate compound (B-I) of the present invention is superior in optical properties to other azo metal chelate compounds and by mixing with a squarylium metal chelate compound, an optical recording medium having a high reflectivity can be provided.

As the squarylium metal chelate compound, the above-described compound (A-II) is preferred.

In the below-described Tables 7 to 10, specific examples of the azo metal chelate compound (B-I) to be used for the second optical recording medium of the present invention are shown. In tables, Et, Bu and tBu represent ethyl, n-butyl and tert-butyl, respectively.

TABLE 7

| Compound | Azo Compound | Coordinated metal |
| --- | --- | --- |
| I'-1 | (pyrimidin-2-yl)—N=N—C6H3(NHCOCF3)—N(Et)2 | Cu |
| I'-2 | (1-Et-4,5-dicyanoimidazol-2-yl)—N=N—C6H3(NHSO2CF3)—N(Et)2 | Ni |
| I'-3 | (1-H-4,5-dicyanoimidazol-2-yl)—N=N—C6H3(NHCOCF3)—N(Et)2 | Ni |
| I'-4 | (thiazol-2-yl)—N=N—C6H3(NHCOCF3)—N(Et)2 | Co |
| I'-5 | (pyridin-2-yl)—N=N—C6H3(OH)—N(Et)2 | Mn |

TABLE 7-continued
| Compound | Azo Compound | Coordinated metal |
|---|---|---|
| I'-6 | 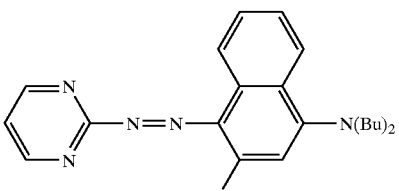 | Ni |
TABLE 8
| Compound | Azo Compound | Coordinated metal |
|---|---|---|
| I'-7 | 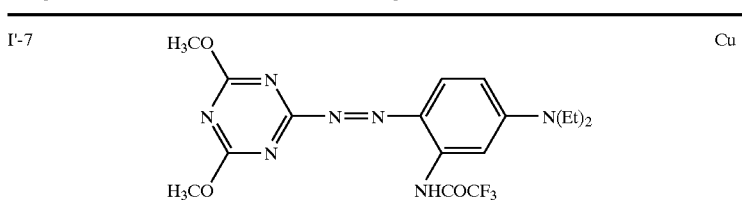 | Cu |
| I'-8 | 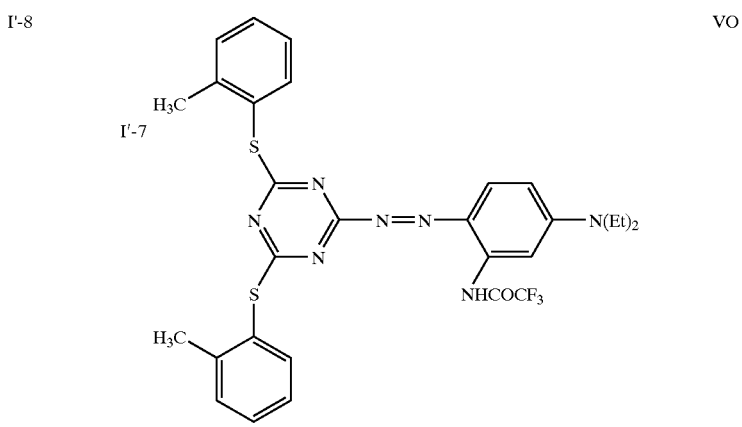 | VO |
| I'-9 | 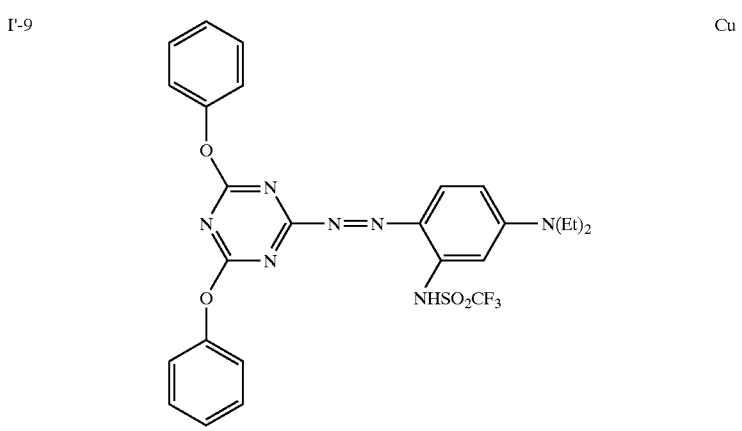 | Cu |

TABLE 8-continued
| Compound | Azo Compound | Coordinated metal |
|---|---|---|
| I'-10 | 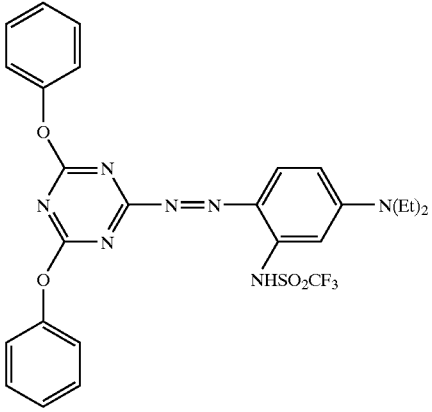 | Ni |
TABLE 9
| Compound | Azo Compound | Coordinated metal |
|---|---|---|
| I'-11 | 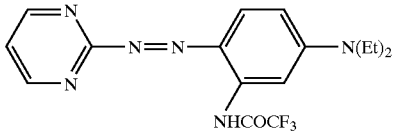 | Ni |
| I'-12 | 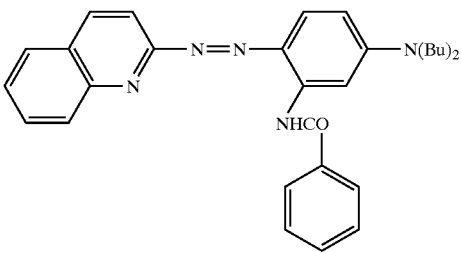 | Cu |
| I'-13 | 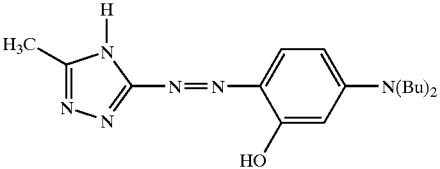 | Al |
| I'-14 | 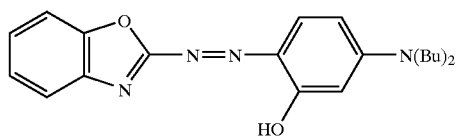 | Co |

TABLE 9-continued

| Compound | Azo Compound | Coordinated metal |
|---|---|---|
| I'-15 | 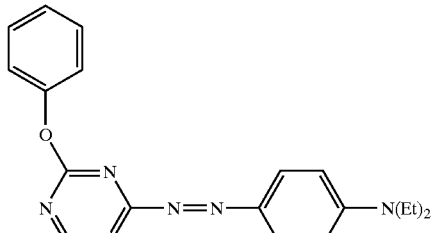 | Cu |
| I'-16 | 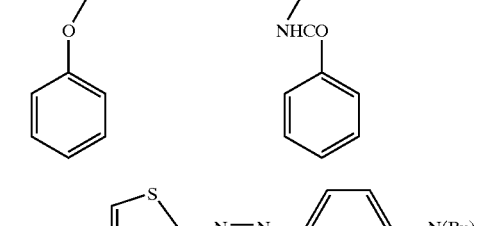 | Ni |

TABLE 10

| Compound | Azo Compound | Coordinated metal |
|---|---|---|
| I'-17 | 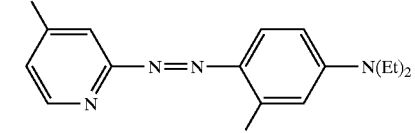 | Cu |
| I'-18 | 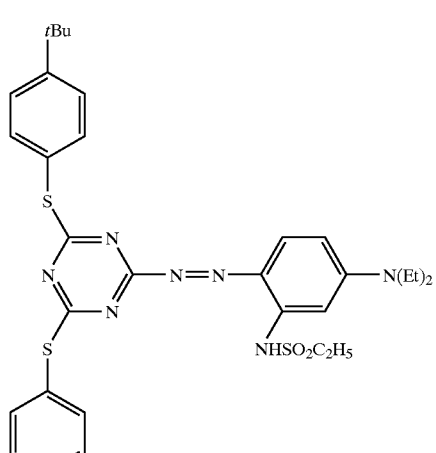 | Cu |

Specific examples of the squarylium metal chelate compounds to be used for the second optical recording medium of the present invention are similar to those used for the first optical recording medium.

The third optical recording medium of the present invention has a substrate and at least a recording layer disposed on the substrate, the recording layer comprising at least one squarylium metal chelate compound which comprises a squarylium compound and a metal, and at least one formazan metal chelate compound which comprises another metal and a formazan compound expressed by the following formula (C-I):

[Chemical Formula 1]

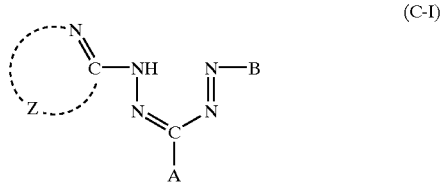

(C-I)

where, Z expresses a residue forming a 5-membered or 6-membered nitrogen-containing heterocyclic ring which may have a substituent by combination with both the carbon atom and the nitrogen atom bonded to Z, and may be condensed with another aromatic ring; A expresses an alkyl group which may have a substituent, an aryl group which may have a substituent, an alkylcarbonyl group which may have a substituent, an arylcarbonyl group which may have a substituent, an alkenyl group which may have a substituent, the residue of a heterocyclic which may have a substituent, or an alkoxycarbonyl group which may have a substituent; and B expresses an alkyl group which may have a substituent, an alkenyl group which may have a substituent or an aryl group which may have a substituent, and/or a formazan compound expressed by the following formula (C-II):

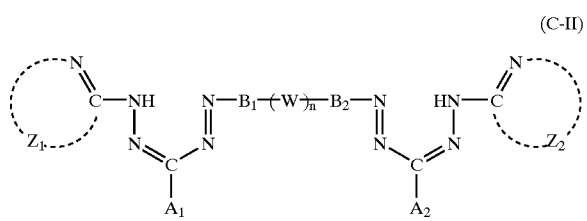

(C-II)

where, $Z_1$ and $Z_2$ each expresses a residue forming a 5-membered or 6-membered nitrogen-containing heterocyclic ring which may have a substituent by combination with both the carbon atom and the nitrogen atom bonded to $Z_1$ and $Z_2$, respectively, and may be condensed with another aromatic ring; $A_1$ and $A_2$ each independently expresses an alkyl group which may have a substituent, an aryl group which may have a substituent, an alkylcarbonyl group which may have a substituent, an arylcarbonyl group which may have a substituent, an alkenyl group which may have a substituent, the residue of a heterocyclic ring which may have a substituent, or an alkoxycarbonyl group which may have a substituent; $B_1$ and $B_2$ each independently expresses an alkylene group which may have a substituent or an arylene group which may have a substituent; W expresses —$CH_2$— or —$SO_2$—; and n stands for an integer of 0 or 1.

The present invention will hereinafter be described more specifically. The third optical recording medium of the present invention is characterized in the use of the above-described squarylium metal chelate compound and a formazan metal chelate compound in combination. The squarylium metal chelate compound and formazan metal chelate compound are added preferably at a weight ratio of 90:10 to 50:50. Weight ratios within the above-described range are preferred from the viewpoints of light resistance and reflectivity.

First, the formazan metal chelate compound will be described.

The substituents Z, $Z_1$ and $Z_2$ in the formulas (C-I) and (C-II) each expresses a residue forming a 5-membered or 6-membered nitrogen-containing heterocyclic ring which may have a substituent; A, B, $A_1$, $A_2$, $B_1$ and $B_2$ each expresses a substituent bonded to the respective position as shown in the formulas (C-I) and (C-II); W expresses —$CH_2$— or —$SO_2$—. When n=0, $B_1$ and $B_2$ are bonded directly.

Specific examples of Z, $Z_1$ and $Z_2$ include residues for forming thiazole ring, benzothiazole ring, imidazole ring, benzimidazole ring, thiadiazole ring, oxazole ring, benzoxazole ring, triazole ring, pyrazole ring, oxadiazole ring, pyridine ring, pyridazine ring, pyrimidine ring, pyrazine ring, triazine ring and quinoline ring. These nitrogen-containing heterocyclic rings may have a substituent or may be condensed with another aromatic ring.

Specific examples of the substituent include a hydrogen atom, halogen atoms, nitro group, cyano group, hydroxyl group, carboxyl group, amino group, carbamoyl group, alkyl groups which may have a substituent, aryl groups which may have a substituent, residues of a heterocyclic group which may have a substituent, alkoxy groups which may have a substituent, aryloxy groups which may have a substituent, alkylthio groups which may have a substituent, arylthio groups which may have a substituent, alkylamino groups which may have a substituent, arylamino groups which may have a substituent, alkoxycarbonyl groups which may have a substituent, aryloxycarbonyl groups which may have a substituent, alkylcarboxamide groups which may have a substituent, arylcarboxamide groups which may have a substituent, alkylsulfonamide groups which may have a substituent, alkylcarbamoyl groups which may have a substituent, arylcarbamoyl groups which may have a substituent, alkenyl groups which may have a substituent, and alkylsulfamoyl groups which may have a substituent.

Specific examples of A, $A_1$ and $A_2$ include alkyl groups which may have a substituent, aryl groups which may have a substituent, alkylcarbonyl groups which may have a substituent, arylcarbonyl groups which may have a substituent and alkoxycarbonyl groups which may have a substituent.

Specific examples of B include alkyl groups which may have a substituent, alkenyl groups which may have a substituent and aryl groups which may have a substituent.

Specific examples of $B_1$ and $B_2$ include alkylene groups which may have a substituent and arylene groups which may have a substituent.

Examples of the alkyl group include $C_{1-15}$ alkyl groups. Specific examples include straight chain alkyl groups such as methyl, ethyl, n-propyl, n-butyl, n-pentyl, n-hexyl, n-heptyl, n-octyl, n-nonyl, and n-decyl; branched alkyl groups such as isobutyl, isoamyl, 2-methylbutyl, 2-methylpentyl, 3-methylpentyl, 4-methylpentyl, 2-ethylbutyl, 2-methylhexyl, 3-methylhexyl, 4-methylhexyl, 5-methylhexyl, 2-ethylpentyl, 3-ethylpentyl, 2-methylheptyl, 3-methylheptyl, 4-methylheptyl, 5-methylheptyl, 2-ethylhexyl, 3-ethylhexyl, isopropyl, sec-butyl, 1-ethylpropyl, 1-methylbutyl, 1,2-dimethylpropyl, 1-methylheptyl, 1-ethylbutyl, 1,3-dimethylbutyl, 1,2-dimethylbutyl, 1-ethyl-2-methylpropyl, 1-methylhexyl, 1-ethylheptyl, 1-propylbutyl, 1-isopropyl-2-methylpropyl, 1-ethyl-2-methylbutyl, 1-propyl-2-methylpropyl, 1-methylheptyl, 1-ethylhexyl, 1-propylpentyl, 1-isopropylpentyl, 1-isopropyl-2-methylbutyl, 1-isopropyl-3-methylbutyl, 1-methyloctyl, 1-ethylheptyl, 1-propylhexyl, 1-isobutyl-3-methylbutyl, neopentyl, tert-butyl, tert-hexyl, tert-amyl, and tert-octyl; and cycloalkyl groups such as cyclohexyl, 4-methylcyclohexyl, 4-ethylcyclohexyl, 4-tert-butylcyclohexyl, 4-(2-ethylhexyl)cyclohexyl, bornyl, and isobornyl (adamantyl). Of these, $C_{1-8}$ alkyl groups are preferred.

As the alkylene groups, those obtained by removing one hydrogen atom from the above-described alkyl groups can be mentioned as examples.

The above-described alkyl groups may be substituted by hydroxyl group, a halogen atom, nitro group, carboxyl group, cyano group, an aryl group which may have a specific substituent (for example, a halogen atom or nitro group), or a residue of a heterocyclic ring. Further, they may be substituted by the above-described alkyl group via an oxygen atom, sulfur atom, or nitrogen atom.

Examples of the alkyl group substituted via an oxygen atom include methoxymethyl group, methoxyethyl group, ethoxymethyl group, ethoxyethyl group, butoxyethyl group, ethoxyethoxyethyl group, methoxypropyl group, and ethoxypropyl group. Examples of the alkyl group substituted via a sulfur atom include methylthioethyl group, ethylthioethyl group, ethylthiopropyl and phenylthioethyl group. Examples of the alkyl group substituted via a nitrogen atom include dimethylaminoethyl group, diethylaminoethyl group, and diethylaminopropyl group.

Specific examples of the alkenyl group include $C_{2-6}$ alkenyl groups such as vinyl, allyl, 1-propenyl, methacryl, crotyl, 1-butenyl, 3-butenyl, 2-pentenyl, 4-pentenyl, 2-hexenyl and 5-hexenyl. Substituents for these alkenyl groups are similar to those for the above-described alkyl groups.

Examples of the aryl group include phenyl group, naphthyl group, anthryl group, fluorenyl group, phenalenyl group, phenanthranyl group, triphenylenyl group, and pyrenyl group.

As the arylene group, those obtained by removing one hydrogen atom from the above-described aryl groups can be mentioned as examples.

The above-described aryl groups may be substituted by an alkyl group, hydroxyl group, a halogen atom, nitro group, carboxyl group, cyano group, trifluoromethyl group, an aryl group which may have a specific substituent (for example, a halogen atom or nitro group), or a residue of a heterocyclic ring. Further, they may be substituted by the above-described alkyl group via an oxygen atom, sulfur atom or nitrogen atom.

Specific examples of the residue of the heterocyclic ring include furyl group, thienyl group, pyrrolyl group, benzofuryl group, isobenzofuranyl group, benzothienyl group, indolinyl group, isoindolinyl group, carbazolyl group, pyridyl group, piperidyl group, quinolyl group, isoquinolyl group, oxazolyl group, isoxazolyl group, thiazolyl group, isothiazolyl group, imidazolyl group, pyrazolyl group, benzimidazolyl group, pyrazyl group, pyrimidinyl group, pyridazinyl group, and quinoxalinyl group.

These residues of the heterocyclic ring may be substituted by hydroxyl group, a halogen atom, nitro group, carboxyl group, cyano group, an aryl group which may have a specific substituent (for example, a halogen atom or nitro group), or a residue of a heterocyclic ring. Further, they may be substituted with the above-described alkyl group via an oxygen atom, sulfur atom, or nitrogen atom.

Specific examples of the halogen atom include fluorine, chlorine, bromine and iodine.

As the alkoxy group which may have a substituent, those having an alkyl group, which may have a substituent, directly bonded to an oxygen atom may be used. Specific examples of the alkyl group and substituent are similar to those described above.

As the aryloxyl group which may have a substituent, those having an aryl group, which may have a substituent, directly bonded to an oxygen atom may be used. Specific examples of the aryl group and substituent are similar to those described above.

As the alkylthio group which may have a substituent, those having an alkyl group, which may have a substituent, directly bonded to a sulfur atom may be used. Specific examples of the alkyl group and substituent are similar to those described above.

As the arylthio group which may have a substituent, those having an aryl group, which may have a substituent, directly bonded to a sulfur atom may be used. Specific examples of the aryl group and substituent are similar to those described above.

As the alkylamino group which may have a substituent, those having an alkyl group, which may have a substituent, directly bonded to a nitrogen atom may be used. Specific examples of the alkyl group and substituent are similar to those described above. In this case, alkyl groups may be bonded each other to form a ring, while containing an oxygen atom or nitrogen atom. Examples of the ring include piperidino group, morpholino group, pyrrolidinyl group, piperazinyl group, indolinyl group, and isoindolinyl group.

As the arylamino group which may have a substituent, those having an aryl group, which may have a substituent, directly bonded to a nitrogen atom may be used. Specific examples of the aryl group and substituent are similar to those described above.

As the alkylcarbonyl group which may have a substituent, those having an alkyl group, which may have a substituent, directly bonded to the carbon atom of the carbonyl group may be used. Specific examples of the alkyl group and substituent are similar to those described above.

As the arylcarbonyl group which may have a substituent, those having an aryl group, which may have a substituent, directly bonded to the carbon atom of the carbonyl group may be used. Specific examples of the aryl group and substituent are similar to those described above.

As the alkoxycarbonyl group which may have a substituent, those having an alkyl group, which may have a substituent, directly bonded to the oxygen atom of O(C=O) may be used. Specific examples of the alkyl group and substituent are similar to those described above.

As the aryloxycarbonyl group which may have a substituent, those having an aryl group, which may have a substituent, directly bonded to the oxygen atom of O(C=O) may be used. Specific examples of the aryl group and substituent are similar to those described above.

As the alkylcarboxamide group which may have a substituent, those having an alkyl group, which may have a substituent, directly bonded to the carbon atom of the carboxamide may be used. Specific examples of the alkyl group and substituent are similar to those described above.

As the arylcarboxamide group which may have a substituent, those having an aryl group, which may have a substituent, directly bonded to the carbon atom of the carboxamide may be used. Specific examples of the aryl group and substituent are similar to those described above.

As the alkylcarbamoyl group which may have a substituent, those having an alkyl group, which may have a substituent, directly bonded to the nitrogen atom of the carbamoyl group may be used. Specific examples of the alkyl group and substituent are similar to those described above. In this case, alkyl groups may be bonded each other to form a ring, while containing an oxygen atom or a nitrogen atom. Examples of the ring include piperidino group, morpholino group, pyrrolidinyl group, piperazinyl group, indolinyl group, and isoindolinyl group.

As the arylcarbamoyl group which may have a substituent, those having an aryl group, which may have a substituent, directly bonded to the nitrogen atom of the carbamoyl group may be used. Specific examples of the aryl group and substituent are similar to those described above.

As the alkylsulfamoyl group which may have a substituent, those having an alkyl group, which may have a substituent, directly bonded to the nitrogen atom of the sulfamoyl group may be used. Specific examples of the aryl group and substituent are similar to those described above.

Specific examples of the metal atom constituting the formazan metal chelate compound include titanium, vanadium, chromium, manganese, iron, cobalt, nickel, copper, zinc, zirconium, niobium, molybdenum, technetium, ruthenium, rhodium, and palladium, and oxides or halides thereof. In particular, formazan metal chelate compounds containing a metal such as vanadium, manganese, iron, cobalt, nickel, copper, zinc or palladium are excellent in optical properties as an optical recording material. Of the halides, chlorides are preferred.

Next, the squarylium metal chelate compound will be described.

In the optical recording medium of the present invention, use of a laser light of 600 to 720 nm as a recording or reproducing wavelength is desired. From the viewpoint of optical properties at this wavelength, the squarylium metal chelate compounds of the formula (A-II) are especially preferred.

Specific examples of the compounds expressed by the formula (C-I) or (C-II) for use in the third optical recording medium of the present invention are shown in Tables 11 to 13, while specific examples of the squarylium metal chelate compounds expressed by the formula (A-II) are shown in Tables 14 to 16.

In the tables, nPr, iPr, nBu and Ph represent n-propyl, isopropyl, n-butyl and phenyl groups respectively.

TABLE 11

| Compound | Formazon Compound | Metal |
| --- | --- | --- |
| H-1 | 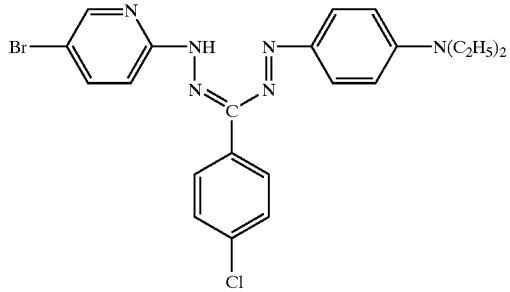 | VCl$_3$ |
| H-2 | 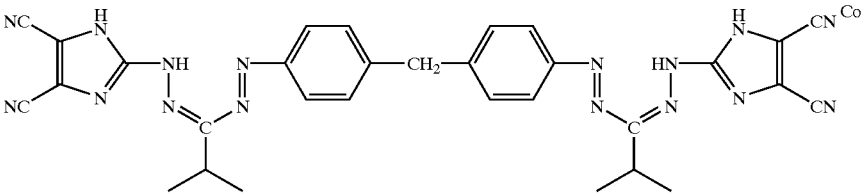 | Co |
| H-3 | 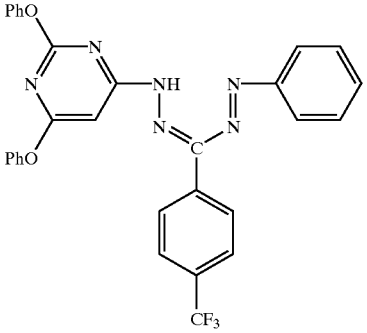 | Ni |

TABLE 11-continued

| Compound | Formazon Compound | Metal |
|---|---|---|
| H-4 | (structure) | Cu |
| H-5 | (structure) | Ni |

TABLE 12

| Compound | Formazan Compound | Metal |
|---|---|---|
| H-6 | (structure) | Co |
| H-7 | (structure) | Cu |
| H-8 | (structure) | Ni |

TABLE 12-continued

| Compound | Formazan Compound | Metal |
|---|---|---|
| H-9 | (pyridin-2-yl)NH-N=C(C(=O)OC₂H₅)-N=N-phenyl | Co |
| H-10 | (pyridin-2-yl)NH-N=C(C(=O)-phenyl)-N=N-(4-methoxyphenyl) | Cu |
| H-11 | (4,6-dimethoxy-1,3,5-triazin-2-yl)NH-N=C(pyridin-4-yl)-N=N-(3,4-dichlorophenyl) | Cu |

TABLE 13

| Compound | Formazan Compound | Metal |
|---|---|---|
| H-12 | (pyridin-2-yl)NH-N=C(C(=O)O-isopropyl)-N=N-(2-chlorophenyl) | Ni |
| H-13 | (pyridin-2-yl)NH-N=C(4-cyanophenyl)-N=N-(4-N(C₄H₉)₂-phenyl) | FeCl₃ |

TABLE 13-continued

| Compound | Formazan Compound | Metal |
|---|---|---|
| H-14 | (structure: pyrimidin-2-yl-NH-N=C(-4-chlorophenyl)-N=N-isopropyl formazan) | Mn |
| H-15 | (structure: pyrimidin-2-yl-NH-N=C(-pyridin-4-yl)-N=N-phenyl formazan) | Co |
| H-16 | (structure: bis-formazan with 3,3'-dichlorobiphenyl core, pyridin-2-yl-NH-N=C(-COOCH₃)-N=N- on each side) | Ni |

TABLE 14

| Compound | Squarylium compound | Metal |
|---|---|---|
| S-1 | (squarylium dye: 5-methoxy-1,3,3-trimethylindoline linked via =CH- to squaraine 2+ core, linked to 4-(1-phenyl-3-isopropyl-5-hydroxypyrazol-4-yl)) | Al |
| S-2 | (squarylium dye: 5-bromo-1,3,3-trimethylindoline linked via =CH- to squaraine 2+ core, linked to 4-(1-phenyl-3-ethyl-5-hydroxypyrazol-4-yl)) | Al |
| S-3 | (squarylium dye: 1,3,3-trimethylindoline linked via =CH- to squaraine 2+ core, linked to 4-(1-phenyl-3-trifluoromethyl-5-hydroxypyrazol-4-yl)) | Ni |

TABLE 14-continued

| Compound | Squarylium compound | Metal |
|---|---|---|
| S-4 | (structure: spirocyclohexyl indoline with N-CH₃, =CH- linked to squarylium (2+) with two O⁻, connected to pyrazole ring with HO, N-CH₃, CH₃) | Al |
| S-5 | (structure: 5-Cl, 3,3-dimethyl indoline with N-CH₃, =CH- linked to squarylium (2+) with two O⁻, connected to pyrazole with HO, N-(4-OCH₃-phenyl), CH₃) | Al |
| S-6 | (structure: 3,3-dimethyl indoline with N-CH₃, =CH- linked to squarylium (2+) with two O⁻, connected to pyrazole with HO, N-phenyl, CH₃) | Al |
| S-7 | (structure: 5-CH₃O, 3,3-dimethyl indoline with N-CH₃, =CH- linked to squarylium (2+) with two O⁻, connected to pyrazole with HO, N-phenyl, nPr) | Al |

TABLE 15

| Compound | Squarylium compound | Metal |
|---|---|---|
| S-8 | (structure: 5-Cl, 3,3-dimethyl indoline with N-CH₃, =CH- linked to squarylium (2+) with two O⁻, connected to pyrazole with HO, N-phenyl, nPr) | Al |
| S-9 | (structure: 4-(nBu)₂N-phenyl-CH= linked to squarylium (2+) with two O⁻, connected to pyrazole with HO, N-phenyl, CH₃) | Cu |

TABLE 15-continued

| Compound | Squarylium compound | Metal |
|---|---|---|
| S-10 | | Al |
| S-11 | | Al |
| S-12 | | Al |
| S-13 | | Al |
| S-14 | | Cu |

TABLE 16

| Compound | Squarylium compound | Metal |
|---|---|---|
| S-15 | | Al |

TABLE 16-continued

| Compound | Squarylium compound | Metal |
|---|---|---|
| S-16 | | Al |
| S-17 | | Al |
| S-18 | | Al |

Upon formation of a recording layer, dye mixtures of the present invention may be used either alone or in combination. In addition to the dye mixture of the present invention, another organic dye may be mixed or stacked in order to improve optical properties, recording sensitivity and signal characteristics.

The fourth optical recording medium of the present invention has a substrate and at least a recording layer disposed on the substrate, the recording layer comprising at least one squarylium compound, and at least one formazan metal chelate compound which comprises a metal and a formazan compound expressed by the following Formula (D-I):

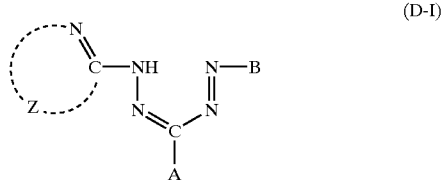

(D-I)

where, Z expresses a residue forming a 5-membered or 6-membered nitrogen-containing heterocyclic ring which may have a substituent by combination with the carbon atom and the nitrogen atom bonded to Z, and may be condensed with another aromatic ring, A expresses an alkyl group which may have a substituent, an aryl group which may have a substituent, an alkylcarbonyl group which may have a substituent, an arylcarbonyl group which may have a substituent, an alkenyl group which may have a substituent, a residue of a heterocyclic ring which may have a substituent, or an alkoxycarbonyl group which may have a substituent; and B expresses an alkyl group which may have a substituent or an aryl group which may have a substituent, and/or another formazan compound expressed by the following formula (D-II):

[Chemical formula II]

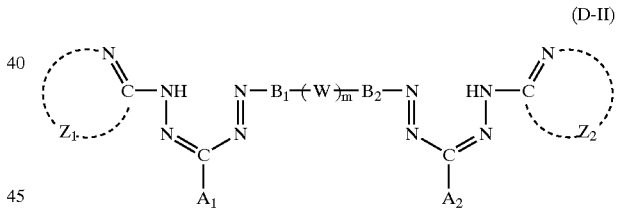

(D-II)

where, $Z_1$ and $Z_2$ each expresses a residue forming a 5-membered or 6-membered nitrogen-containing heterocyclic ring which may have a substituent by combination with both the carbon atom and the nitrogen atom bonded to $Z_1$ and $Z_2$, respectively, may be condensed with another aromatic ring; $A_1$ and $A_2$ each independently expresses an alkyl group which may have a substituent, an aryl group which may have a substituent, an alkylcarbonyl group which may have a substituent, an arylcarbonyl group which may have a substituent, an alkenyl group which may have a substituent, a residue of a heterocyclic ring which may have a substituent, or an alkoxycarbonyl group which may have a substituent; $B_1$ and $B_2$ each independently expresses an alkylene group which may have a substituent or an arylene group which may have a substituent; W expresses —$CH_2$— or —$SO_2$—; and m stands for an integer of 0 or 1.

The squarylium compound is preferably a compound expressed by the below-described formula (D-III) and/or (D-VI).

[Chemical formula 3]

[Chemical Formula 3]

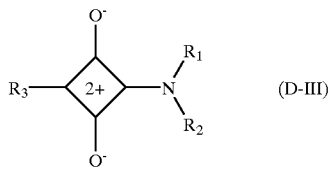

(D-III)

where, $R_1$ and $R_2$ may be the same or may be different, and each expresses a hydrogen atom, an alkyl group which may have a substituent, an aralkyl group which may have a substituent, an aryl group which may have a substituent or a residue of a heterocyclic ring which may have a substituent, or $R_1$ and $R_2$ may form a heterocyclic ring which may have a substituent by combination with the adjacent two carbon atoms; and $R_3$ expresses a compound expressed by one of the following formulae (D-IV) and (D-V):

[Chemical Formula 4]

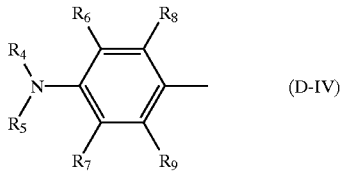

(D-IV)

where, $R_4$ and $R_5$ may be the same or may be different and each independently expresses a hydrogen atom or an alkyl group which may have a substituent, or $R_4$ and $R_5$ may form a heterocyclic ring which may have a substituent by combination with the adjacent nitrogen atom; $R_6$, $R_7$, $R_8$ and $R_9$ may be the same or may be different to each other and each independently expresses a hydrogen atom, an alkyl group which may have a substituent, an alkoxy group which may have a substituent, hydroxyl group or a halogen atom, and a pair $R_4$ and $R_6$ or a pair $R_5$ and $R_7$ by combination with the adjacent —N—C—C form a nitrogen-containing heterocyclic ring which may have a substituent:

[Chemical Formula 5]

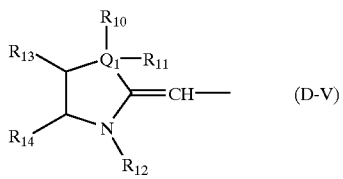

(D-V)

where, $Q_1$ expresses a carbon atom or a nitrogen atom, $R_{10}$ and $R_{11}$ may be the same or may be different and each independently expresses a hydrogen atom, an alkyl group which may have a substituent, an aryl group which may have a substituent, an aralkyl group which may have a substituent or hydroxyl group (with the proviso that when $Q_1$ expresses a nitrogen atom, $R_{11}$ does not exist), $R_{12}$ expresses a hydrogen atom, an aralkyl group which may have a substituent, an aryl group which may have a substituent or an aralkyl group which may have a substituent; $R_{13}$ and $R_{14}$ may be the same or may be different and each independently expresses a hydrogen atom, an alkyl group which may have a substituent, an alkoxy group which may have a substituent or a halogen atom, or $R_{13}$ and $R_{14}$ may form an alicyclic hydrocarbon ring, an aromatic ring which may have a substituent, or a heterocyclic ring which may have a substituent by combination with the adjacent two carbon atoms; or a compound expressed by the following formula (D-VI):

[Chemical Formula 6]

[Chemical formula 6]

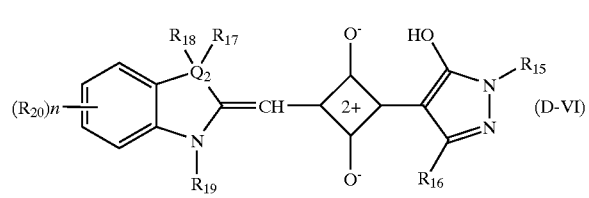

(D-VI)

where, $Q_2$ expresses a carbon atom or a nitrogen atom, $R_{15}$ expresses a hydrogen atom, an alkyl group which may have a substituent, an aryl group which may have a substituent or a heterocyclic group which may have a substituent, $R_{16}$ expresses a hydrogen atom, a halogen atom, an alkyl group which may have a substituent, an alkoxy group which may have a substituent, an aralkyl group which may have a substituent, an aryl group which may have a substituent, amino group which may have a substituent or a heterocyclic group which may have a substituent, $R_{17}$ and $R_{18}$ may be the same or may be different and each independently expresses an alkyl group which may have a substituent, or $R_{17}$ and $R_{18}$ may form an alicyclic hydrocarbon ring or a heterocyclic group which may have a substituent by combination with the adjacent carbon atom, with the proviso that when $Q_2$ expresses a nitrogen atom, $R_{18}$ does not exist, $R_{19}$ expresses a hydrogen atom, an alkyl group which may have a substituent, an aralkyl group which may have a substituent or an aryl group which may have a substituent, $R_{20}$ expresses a halogen atom, an alkyl group which may have a substituent, an aralkyl group which may have a substituent, an aryl group which may have a substituent, trifluoromethyl group, nitro group, cyano group, or an alkoxy group which may have a substituent, n stands for an integer of 0 to 4 with the proviso that when n stands for an integer of 2 to 4, $R_{20}$s may be the same or may be different and any adjacent two $R_{20}$ by combination with the adjacent two carbon atoms may form an aromatic ring which may have a substituent.

The present invention will hereinafter be described more specifically. The fourth optical recording medium of the present invention is characterized by the use of the above-described squarylium compound and formazan metal chelate compound in combination. To this optical recording medium, the squarylium compound and formazan metal chelate compound are added preferably at a weight ratio of 90:10 to 50:50. Weight ratios within the above-described range are preferred, because the resulting optical recording medium has high light resistance and reflectivity.

Each of the groups in the formulae (D-I) and (D-II) has the same meaning as defined above in (C-I) and (C-II).

In the optical recording medium of the present invention, preferred is the use of a laser light of 600 to 720 nm for a recording or reproducing wavelength. In consideration of the optical properties at this wavelength, the squarylium compounds expressed by the formulas (D-III) and (D-VI) are preferred.

The definition of the groups in the formulas (D-III) to (D-VI) will next be described.

In the definition of the groups in the formulas (D-III) and (D-VI), examples of the alkyl or the alkyl moiety of the alkoxy group include straight or branched $C_{1-6}$ alkoxy groups and cyclic $C_{3-8}$ alkyl groups. Specific examples include methyl group, ethyl group, propyl group, isopropyl group, butyl group, iso-butyl group, sec-butyl group, tert-butyl group, pentyl group, isopentyl group, 1-methylbutyl group, 2-methylbutyl group, tert-pentyl group, hexyl group, cyclopropyl group, cyclobutyl group, cyclopentyl group, cyclohexyl group, cycloheptyl group, and cyclooctyl group.

Examples of the aryl group and an aryl moiety of the aralkyl group include phenyl group, naphthyl group, and anthryl group.

Examples of the halogen atom include fluorine atom, chlorine atom, bromine atom, and iodine atom.

As the heterocyclic ring in the heterocyclic group and the heterocyclic ring formed by a pair of $R_{13}$ and $R_{14}$ or $R_{17}$ and $R_{18}$ by combination with (two) carbon atoms adjacent thereto, there are aromatic heterocyclic rings and alicyclic heterocyclic rings.

Examples of the aromatic heterocyclic ring include 5- or 6-membered monocyclic aromatic heterocyclic rings containing at least one atom selected from a nitrogen atom, an oxygen atom, and a sulfur atom, and bicyclic or tricyclic, 3- to 8-membered-ring-condensed aromatic heterocyclic rings containing at least one atom selected from a nitrogen atom, an oxygen atom, and a sulfur atom. Specific examples include pyridine ring, pyrazine ring, pyrimidine ring, pyridazine ring, quinoline ring, isoquinoline ring, phthalazine ring, quinazoline ring, quinoxaline ring, naphthyridine ring, cinnoline ring, pyrrole ring, pyrazole ring, imidazole ring, triazole ring, tetrazole ring, thiophene ring, furan ring, thiazole ring, oxazole ring, indole ring, isoindole ring, indazole ring, benzimidazole ring, benzotriazole ring, benzothiazole ring, benzoxazole ring, purine ring, and carbazole ring.

Examples of the alicyclic heterocyclic ring include 5- or 6-membered monocyclic alicyclic heterocyclic rings containing at least one atom selected from a nitrogen atom, an oxygen atom, and a sulfur atom, and bicyclic or tricyclic, 3- to 8-membered-ring-condensed alicyclic heterocyclic rings containing at least one atom selected from a nitrogen atom, an oxygen atom, and a sulfur atom. Specific examples include pyrrolidine ring, piperidine ring, piperazine ring, morpholine ring, thiomorpholine ring, homopiperidine ring, homopiperazine ring, tetrahydropyridine ring, tetrahydroquinoline ring, tetrahydroisoquinoline ring, tetrahydrofuran ring, tetrahydropyran ring, dihydrobenzofuran ring, and tetrahydrocarbazole ring.

As heterocyclic rings formed by $R_1$ and $R_2$ or $R_4$ and $R_5$ by combination with the adjacent nitrogen atom and nitrogen-containing heterocyclic rings formed by $R_4$ and $R_6$ or $R_5$ and $R_7$ by combination with the N—C—C adjacent thereto, nitrogen-containing aromatic heterocyclic rings and nitrogen-containing alicyclic heterocyclic rings can be mentioned as examples.

Examples of the aromatic heterocyclic ring containing a nitrogen atom include 5- or 6-membered monocyclic aromatic heterocyclic rings containing at least one nitrogen atom, and bicyclic or tricyclic, 3- to 8-membered-ring-condensed aromatic heterocyclic rings containing at least one nitrogen atom. Specific examples include pyridine ring, pyrazine ring, pyrimidine ring, pyridazine ring, quinoline ring, isoquinoline ring, phthalazine ring, quinazoline ring, quinoxaline ring, naphthyridine ring, cinnoline ring, pyrrole ring, pyrazole ring, imidazole ring, triazole ring, tetrazole ring, thiazole ring, oxazole ring, indole ring, isoindole ring, indazole ring, benzimidazole ring, benzotriazole ring, benzothiazole ring, benzoxazole ring, purine ring, and carbazole ring.

Examples of the nitrogen-containing alicyclic heterocyclic ring include 5- or 6-membered monocyclic alicyclic heterocyclic rings containing at least one nitrogen atom, and dicyclic or tricyclic, 3- to 8-membered-ring-condensed alicyclic heterocyclic rings containing at least one nitrogen atom. Specific examples include pyrrolidine ring, piperidine ring, piperazine ring, morpholine ring, thiomorpholine ring, homopiperidine ring, homopiperazine ring, tetrahydropyridine ring, tetrahydroquinoline ring, tetrahydroisoquinoline ring, and tetrahydrocarbazole ring.

As the alicyclic hydrocarbon ring formed by $R_{13}$ and $R_{14}$ or $R_{17}$ and $R_{18}$ by combination with the (two) carbon atoms adjacent thereto, alicyclic $C_{3-8}$ hydrocarbon rings which may be saturated or unsaturated can be given as examples. Examples include cyclopropane ring, cyclobutane ring, cyclopentane ring, cyclohexane ring, cycloheptane ring, cyclooctane ring, cyclopentene ring, 1,3-cyclopentadiene ring, cyclohexene ring, and cyclohexadiene ring.

Examples of the aromatic ring formed by $R_{13}$ and $R_{14}$ by combination with the two carbon atoms adjacent thereto, and aromatic rings formed by two adjacent $R_{20}$s by combination with the two carbon atoms adjacent thereto include $C_{6-14}$ aromatic rings such as benzene, naphthalene, and anthracene.

The substituents for the aryl group, aralkyl group, heterocyclic group, aromatic ring, nitrogen-containing heterocyclic ring, or heterocyclic ring may be the same or may be different and their number is from one to the permissible number, preferably, 1 to 5. Examples of the substituents include hydroxyl group, carboxyl group, nitro group, alkoxy groups, alkyl groups, aralkyl groups, cyano group, halogen atoms, —N=N—Ar (in which Ar expresses hydroxyl group, carboxyl group, nitro group, an alkoxy group, an alkyl group which may be substituted by a halogen atom, or an aryl group which may be substituted by cyano group or a halogen atom), and —CH=CH—Ar (in which Ar has the same meaning as described above). Examples of the alkyl group, alkoxy group, aralkyl group, aryl group, and halogen atom are similar to those described above.

The substituents for the alkyl group or alkoxy group may be the same or may be different and their number is from one to the permissible number, preferably, from 1 to 3. Examples of the substituents include hydroxyl group, carboxyl group, nitro group, alkoxy groups, aryl groups, and halogen atoms. Examples of the alkoxy groups, aryl groups and halogen atoms are similar to those described above.

The amino group may be substituted by one or two substituents which may be the same or may be different. Examples of the substituents include alkyl groups and aryl groups. Examples of the alkyl and aryl groups are similar to those described above, respectively.

A process for preparing the squarylium compound to be used in the present invention will next be described with the compounds expressed by the formula (D-III) and (D-VI) as examples. The compounds expressed by the formulas (D-III) and (D-VI) may hereinafter be called Compound (D-III) and Compound (D-VI), respectively. This will be equally applied to compounds with another formula number.

Reaction scheme (1-a):
[Chemical formula 13]

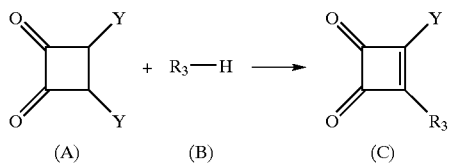

Reaction scheme (1-b):
[Chemical formula 14]

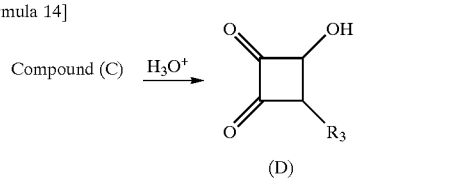

Reaction scheme (1-c):
[Chemical formula 15]

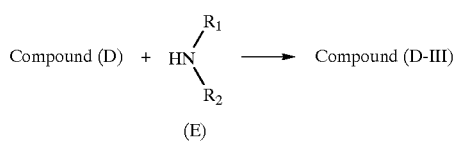

Reaction scheme (2-a):
[Chemical formula 16]

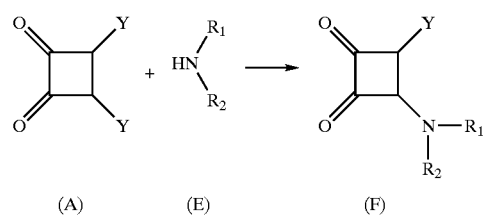

Reaction scheme (2-b):
[Chemical formula 17]

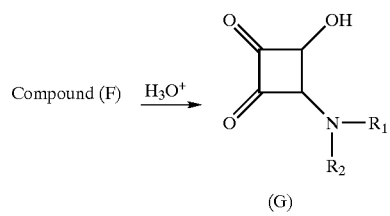

[Chemical Formula 13]

[Chemical Formula 14]

[Chemical Formula 15]

[Chemical Formula 16]

[Chemical Formula 17]

Reaction scheme (2-c):
[Chemical formula 18]

Compound (G) + $R_3$—H(B) ⟶ Compound (D-III)

In the above-described reaction schemes, $R_1$, $R_2$ and $R_3$ have the same meanings as described above, and Y expresses a halogen atom such as chlorine or bromine, or $OR_{21}$ (in which, $R_{21}$ expresses an alkyl group. Specific examples of the alkyl group of $R_{21}$ are similar to those of the alkyl group in the formulas (D-III) to (D-VI).

In the reaction scheme (1-a), Compound (C) is available by reacting Compound (A) with 0.4 to 2 times the mole of Compound (B), in the presence of 0.4 to 2 times the mole of a base if necessary, in a solvent at room temperature to the boiling point of the solvent for 1 to 4 hours.

Examples of the solvent include chloroform, dichloromethane, 1,2-dichloroethane, ethyl acetate, diethyl ether, methyl-tert-butyl ether, tetrahydrofuran, toluene, benzene, dimethylformamide, and dimethyl sulfoxide.

Examples of the base include organic bases such as quinoline, triethylamine, and pyridine; and inorganic bases such as potassium bicarbonate and sodium bicarbonate.

In the reaction scheme (1-b), Compound (D) is available by treating Compound (C) in a 50 to 90 vol/wt. % aqueous solution of acetic acid at 90 to 110° C. for 1 to 7 hours or in a 50 to 99 wt. % aqueous solution of trifluoroacetic acid at 40 to 60° C. for 1 to 3 hours.

In the reaction scheme (1-c), Compound (D-III) is available by reacting Compound (D) with 0.5 to 2 times the mole of Compound (E), in the presence of 1.0 to 2.0 times the mole of a base if necessary, in a solvent at 80 to 120° C. for 1 to 15 hours.

As the solvent, an alcohol solvent having 2 to 8 carbon atoms such as ethanol, propanol, isopropanol, butanol or octanol is used alone, or a mixed solvent of such an alcohol solvent with benzene or toluene (the mixed solvent containing 50 vol/vol % or greater of the alcohol) is used.

Examples of the base include organic bases such as quinoline, triethylamine, and pyridine; and inorganic bases such as potassium carbonate, potassium bicarbonate, and sodium bicarbonate.

In the reaction scheme (2-a), Compound (F) is available in a similar manner to that employed in the reaction scheme (1-a) except for the use of Compound (E) instead of Compound (B).

In the reaction scheme (2-b), Compound (G) is available in a similar manner to that employed in the reaction scheme (1-b) except for the use of Compound (F) instead of Compound (C).

In the reaction scheme (2-c), Compound (D-III) is available in a similar manner to that employed in the reaction scheme (1-c) except for the use of Compound (G) and Compound (B) instead of Compound (D) and Compound (E), respectively.

After completion of the final reaction, Compound (D-III) is isolated and purified, for example, by distilling off the solvent from the reaction product or filtration thereof. If necessary, further purification can be performed by the method (column chromatography, recrystallization, washing with a solvent or the like) ordinarily employed in the synthetic organic chemistry.

Reaction scheme (3-a):
[Chemical formula 19]

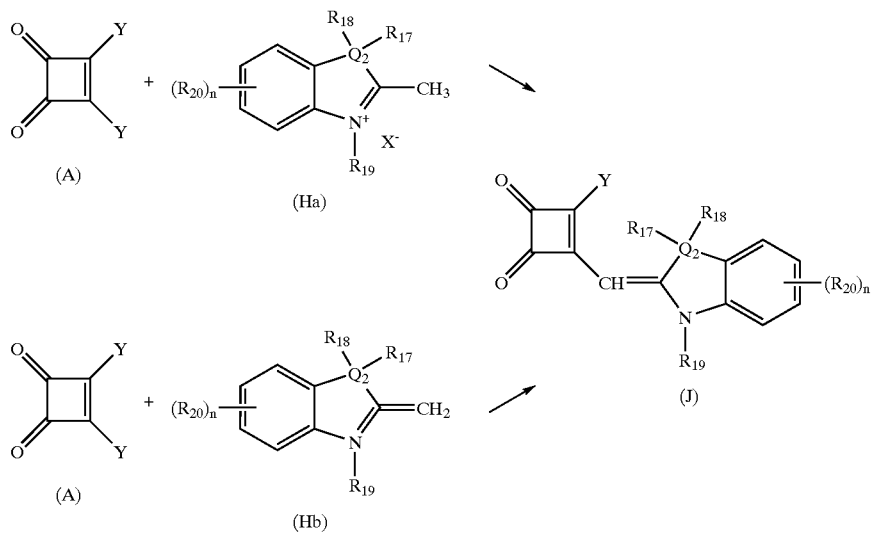

[Chemical Formula 19]

Reaction scheme (3-b):
[Chemical formula 20]

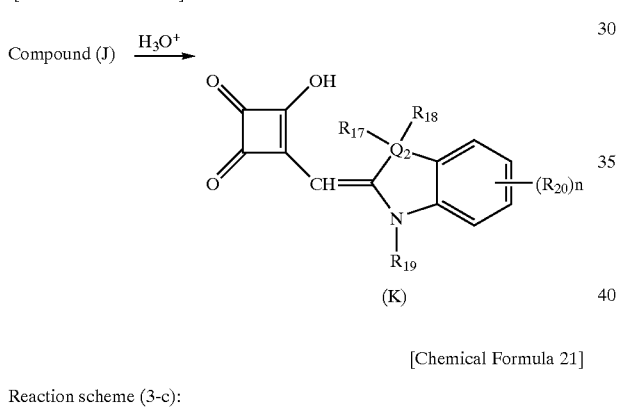

[Chemical Formula 20]

Reaction scheme (3-c):
[Chemical formula 21]

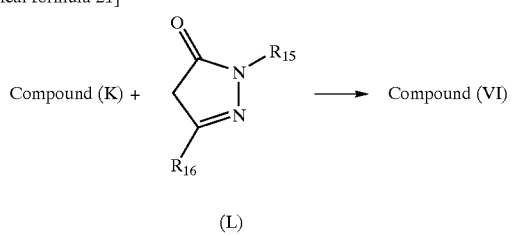

[Chemical Formula 21]

Reaction scheme (4-a):
[Chemical formula 22]

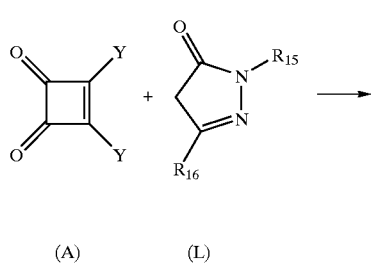

[Chemical Formula 22]

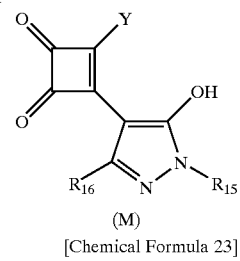

Reaction scheme (4-b):
[Chemical formula 23]

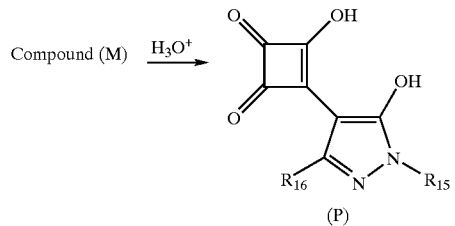

[Chemical Formula 23]

Reaction scheme (4-c):

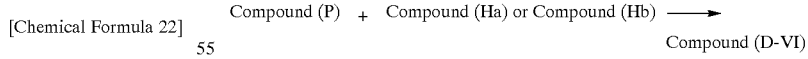

In the above-described reaction schemes, $Q_2$, $R_{15}$, $R_{16}$, $R_{17}$, $R_{18}$, $R_{19}$, $R_{20}$ and n have the same meanings as described above, X expresses a halogen atom such as chlorine, bromine or iodine, a tosyl group or a mesyl group, and Y has the same meaning as described above.

In the reaction scheme (3-a), Compound (J) is available by reacting Compound (A) with 1 to 2 times the mole of Compound (Ha) or Compound (Hb), in the presence of 1 to 2 times the mole of a base if necessary, in a solvent at 0° C. to room temperature for 30 minutes to 70 hours.

Examples of the solvent usable here include chloroform, dichloromethane, 1,2-dichloroethane, ethyl acetate, diethyl ether, methyl-tert-butyl ether, tetrahydrofuran, toluene, benzene, dimethylformamide and dimethyl sulfoxide.

Examples of the base include organic bases such as quinoline, triethylamine and pyridine and inorganic bases such as potassium bicarbonate and sodium bicarbonate.

In the reaction scheme (3-b), Compound (K) is available by treating Compound (I) in a 50 to 90 vol/vol % aqueous acetic acid solution at 90 to 100° C. for 1 to 7 hours, or in a 50 to 99 wt. % aqueous solution of trifluoroacetic acid at 45 to 50° C. for 1 to 3 hours.

In the reaction scheme (3-c), Compound (D-VI) is available by reacting Compound (K) with 0.5 to 2 times the mole of Compound (L), in the presence of 0.5 to 2 times the mole of a base if necessary, in a solvent at 80 to 120° C. for 1 to 15 hours.

As the solvent, an alcohol solvent having 2 to 8 carbon atoms such as ethanol, propanol, isopropanol, butanol or octanol is used alone, or a mixed solvent of such an alcohol solvent with benzene or toluene (the mixed solvent containing 50 vol/vol % or greater of the alcohol) is used.

Examples of the base include organic bases such as quinoline, triethylamine, and pyridine; and inorganic bases such as potassium carbonate, potassium bicarbonate, and sodium bicarbonate.

In the reaction scheme (4-a), Compound (M) is available in a similar manner to that employed in the reaction scheme (3-a) except for the use of Compound (L) instead of Compound (Ha) or (Hb).

In the reaction scheme (4-b), Compound (P) is available in a similar manner to that employed in the reaction scheme (3-b) except for the use of Compound (M) instead of Compound (J).

In the reaction scheme (4-c), Compound (D-VI) is available in a similar manner to that employed in the reaction scheme (3-c) except for the use of Compound (P) and Compound (Ha) or (Hb) instead of Compound (K) and Compound (L), respectively.

After completion of the final reaction, the reaction product is distilled to remove the solvent therefrom or filtered, followed by, if necessary, further purification by the method (column chromatography, recrystallization, washing with a solvent or the like) ordinarily employed in the synthetic organic chemistry, whereby Compound (D-VI) is isolated and purified.

Specific examples of the formazan metal chelate compound to be used for the fourth optical recording medium of the present invention are shown below in Tables 17 to 19. In tables, Me, nBu and Ph represent a methyl group, an n-butyl group and a phenyl group, respectively.

TABLE 17

| Compound | Formazan compound | Metal |
|---|---|---|
| H'-1 | [structure] | Co |
| H'-2 | [structure] | Cu |
| H'-3 | [structure] | Ni |

TABLE 17-continued
| Compound | Formazan compound | Metal |
|---|---|---|
| H'-4 | 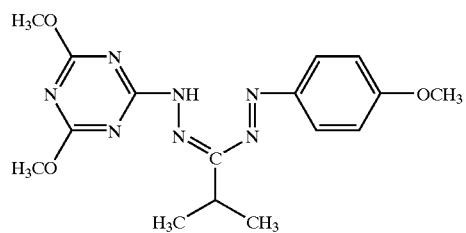 | Cu |
| H'-5 | 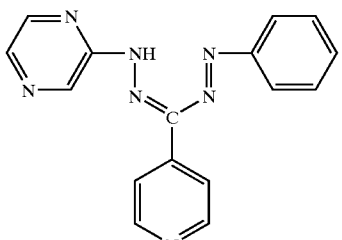 | Ni |
TABLE 18
| Compound | Formazan compound | Metal |
|---|---|---|
| H'-6 | 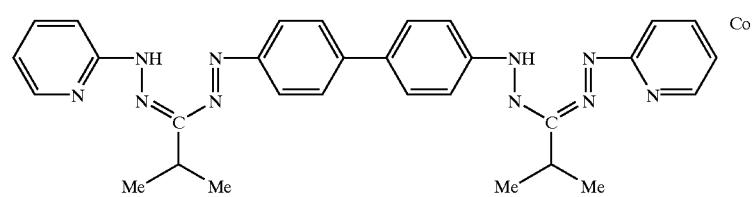 | Co |
| H'-7 | 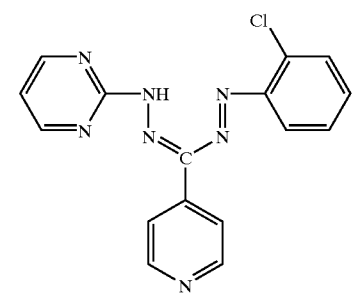 | Ni |
| H'-8 | 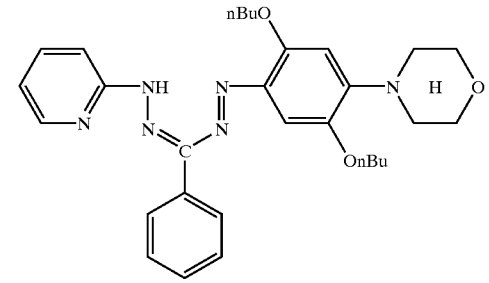 | $ZnCl_2$ |

TABLE 18-continued

| Compound | Formazan compound | Metal |
|---|---|---|
| H'-9 | (structure: 2-pyridyl-NH-N=C(COOC₂H₅)-N=N-phenyl) | Co |
| H'-10 | (structure: bis-formazan with 3,3'-dichlorobiphenyl core, two 2-pyridyl-NH-N=C(COOCH₃)-N=N- groups) | Ni |
| H'-11 | (structure: 2-pyridyl-NH-N=C(C(=O)phenyl)-N=N-(4-methoxyphenyl)) | Cu |

TABLE 19

| Compound | Formazan compound | Metal |
|---|---|---|
| H'-12 | (structure: 4,6-dimethoxy-1,3,5-triazin-2-yl-NH-N=C(3-CF₃-phenyl)-N=N-phenyl) | Ni |
| H'-13 | (structure: 2-pyrimidinyl-NH-N=C(phenyl)-N=N-(4-isopropylphenyl)) | Ni |

TABLE 19-continued

| Compound | Formazan compound | Metal |
|---|---|---|
| H'-14 | [structure: 2,4-dimethoxy-1,3,5-triazine linked via NH-N=C(4-pyridyl)-N=N to 3,4-dichlorophenyl] | Mn |
| H'-15 | [structure: 2-pyridyl-NH-N=C(4-cyanophenyl)-N=N-phenyl-N(nBu)₂] | FeCl₃ |
| H'-16 | [structure: 2,4-diphenoxy-1,3,5-triazine linked via NH-N=C(CHMe₂)-N=N-phenyl] | Cu |

Specific examples of the squarylium compound to be used for the fourth optical recording medium of the present invention are shown below in Tables 20 to 22. In tables, nPr, iPr and Ph represent an n-propyl group, an isopropyl group and a phenyl group, respectively.

TABLE 20

| Compound | Squarylium compound |
|---|---|
| S'-1 | [structure: 1,3-dibutyl-imidazo[4,5-b]quinoxaline-CH=squarylium-NH-8-quinolinyl] |
| S'-2 | [structure: 1,3,3-trimethylindoline-CH=squarylium-(5-hydroxy-3-n-propyl-1H-pyrazol-4-yl)] |

TABLE 20-continued

| Compound | Squarylium compound |
| --- | --- |
| S'-3 | |
| S'-4 | |
| S'-5 | |
| S'-6 | |

TABLE 21

| Compound | Squarylium compound |
| --- | --- |
| S'-7 | |
| S'-8 | |

TABLE 21-continued

| Compound | Squarylium compound |
|---|---|
| S'-9 | |
| S'-10 | |
| S'-11 | |
| S'-12 | |

TABLE 22

| Compound | Squarylium compound |
|---|---|
| S'-13 | |
| S'-14 | |

TABLE 22-continued

| Compound | Squarylium compound |
|---|---|
| S'-15 | (structure) |
| S'-16 | (structure) |
| S'-17 | (structure) |
| S'-18 | (structure) |

Materials for a recording layer are required to have physical properties such as optical properties, thermal properties and light resistance.

From the viewpoint of optical properties, it is preferred that the material for a recording layer has a great absorption band on a shorter wavelength region than 600 to 720 nm which is a recording or reproducing wavelength of DVD-R or the like, preferably 630 to 690 nm, and at the same time, the recording or reproducing wavelength exists in the vicinity of a long wavelength end of the above-described absorption band. This means that the material for a recording layer has a large refractive index and a predetermined extinction coefficient at a wavelength of 600 to 720 nm which is a recording or reproducing wavelength.

More specifically, it is preferred that in a wavelength region ±5 nm of the recording or reproducing wavelength in the vicinity of the long wavelength end of the absorption band, a single recording layer has a refractive index (n) of 1.5 or greater but not greater than 3.0, as great as possible within this range, and an extinction coefficient (k) is 0.02 or greater but not greater than 0.3. When the refractive index (n) is 1.5 or greater, a sufficient optical change occurs, making it possible to enhance the degree of recording modulation. When the refractive index (n) is 3.0 or less, dependence on the wavelength does not increase so that reproduction errors due to the light in the recording or reproducing wavelength region do not occur easily. Further, when the extinction coefficient (k) is 0.02 or greater, recording sensitivity can be improved, and at the same time, when the coefficient (k) is 0.3 or less, a reflectivity of 50% or greater can be easily obtained. The extinction coefficient within the above-described range is therefore preferred.

In addition, the material preferably has the maximum absorption wavelength ($\lambda$ max), as measured in the chloroform solution, ranging from 550 to 600 nm. Its refractive index (n) can be made higher when it has a higher adsorptivity so that the material having log $\epsilon$($\epsilon$: molar adsorptivity) of 5 or greater is preferred.

From the viewpoint of thermal properties, the material for a recording layer has preferably a thermal decomposition point within a specific temperature range. To be more concrete, the decomposition temperature is preferably 350° C. or less, more preferably within a range of 250 to 350° C. Decomposition starting temperatures not greater than 350° C. do not need an increase in the power of a recording laser light and those of 250° C. or greater bring about recording stability. Decomposition starting temperatures within the above-described range are therefore preferred.

From the viewpoint of light resistance, the recording layer material preferably has reproduction stability even after reproduction is repeated 1 million times or more and has light fastness enough to be free from fading when left indoors.

The substrate usually has a guide groove having a depth of 1000 to 2500 Å. When a great capacity is necessary, the track pitch of the guide groove is preferably 0.7 to 0.8 μm, although it is usually set at 0.7 to 1.0 μm. The groove width is, at a half bandwidth, preferably 0.18 to 0.40 μm. At the half bandwidth of 0.18 μm or greater, tracking error signals having a sufficient intensity can be attained easily. When the half bandwidth is 0.40 μm or less, spreading of a recorded portion in the width direction can be prevented. The half bandwidth within the above-described range is therefore preferred.

A description will next be made of the constitution of the optical recording medium of the present invention.

FIG. 1 illustrates one example of a layer constitution which can be applied to the optical recording medium of the present invention. This is an example of a write-once-read-many optical disc. On a substrate 1, disposed is a recording layer 2 via a undercoat layer 3 if necessary. A protective layer 4 is disposed on the recording layer 2 if necessary. A hard coat layer 5 can be disposed on the back side of the substrate 1 if necessary.

Figure 2:
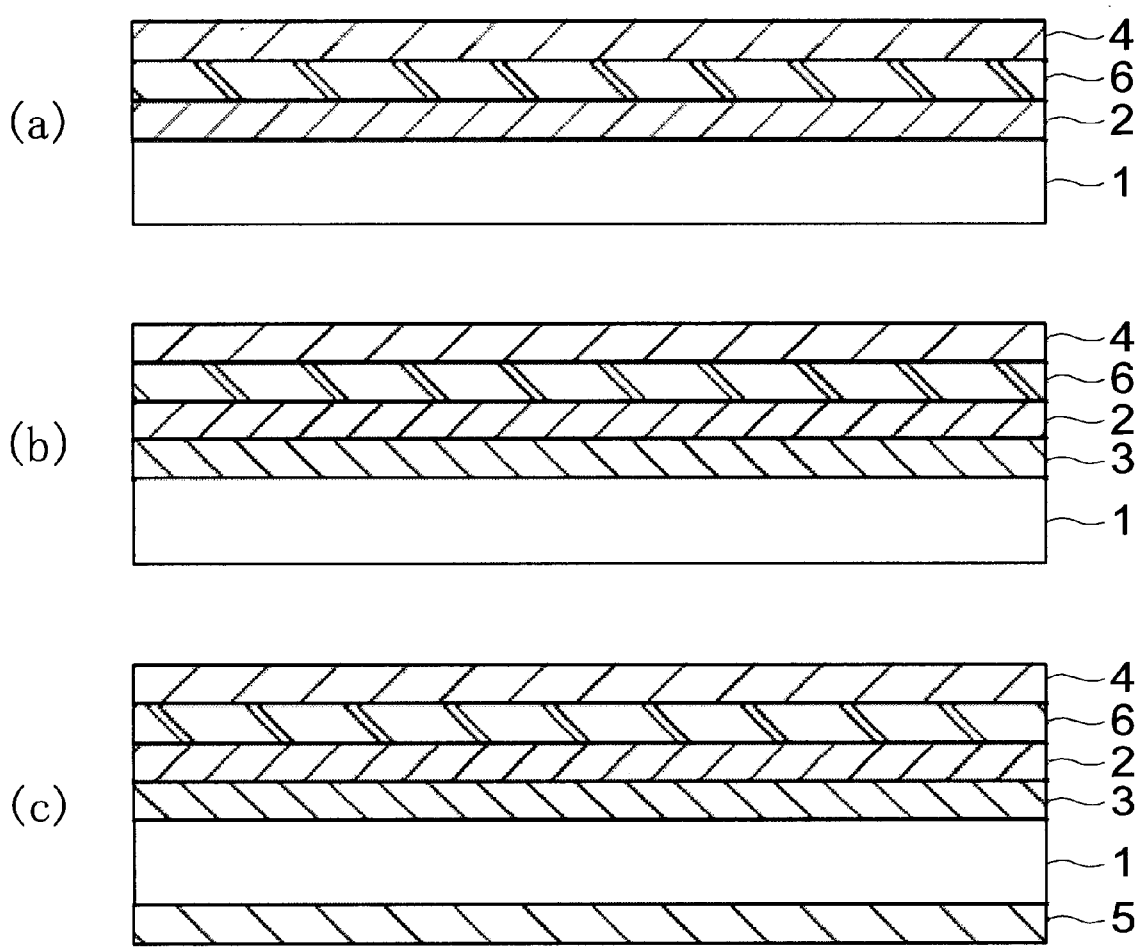
FIG. 2(a) to FIG. 2(c) are schematic cross-sectional views showing one constitution example of a medium for CD-R to which the optical recording medium of the present invention is applied.

FIG. 2 illustrates an example of another layer constitution which can be applied to the optical recording medium of the present invention. This is an example of CD-R medium. Over the recording layer 2 of the constitution as illustrated in FIG. 1, a metal reflective layer 6 is disposed.

Figure 3:
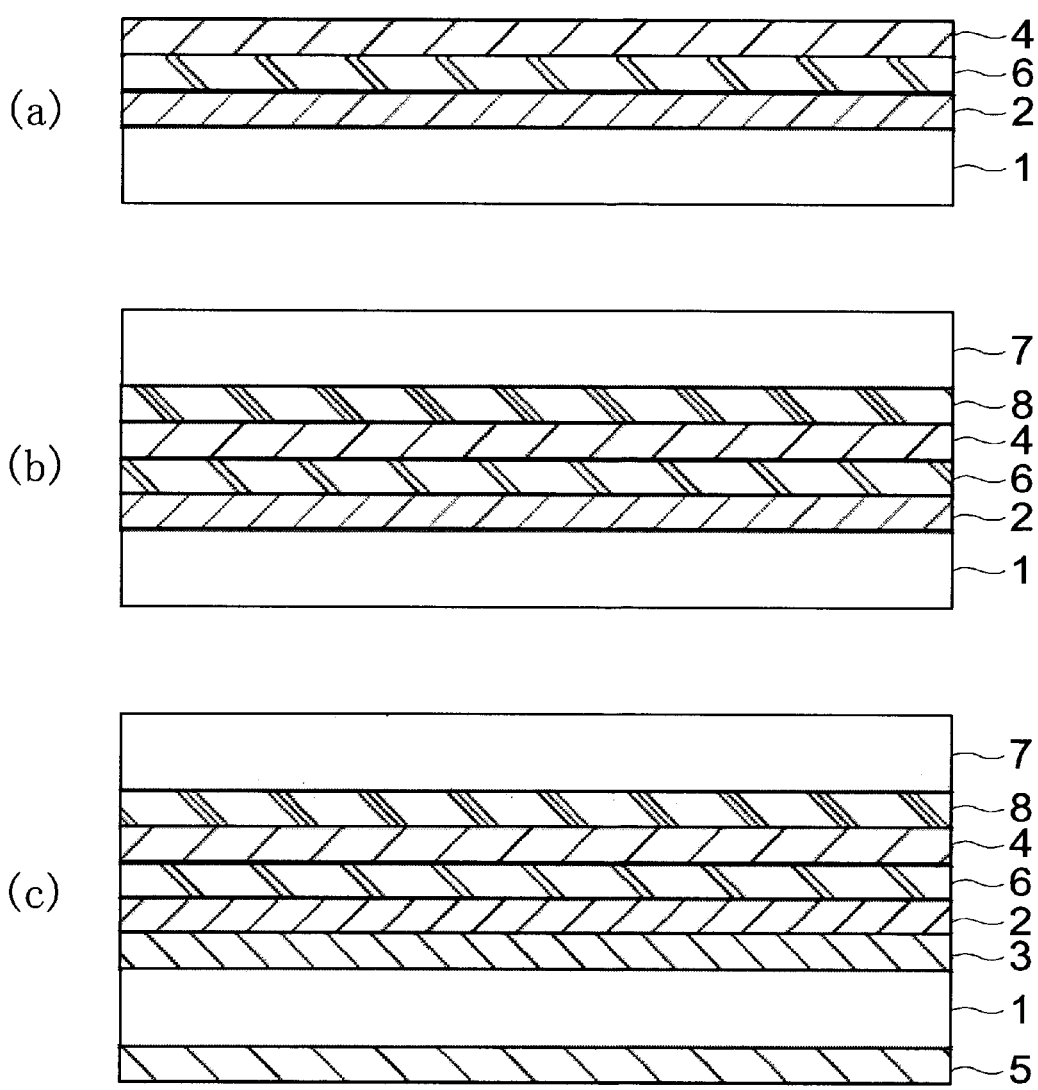
FIG. 3(a) to FIG. 3(c) are schematic cross-sectional views showing one constitution example of a medium for DVD-R to which the optical recording medium of the present invention is applied.

FIG. 3 illustrates an example of a further layer constitution (for DVD-R) which can be applied to the optical recording medium of the present invention. In this case, over the protective layer 4 of the constitution as illustrated in FIG. 2, an adhesive layer 8 and a protective substrate 7 are disposed.

The optical recording medium of the present invention can also be constructed as an air sandwiched structure by hermetically sealing, via another substrate and a space, any two of the above-mentioned recording media as illustrated in FIG. 1 and FIG. 2 with their respective recording layers being disposed inside, or by laminating and adhering the two recording media via the protective layer.

When the optical recording medium of the present invention is used as DVD-R, it has, as a basic structure, a structure having a first substrate and a second substrate adhered with an adhesive, while interposing a recording layer therebetween. The recording layer may be a single organic dye layer or may have an organic dye layer and a metal reflective layer stacked alternately in order to heighten reflective layer. The recording layer may be laid over a substrate while having an undercoat layer or a protective layer disposed therebetween or they may be stacked alternately for improving the performance. One of the most commonly employed structures comprises a first substrate, an organic dye layer, a metal reflective layer, a protective layer, an adhesive layer and a second substrate.

<Substrate>When recording or reproducing is carried out from the direction of the substrate, the substrate needs to be transparent to the employed laser beam. Such transparency is not required when recording or reproducing is carried out on the recording layer. In the present invention, when two substrates are used in the sandwiched form and one of these substrates is transparent, transparency of the other substrate is not necessary.

Examples of the material usable for the substrate include plastics such as polyester, acrylic resin, polyamide, polycarbonate resin, polyolefin resin, phenol resin, epoxy resin, and polyimide; glass; ceramics; and metals.

Guide grooves or guide pits for tracking may be formed on the surface of the substrate when the substrate is used alone, or on the surface of the first substrate when two substrates are used in the sandwiched structure. Furthermore, pre-formats for address signals may also be formed on the surface of the substrate.

<Recording Layer>

Information can be recorded in a recording layer by some optical changes in the recording layer caused by exposure to a laser beam. In the first optical recording medium of the present invention, the recording layer is required to contain a mixture of a squarylium metal chelate compound and an azo metal chelate compound comprising an azo compound expressed by the formula (A-I) and a metal; in the second optical recording medium of the present invention, the recording layer is required to contain a mixture of a squarylium metal chelate compound and an azo metal chelate compound comprising an azo compound expressed by the formula (B-1) and a metal; in the third optical recording medium of the present invention, the recording layer is required to contain a mixture of a squarylium metal chelate compound and a formazan metal chelate compound which comprises a formazan compound expressed by the formula (C-I) and/or another formazan compound expressed by the formula (C-2) and a metal; and in the fourth optical recording medium of the present invention, the recording layer is required to contain a mixture of a squarylium compound and a formazan metal chelate compound which comprises a formazan compound expressed by the formula (D-I) and/or another formazan compound expressed by the formula (D-2) and a metal.

The above-described compounds used in the present invention may be mixed with another organic dye, metal or metal compound or they may be laminated as layers in order to improve the optical properties, recording sensitivity, and signal characteristics.

Examples of the another organic dye include (poly) methine dye, naphthalocyanine dye, phthalocyanine dye, squarylium dye, croconium dye, pyrillium dye, naphthoquinone dye, anthraquinone (indanthrene) dye, xanthene dye, triphenylmethane dye, azulene dye, tetrahydrocholine dye, phenanthrene dye, and triphenothiazine dye. Further, metal complex compounds may be used. Examples of the metal and metal compound include In, Te, Bi, Se, Sb, Ge, Sn, Al, Be, TeO, SnO, As, and Cd.

They may be used in the dispersed and mixed form or laminated form.

With the above-described compounds used in the present invention, various materials, for example, polymers such as ionomer resin, polyamide resin, vinyl resin, natural polymers, silicone, and liquid rubber, and a silane coupling agent may be mixed in the dispersed form. In order to improve the properties of the recording layer, a stabilizer (for example, a transition metal complex), dispersant, flame retardant, lubricant, antistatic, surfactant and/or plasticizer can be used in combination.

The recording layer can be formed by an ordinarily employed method such as deposition, sputtering, CVD, or solution coating. For the solution coating, the above-described compounds and other materials are dissolved in an organic solvent and the resulting solution is coated by a conventional coating method such as spray coating, roller coating, dip coating, or spin coating.

Examples of the organic solvent used for forming a recording layer include alcohols such as methanol, ethanol, isopropanol and 2,2,3,3-tetrafluoropropanol; ketones such as acetone, methyl ethyl ketone, and cyclohexanone; amides such as N,N-dimethylformamide and N,N-dimethylacetamide; sulfoxides such as dimethyl sulfoxide; ethers such as tetrahydrofuran, dioxane, diethyl ether, and ethylene glycol monomethyl ether; esters such as methyl acetate and ethyl acetate; aliphatic halogenated hydrocarbons such as chloroform, methylene chloride, dichloroethane, carbon tetrachloride, and trichloroethane;

aromatic solvents such as benzene, xylene, monochlorobenzene, and dichlorobenzene; Cellosolves such as methoxy ethanol and ethoxy ethanol; and hydrocarbons such as hexane, pentane, cyclohexane, and methylcyclohexane.

The recording layer has preferably a thickness ranging from 100 Å to 10 µm, more preferably from 200 Å to 2000 Å.

<Undercoat Layer>

The undercoat layer is disposed for the purposes of: (1) improving the adhesion, (2) serving as a barrier layer against water or gases; (3) improving the shelf life of the recording layer, (4) increasing the reflectivity of the recording layer, (5) protecting the substrate from solvents, and (6) forming guide grooves, guide pits, pre-formats, and the like.

To attain the above-mentioned purpose (1), a variety of polymer compounds such as ionomer resin, polyamide resin, vinyl resin, natural resins, natural polymers, silicone, and liquid rubber; and silane coupling agents may be employed.

To attain the purposes (2) and (3), inorganic compounds such as SiO, $MgF_2$, $SiO_2$, $TiO_2$, ZnO, TiN, and SiN can be used as well as the above-described polymer materials. In addition, metals and semimetals such as Zn, Cu, Ni, Cr, Ge, Se, Au, Ag, and Al can be used.

To attain the purpose (4), metals such as Al, Au and Ag, and organic thin films having a metal luster such as methine dye and xanthene dye may be used. To attain the purposes (5) and (6), an ultraviolet-curing resin, a thermosetting resin, and a thermoplastic resin can be used.

The undercoat layer is formed to have a film thickness of 0.01 to 30 µm, preferably 0.05 to 10 µm.

<Metal Reflective Layer>

The metal reflective layer is made of a metal or semimetal exhibiting a high reflectivity even if it is used alone and is corrosion resistant. Specific examples of such a metal include Au, Ag, Cr, Ni, Al, Fe, and Sn. Of these metals, Au, Ag, and Al are particularly preferred in view of the reflectivity and the productivity. These metals and semimetals may be used either alone or in combination of two as an alloy. The metal reflective layer can be formed, for example, by deposition or sputtering. The reflective layer has a thickness of 50 to 5000 Å, more preferably 100 to 3000 Å.

<Protective Layer and Substrate-Surface Hard Coat Layer>

The protective layer and the substrate-surface hard coat layer are laid in order to (1) protect the recording layer (or the reflection absorbing layer) from scratches, dust, and contamination, (2) improve the shelf life of the recording layer (or the reflection absorbing layer), and (3) improve the reflectivity. To satisfy these purposes, materials similar to those used for the undercoat layer may be used. As inorganic materials, SiO and $SiO_2$ may be used. Examples of the organic material include heat softening resins, hot-melt resins and ultraviolet-curing resins such as poly(methyl acrylate), polycarbonate, epoxy resin, polystyrene, polyester resin, vinyl resin, cellulose, aliphatic hydrocarbon resin, natural rubber, styrene-butadiene resin, chloroprene rubber, wax, alkyd resin, drying oil, and rosin.

Of these, ultraviolet-curing resins are most preferred because of excellent productivity.

The protective layer or the substrate-surface hard coat layer has a thickness of 0.01 to 30 µm, preferably 0.05 to 10 µm. In the present invention, a stabilizer, dispersant, flame retardant, lubricant, antistatic, surfactant, and/or plasticizer may be incorporated in the undercoat layer, the protective layer, or the substrate-surface hard coat layer as in the case of the recording layer.

<Protective Substrate>

The protective substrate needs to be transparent to a laser light to which it is exposed. However, such transparency is unnecessary when the protective substrate is used only for protection. The materials for the protective substrate are utterly same as those for the substrate. For example, plastics such as polyester, acrylic resin, polyamide, polycarbonate resin, polyolefin resin, phenol resin, epoxy resin, and polyimide; glass; ceramics; and metals may be used.

<Adhesive and Adhesive Layer>

Any material can be used insofar as two recording media can be adhered therewith. From the viewpoint of the productivity, an ultraviolet-curing adhesive or hot-melt adhesive is preferred.

EXAMPLE A

Examples and Comparative Examples of the present invention will hereinafter be described, but the present invention is not limited to or by them. First, Examples of the first optical recording medium of the present invention will be described. Evaluation results of the optical recording media available by Examples and Comparative Examples are shown below in Table 24. Compounds to be used in Examples and Comparative Examples are those described in Tables 1 to 6.

Example A-1

Onto an injection-molded polycarbonate substrate having a thickness of 0.6 mm and being equipped with a guide groove with a depth of 1780 Å, a half bandwidth of 0.37 µm, and a track pitch of 0.74 µm, a solution obtained by dissolving a mixture of Compound (I-1) in the table and Compound (II-1) in the table (refer to Table 23 concerning a mixing ratio of them) in 2,2,3,3-tetrafluoropropanol was applied by a spinner, whereby an organic dye layer having a thickness of 900 Å was formed. A gold reflective layer of 1300 Å thick was then overlaid by sputtering, followed by the formation thereon of a protective layer of 6 µm thick by using an acrylic photopolymer. Another injection molded polycarbonate substrate of 0.6 mm thick was stacked over the protective layer and they were adhered with an acrylic photopolymer, whereby an optical recording medium was obtained.

Examples A-2 to A-10

In a similar manner to Example A-1 except for the use of raw materials in combination as shown in Table 23, optical recording media were formed.

Comparative Example 1

In a similar manner to Example A-1 except for the use of only Compound (I-15) in Table 2 which was a squarylium metal chelate compound, an optical recording medium was formed.

Comparative Example 2

In a similar manner to Example A-1 except for the use of only Compound (I-16) in Table 2 which was a squarylium compound, an optical recording medium was formed.

TABLE 23

(Mixing ratio of raw materials)

| | Raw materials *1 | |
|---|---|---|
| | Azo metal chelate compound | Squarylium metal chelate compound |
| Example A-1 | I-1 (50) | II-1 (50) |
| Example A-2 | I-2 (40) | II-2 (40), II-9 (20) |
| Example A-3 | I-1 (30), I-3 (20) | II-3 (50) |
| Example A-4 | I-4 (40) | II-4 (60) |
| Example A-5 | I-5 (30) | II-5 (70) |
| Example A-6 | I-6 (40) | II-6 (60) |
| Example A-7 | I-10 (60) | II-7 (40) |
| Example A-8 | I-16 (40) | II-4 (60) |
| Example A-9 | I-17 (50) | II-13 (50) |
| Example A-10 | I-18 (30) | II-15 (70) |
| Comp. Ex. 1 | — | II-15 (100) |
| Comp. Ex. 2 | — | II-16 (100) *2 |

*1: The numeral in parentheses is a weight ratio of the raw material,
*2: II-16 is a squarylium compound <Recording Conditions>
EFM signals (linear velocity: 3.5 m/sec) were recorded in each of these optical recording media in accordance with optimized multi-pulse strategy by exposing it to a semiconductor laser beam having a wavelength of 658 nm and a beam diameter of 0.9 μm, while tracking. The recorded signals were then reproduced using a continuous laser beam having a wavelength of 658 nm (power applied for reproduction: 0.7 mW). The reproduced waveform and jitter were measured.
<Conditions for Weather Resistance Test>
Light resistance test: 40000 Lux, Xe light, continuous exposure for 20 hours
Shelf life test: left at 60° C. and 90% RH for 600 hours recording media available by Examples and Comparative Examples are shown below in Table 26. Compounds to be used in Examples and Comparative Examples are those described in Tables 7 to 10 and Tables 3 to 6, respectively.

Example B-1

Onto an injection-molded polycarbonate substrate having a thickness of 0.6 mm and being equipped with a guide groove with a depth of 1740 Å, a half bandwidth of 0.36 μm, and a track pitch of 0.74 μm, a solution obtained by dissolving a mixture of Compound (I'-1) and Compound (II-1) (refer to Table 25 concerning a mixing ratio of them) in 2,2,3,3-tetrafluoropropanol was applied by a spinner, whereby an organic dye layer having a thickness of 900 Å was formed. A gold reflective layer of 1300 Å thick was then overlaid by sputtering, followed by the formation thereon of a protective layer of 6 μm thick by using an acrylic photopolymer. Another injection molded polycarbonate substrate of 0.6 mm thick was stacked over the protective layer and they were adhered with an acrylic photopolymer, whereby an optical recording medium was obtained.

Examples B-2 to B-10

In a similar manner to Example B-1 except for the use of raw materials in combination as shown in Table 25, an optical recording media were formed.

Comparative Example 1

In a similar manner to Example 1 except for the use of only Compound (II-15) in Table 5 which was a squarylium metal chelate compound, an optical recording medium was formed.

TABLE 24

(Evaluation results)

| | Initial value | | | After light resistance test | | | After shelf life test | | |
|---|---|---|---|---|---|---|---|---|---|
| | Reflectivity (%) | Modulation (%) | Jitter (%) | Reflectivity (%) | Modulation (%) | Jitter (%) | Reflectivity (%) | Modulation (%) | Jitter (%) |
| Ex. A-1 | 50 | 65 | 7.7 | 50 | 66 | 7.6 | 50 | 66 | 7.7 |
| Ex. A-2 | 49 | 64 | 7.6 | 49 | 64 | 7.7 | 49 | 65 | 7.6 |
| Ex. A-3 | 49 | 66 | 7.8 | 49 | 65 | 7.7 | 49 | 66 | 7.8 |
| Ex. A-4 | 49 | 63 | 7.9 | 49 | 63 | 7.9 | 49 | 64 | 7.9 |
| Ex. A-5 | 50 | 62 | 7.6 | 50 | 63 | 7.6 | 50 | 62 | 7.6 |
| Ex. A-6 | 49 | 68 | 7.5 | 49 | 68 | 7.7 | 49 | 69 | 7.5 |
| Ex. A-7 | 49 | 69 | 7.7 | 49 | 69 | 7.8 | 49 | 69 | 7.7 |
| Ex. A-8 | 49 | 67 | 7.8 | 49 | 67 | 7.8 | 49 | 67 | 7.8 |
| Ex. A-9 | 49 | 66 | 7.6 | 49 | 66 | 7.7 | 49 | 67 | 7.6 |
| Ex. A-10 | 51 | 64 | 7.7 | 51 | 64 | 7.8 | 51 | 64 | 7.7 |
| Comp. Ex. 1 | 52 | 62 | 7.8 | 46 | 58 | 8.9 | 51 | 60 | 8.1 |
| Comp. Ex. 2 | 50 | 63 | 7.9 | Irreproducible | Irreproducible | Irreproducible | 47 | 60 | 8.5 |

EXAMPLE B

Examples and Comparative Examples of the second optical recording media according to the present invention will hereinafter be described. Evaluation results of the optical Comparative Example 2

In a similar manner to Example B-1 except for the use of only Compound (II-16) in Table 5 which was a squarylium compound, an optical recording medium was formed.

TABLE 25

(Dye mixing ratio)

| | Raw materials *1 | |
|---|---|---|
| | Azo metal chelate compound | Squarylium metal chelate compound |
| Example B-1 | I'-1 (40) | II-1 (60) |
| Example B-2 | I'-2 (40) | II-2 (40), B-II-9 (20) |
| Example B-3 | I'-1 (30), I'-3 (20) | II-3 (50) |
| Example B-4 | I'-4 (50) | II-4 (50) |
| Example B-5 | I'-5 (30) | II-5 (70) |
| Example B-6 | I'-6 (40) | II-6 (60) |
| Example B-7 | I'-10 (60) | II-7 (40) |
| Example B-8 | I'-16 (40) | II-4 (60) |
| Example B-9 | I'-17 (50) | II-13 (50) |
| Example B-10 | I'-18 (30) | II-15 (70) |
| Comp. Ex. 1 | — | II-15 (100) |
| Comp. Ex. 2 | — | II-16 (100) *2 |

*1: The numeral in parentheses is a weight ratio of the raw material,
*2: II-16 is a squarylium compound <Recording Conditions>

EFM signals (linear velocity: 3.5 m/sec) were recorded in each of these optical recording media in accordance with optimized multi-pulse strategy by exposing it to a semiconductor laser beam having a wavelength of 658 nm and a beam diameter of 0.9 μm, while tracking. The recorded signals were then reproduced using a continuous laser beam having a wavelength of 658 nm (power applied for reproduction: 0.7 mW). The reproduced waveform and jitter were measured.

<Conditions for Weather Resistance Test>

Light resistance test: 40000 Lux, Xe light, continuous exposure for 20 hours

Shelf life test: left at 60° C. and 90% RH for 600 hours

Example C-1

Onto an injection-molded polycarbonate substrate having a thickness of 0.6 mm and being equipped with a guide groove with a depth of 1750 Å, a half bandwidth of 0.25 μm, and a track pitch of 0.74 μm, a solution obtained by dissolving a mixture of Compound (S-4) in Table 14 and Compound (H-4) in Table 11 (refer to Table 27 concerning a mixing ratio of them) in 2,2,3,3-tetrafluoropropanol was applied by a spinner, whereby an organic dye layer having a thickness of 1000 Å was formed. A reflective layer of 1300 Å thick was then overlaid by sputtering, followed by the formation thereon of a protective layer of 5 μm thick by using an acrylic photopolymer. Another injection molded polycarbonate substrate of 0.6 mm thick was stacked over the protective layer and they were adhered with an acrylic photopolymer, whereby an optical recording medium was obtained.

Examples C-2 to C-10

In a similar manner to Example 1 except for the use of raw materials in combination as shown in Table 27, optical recording media were formed.

Comparative Example 1

In a similar manner to Example 1 except for the use of only Compound (S-1) in Table 14 which was a squarylium metal chelate compound, an optical recording medium was formed.

Evaluation results of these optical recording media are shown in Table 27.

<Recording Conditions>

EFM signals (linear velocity: 3.5 m/sec) were recorded in each of these optical recording media by exposing it to a

TABLE 26

(Evaluation results)

| | Initial value | | | After light resistance test | | | After shelf life test | | |
|---|---|---|---|---|---|---|---|---|---|
| | Reflectivity (%) | Modulation (%) | Jitter (%) | Reflectivity (%) | Modulation (%) | Jitter (%) | Reflectivity (%) | Modulation (%) | Jitter (%) |
| Ex. B-1 | 51 | 63 | 7.8 | 51 | 63 | 7.8 | 51 | 63 | 7.8 |
| Ex. B-2 | 51 | 62 | 7.8 | 51 | 62 | 7.8 | 51 | 62 | 7.8 |
| Ex. B-3 | 50 | 64 | 7.8 | 50 | 64 | 7.8 | 50 | 64 | 7.8 |
| Ex. B-4 | 50 | 63 | 7.9 | 49 | 63 | 7.9 | 50 | 63 | 7.9 |
| Ex. B-5 | 50 | 62 | 7.7 | 50 | 62 | 7.7 | 50 | 62 | 7.8 |
| Ex. B-6 | 50 | 64 | 7.5 | 50 | 65 | 7.5 | 50 | 64 | 7.5 |
| Ex. B-7 | 52 | 65 | 7.7 | 52 | 65 | 7.8 | 52 | 65 | 7.7 |
| Ex. B-8 | 52 | 62 | 7.8 | 52 | 62 | 7.8 | 52 | 62 | 7.8 |
| Ex. B-9 | 50 | 61 | 7.6 | 52 | 61 | 7.6 | 50 | 61 | 7.6 |
| Ex. B-10 | 51 | 63 | 7.4 | 51 | 63 | 7.5 | 51 | 63 | 7.5 |
| Comp. Ex. 1 | 52 | 62 | 7.8 | 46 | 58 | 8.9 | 51 | 60 | 8.1 |
| Comp. Ex. 2 | 50 | 63 | 7.9 | Irreproducible | Irreproducible | Irreproducible | 47 | 60 | 8.5 |

EXAMPLE C

Examples and Comparative Examples of the third optical recording media according to the present invention will hereinafter be described more specifically. Compounds to be used in Examples and Comparative Examples are those described in Tables 11 to 16.

semiconductor laser beam having a wavelength of 658 nm and a beam diameter of 1.0 μm, while tracking. The recorded signals were then reproduced using a continuous laser beam having a wavelength of 658 nm (power applied for reproduction: 0.7 mW). The reproduced waveform was observed.

<Conditions for Weather Resistance Test>

Light resistance test: 40000 Lux, Xe light, continuous exposure for 20 hours

Shelf life test: left at 50° C. and 80% RH for 800 hours
(Evaluation Results)

TABLE 27

| | Raw materials* | | Initial value | | After light resistance test | | After shelf life test | |
|---|---|---|---|---|---|---|---|---|
| | Squarylium metal chelate compound | Formazan compound | Reflectivity (%) | Modulation (%) | Reflectivity (%) | Modulation (%) | Reflectivity (%) | Modulation (%) |
| Ex. C-1 | S-4 (60) | H-4 (40) | 53 | 66 | 52 | 67 | 52 | 65 |
| Ex. C-2 | S-8 (80) | H-11 (20) | 57 | 63 | 56 | 64 | 56 | 65 |
| Ex. C-3 | S-17 (50) | H-9 (50) | 47 | 69 | 48 | 68 | 47 | 68 |
| Ex. C-4 | S-6 (75) | H-7 (25) | 55 | 62 | 54 | 64 | 54 | 64 |
| Ex. C-5 | S-1 (60) | H-12 (40) | 50 | 65 | 51 | 64 | 51 | 65 |
| Ex. C-6 | S-5 (90) | H-3 (10) | 55 | 63 | 53 | 64 | 53 | 65 |
| Ex. C-7 | S-12 (80) | H-6 (20) | 54 | 64 | 55 | 63 | 54 | 64 |
| Ex. C-8 | S-18 (70) | H-9 (30) | 52 | 65 | 52 | 63 | 51 | 64 |
| Ex. C-9 | S-13 (60) | H-8 (40) | 54 | 65 | 53 | 65 | 54 | 65 |
| Ex. C-10 | S-12 (75) | H-13 (25) | 51 | 66 | 51 | 67 | 49 | 67 |
| Comp. Ex. 1 | S-1 (100) | — | 57 | 63 | 47 | 65 | 46 | 65 |

*The numeral in parentheses is a weight ratio of the raw material

EXAMPLE D

Examples and Comparative Examples of the fourth optical recording media according to the present invention will hereinafter be described more specifically. Evaluation results of the optical recording media available by these Examples and Comparative Examples are shown in Table 28. Compounds used in Examples and Comparative Examples are those described in Tables 17 to 22.

Example D-1

Onto an injection-molded polycarbonate substrate having a thickness of 0.6 mm and being equipped with a guide groove with a depth of 1750 Å, a half bandwidth of 0.25 µm, and a track pitch of 0.74 µm, a solution obtained by dissolving a mixture of Compound (H'-5) in Table 17 and Compound (S'-3) in Table 20 (refer to Table 28 concerning a mixing ratio of them) in 2,2,3,3-tetrafluoropropanol was applied by a spinner, whereby an organic dye layer having a thickness of 1000 Å was formed. A gold reflective layer of 1300 Å thick was then overlaid by sputtering, followed by the formation thereon of a protective layer of 5 µm thick by using an acrylic photopolymer. Another injection molded polycarbonate substrate of 0.6 mm thick was stacked over the protective layer and they were adhered with an acrylic photopolymer, whereby an optical recording medium was obtained.

Examples D-2 to D-10

In a similar manner to Example D-1 except for the use of dye mixtures as described in Table 28, optical recording media were formed.

Comparative Example 1

In a similar manner to Example D-1 except for the use of only Compound (S'-2) in Talbe 20 which was a squarylium compound, an optical recording medium was formed.

<Recording Conditions>

EFM signals (linear velocity: 3.5 m/sec) were recorded in each of these optical recording media by exposing it to a semiconductor laser beam having a wavelength of 658 nm and a beam diameter of 1.0 µm, while tracking. The recorded signals were then reproduced using a continuous laser beam having a wavelength of 658 nm (power applied for reproduction: 0.7 mW). The reproduced waveform was observed.

<Conditions for Weather Resistance Test>

Light resistance test: 40000 Lux, Xe light, continuous exposure for 10 hours

Shelf life test: left at 50° C. and 80% RH for 800 hours

TABLE 28

(Evaluation results)

| | Raw materials* | | Initial value | | After light resistance test | | After shelf life test | |
|---|---|---|---|---|---|---|---|---|
| | Squarylium compound | Formazan compound | Reflectivity (%) | Modulation (%) | Reflectivity (%) | Modulation (%) | Reflectivity (%) | Modulation (%) |
| Ex. D-1 | S'-3 (50) | H'-5 (50) | 47 | 68 | 48 | 67 | 48 | 68 |
| Ex. D-2 | S'-7 (80) | H'-12 (20) | 55 | 63 | 56 | 65 | 56 | 65 |
| Ex. D-3 | S'-12 (60) | H'-8 (40) | 52 | 65 | 52 | 66 | 53 | 67 |
| Ex. D-4 | S'-8 (90) | H'-6 (10) | 55 | 62 | 54 | 64 | 54 | 63 |
| Ex. D-5 | S'-9 (75) | H'-11 (25) | 53 | 65 | 53 | 66 | 54 | 65 |
| Ex. D-6 | S'-5 (60) | H'-1 (40) | 51 | 66 | 52 | 66 | 52 | 65 |
| Ex. D-7 | S'-10 (80) | H'-5 (20) | 57 | 63 | 58 | 63 | 57 | 64 |
| Ex. D-8 | S'-3 (90) | H'-7 (10) | 58 | 64 | 57 | 63 | 58 | 63 |
| Ex. D-9 | S'-16 (75) | H'-9 (25) | 56 | 62 | 57 | 63 | 57 | 62 |

TABLE 28-continued (Evaluation results)

| | Raw materials* | | Initial value | | After light resistance test | | After shelf life test | |
|---|---|---|---|---|---|---|---|---|
| | Squarylium compound | Formazan compound | Reflectivity (%) | Modulation (%) | Reflectivity (%) | Modulation (%) | Reflectivity (%) | Modulation (%) |
| Ex. D-10 | S'-11 (60) | H'-8 (40) | 49 | 66 | 49 | 68 | 49 | 67 |
| Comp. Ex. 1 | S'-2 (100) | — | 59 | 62 | 47 | 65 | 47 | 64 |

*The numeral in parentheses is a weight ratio of the raw material

What is claimed is:

1. An optical recording medium comprising a substrate and at least a recording layer disposed on the substrate, the recording layer comprising:

at least one squarylium metal chelate compound which comprises a squarylium compound and a metal; and at least one azo metal chelate compound which comprises another metal and an azo compound expressed by the following formula (A-I):

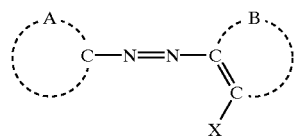

where A and B each independently express a residue forming one of a) a heterocyclic ring which may have a substituent and b) an aromatic ring which may have a substituent, by combination with the bonded to A and B, respectively, carbon atoms, and X expresses an active-hydrogen-containing substituent group.

2. The optical recording medium according to claim 1, wherein a contained amount of the squarylium metal chelate compound and the azo metal chelate compound are contained in the recording layer at a weight ratio ranging from 90:10 to 20:80.

3. The optical recording medium according to claim 1, wherein the metal atom in the azo metal chelate compound is at least one metal atom selected from the group consisting of manganese, cobalt, nickel and copper.

4. The optical recording medium according to claim 1, wherein the azo metal chelate compound is ionized and forms a salt with another compound ion.

5. The optical recording medium according to claim 4, wherein the another compound ion has an amino group.

6. The optical recording medium according to claim 1, wherein the squarylium metal chelate compound is expressed by the following formula (A-II):

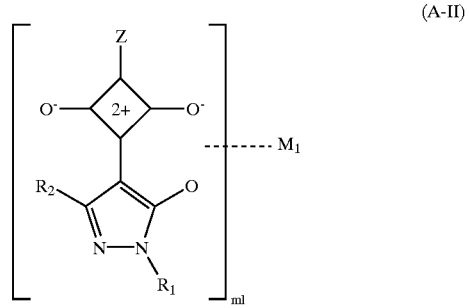

where, $R_1$ and $R_2$ are substituent groups which may be the same or may be different, and each expresses a hydrogen atom, an alkyl group which may have a substituent, an aralkyl group which may have a substituent, an aryl group which may have a substituent, or a heterocyclic group which may have a substituent; $M_1$ expresses a metal atom having a coordination capacity; Z expresses an aryl group which may have a substituent, a heterocyclic group which may have a substituent, or Y=CH— (Y expresses a heterocyclic group which may have a substituent); and m1 stands for an integer of 2 or 3.

7. The optical recording medium according to claim 6, wherein Z in the formula (A-II) is expressed by the following formula (A-II-II):

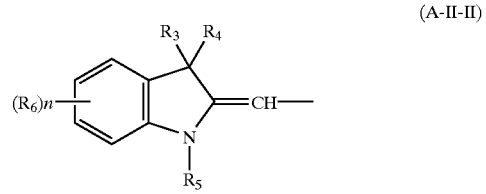

where, $R_3$ and $R_4$ may be the same or may be different and each expresses an alkyl group which may have a substituent, or $R_3$ and $R_4$ may form an alicyclic hydrocarbon ring or a heterocyclic ring by combination with the adjacent carbon atom; $R_5$ expresses a hydrogen atom, an alkyl group which may have a substituent; and an aralkyl group which may have a substituent, or an aryl group which may have a substituent; $R_6$ expresses a halogen atom, an alkyl group which may have a substituent, an aralkyl group which may have a substituent, an aryl group which may have a substituent, a nitro group, a cyano group, or an alkoxy group which may have a substituent, n stands for an integer of 0 to 4, with the proviso that when n stands for 2 to 4, $R_6$ may be the same or may be different from each other and by combination with the adjacent two carbon atoms may form an aromatic ring which may have a substituent.

8. The optical recording medium according to claim 6, wherein M₁ expresses aluminum.

9. The optical recording medium according to claim 1, wherein a refractive index (n) of a single layer of the recording layer is 1.5≦n≦3.0, and an extinction coefficient (k) is 0.02≦k≦0.3 against a light having a wavelength in the range of recording or reproducing wavelength ±5 nm.

10. The optical recording medium according to claim 1, further comprising a reflective layer containing gold, silver, copper, aluminum or an alloy thereof.

11. The optical recording medium according to claim 1, wherein a track pitch on the substrate falls within a range of 0.7 to 0.8 μm, and a groove width at a half bandwidth falls within a range of 0.18 to 0.40 μm.

12. The optical recording medium according to claim 1, wherein the optical recording medium is recordable at a wavelength of 600 to 720 nm.

13. An optical recording medium comprising a substrate and at least a recording layer disposed on the substrate, the recording layer comprising:

at least one squarylium metal chelate compound which comprises a squarylium compound and a metal; and at least one azo metal chelate compound which comprises another metal and an azo compound expressed by the following formula (B-I):

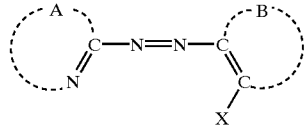

(B-I)

where A expresses a residue forming a heterocyclic ring which may have a substituent by combination with both the carbon atom and the nitrogen atom bonded to A, and B expresses a residue forming one of a) an aromatic ring which may have a substituent and b) a heterocyclic ring which may have a substituent, by combination with the two carbon atoms bonded to B, and X expresses an active-hydrogen-containing substituent group.

14. The optical recording medium according to claim 13, wherein the squarylium metal chelate compound and the azo metal chelate compound are contained in the recording layer at a weight ratio of 90:10 to 20:80.

15. The optical recording medium according to claim 13, wherein the metal atom in the azo metal chelate compound is at least one metal atom selected from the group consisting of manganese, cobalt, nickel and copper.

16. The optical recording medium according to claim 13, wherein the squarylium metal chelate compound is expressed by the following formula (A-II):

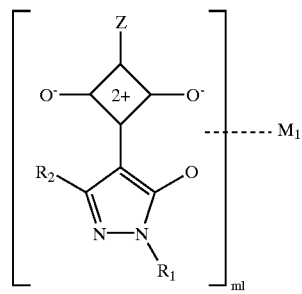

(A-II)

where, R₁ and R₂ are substituent groups which may be the same or may be different, and each expresses a hydrogen atom, an alkyl group which may have a substituent, an aralkyl group which may have a substituent, an aryl group which may have a substituent or a heterocyclic group which may have a substituent; M₁ expresses a metal atom having a coordination capacity; Z expresses an aryl group which may have a substituent, a heterocyclic group which may have a substituent, or Y=CH— (Y expresses a heterocyclic group which may have a substituent); and m1 stands for an integer of 2 or 3.

17. The optical recording medium according to claim 16, wherein Z in the formula (A-II) is expressed by the following formula (A-II-II):

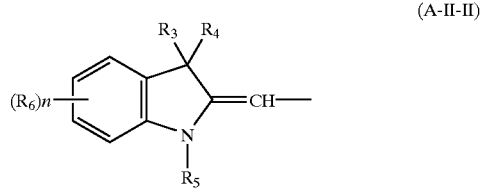

(A-II-II)

where, R₃ and R₄ may be the same or may be different and each expresses an alkyl group which may have a substituent, or R₃ and R₄ may form an alicyclic hydrocarbon ring or a heterocyclic ring by combination with the adjacent carbon atom; R₅ expresses a hydrogen atom, an alkyl group which may have a substituent, an aralkyl group which may have a substituent or an aryl group which may have a substituent; R₆ expresses a halogen atom, an alkyl group which may have a substituent, an aralkyl group which may have a substituent, an aryl group which may have a substituent, a nitro group, a cyano group, or an alkoxy group which may have a substituent; and n stands for an integer of 0 to 4, with the proviso that when n stands for 2 to 4, R₆ may be the same or may be different from each other and by combination with the adjacent two carbon atoms may form an aromatic ring which may have a substituent.

18. The optical recording medium according to claim 16, wherein M₁ expresses aluminum.

19. The optical recording medium according to claim 13, wherein a refractive index (n) of a single layer of the recording layer is 1.5≦n≦3.0 and an extinction coefficient (k) is 0.02≦k≦0.3 against the light having a wavelength in the range of a recording or reproducing wavelength ±5 nm.

20. The optical recording medium according to claim 13, further comprising a reflective layer containing gold, silver, copper, aluminum or an alloy thereof.

21. The optical recording medium according to claim 13, wherein a track pitch on the substrate falls within a range of 0.7 to 0.8 μm, and groove width at a half bandwidth falls within a range of 0.18 to 0.40 μm.

22. The optical recording medium according to claim 13, wherein the optical recording medium is recordable at a wavelength of 600 to 720 nm.

23. An optical recording medium comprising a substrate and at least a recording layer disposed on the substrate, the recording layer comprising:
at least one squarylium metal chelate compound which comprises a squarylium compound and a metal; and
at least one formazan metal chelate compound which comprises another metal and at least one of formazan compounds expressed by one of the following formula (C-I) or (C-II):

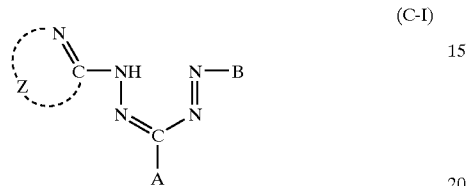

(C-I)

where, Z expresses a residue forming a 5-membered or 6-membered nitrogen-containing heterocyclic ring which may have a substituent by combination with the carbon atom and the nitrogen atom bonded to Z, and may be condensed with another aromatic ring; A expresses an alkyl group which may have a substituent, an aryl group which may have a substituent, an alkylcarbonyl group which may have a substituent, an arylcarbonyl group which may have a substituent, an alkenyl group which may have a substituent, a heterocyclic ring residue which may have a substituent, or an alkoxycarbonyl group which may have a substituent; and B expresses an alkyl group which may have a substituent, an alkenyl group which may have a substituent, or an aryl group which may have a substituent;

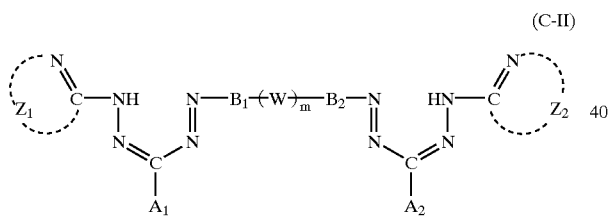

(C-II)

where, $Z_1$ and $Z_2$ each express a residue forming a 5-membered or 6-membered nitrogen-containing heterocyclic ring which may have a substituent by combination with both the carbon atom and the nitrogen atom bonded to $Z_1$ and $Z_2$, respectively, and may be condensed with another aromatic ring; $A_1$ and $A_2$ each independently expresses an alkyl group which may have a substituent, an aryl group which may have a substituent, an alkylcarbonyl group which may have a substituent, an arylcarbonyl group which may have a substituent, an alkenyl group which may have a substituent, a heterocyclic ring residue which may have a substituent, or an alkoxycarbonyl group which may have a substituent; $B_1$ and $B_2$ each independently express an alkylene group which may have a substituent or an arylene group which may have a substituent; W expresses —$CH_2$— or —$SO_2$—; and n stands for an integer of 0 or 1.

24. The optical recording medium according to claim 23, wherein the squarylium metal chelate compound and the formazan metal chelate compound are contained in the recording layer at a weight ratio of 90:10 to 50:50.

25. The optical recording medium according to claim 23, wherein the metal atom in the formazan metal chelate compound is at least one metal atom selected from the group consisting of vanadium, manganese, iron, cobalt, nickel, copper, zinc and palladium, and oxides or halides thereof.

26. The optical recording medium according to claim 23, wherein the squarylium metal chelate compound is expressed by the following formula (A-II):

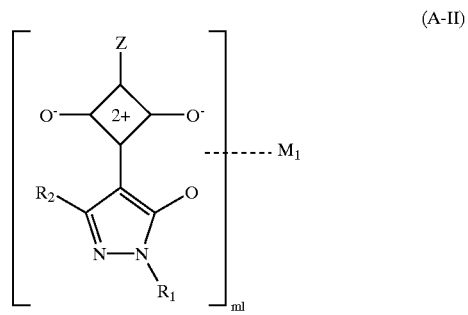

(A-II)

where, $R_1$ and $R_2$ are substituent groups which may be the same or may be different, and each expresses a hydrogen atom, an alkyl group which may have a substituent, an aralkyl group which may have a substituent, an aryl group which may have a substituent, or a heterocyclic group which may have a substituent; $M_1$ expresses a metal atom having a coordination capacity; Z expresses an aryl group which may have a substituent, a heterocyclic group which may have a substituent, or Y=CH— (Y representing a heterocyclic group which may have a substituent); and m1 stands for an integer of 2 or 3.

27. The optical recording medium according to claim 26, wherein Z in the formula (A-II) is expressed by the following formula (A-II-II):

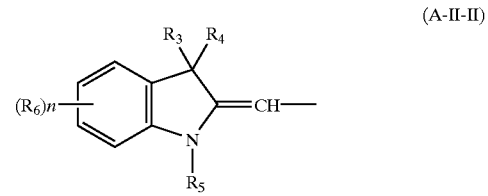

(A-II-II)

where, $R_3$ and $R_4$ may be the same or may be different and each expresses an alkyl group which may have a substituent, or $R_3$ and $R_4$ form an alicyclic hydrocarbon ring or a heterocyclic ring by combination with the adjacent carbon atom; $R_5$ expresses a hydrogen atom, an alkyl group which may have a substituent, an aralkyl group which may have a substituent, or an aryl group which may have a substituent; $R_6$ expresses a halogen, atom, an alkyl group which may have a substituent, an aralkyl group which may have a substituent, an aryl group which may have a substituent, a nitro group, a cyano group, or an alkoxy group which may have a substituent; and n stands for an integer of 0 to 4, with the proviso that when n stands for 2 to 4, $R_6$ may be the same or may be different from each other and may form an aromatic ring which may have a substituent by combination with the adjacent two carbon atoms.

28. The optical recording medium according to claim 26, wherein $M_1$ expresses aluminum.

29. The optical recording medium according to claim 23, wherein a refractive index (n) of a single layer of the recording layer is $1.5 \leq n \leq 3.0$ and an extinction coefficient (k) is $0.02 \leq k \leq 0.3$ against the light having a wavelength in the range of a recording or reproducing wavelength ±5 nm.

30. The optical recording medium according to claim 23, further comprising a reflective layer containing gold, silver, copper, aluminum, or an alloy thereof.

31. The optical recording medium according to claim 23, wherein a track pitch on the substrate falls within a range of 0.7 to 0.8 μm, and a groove width at a half bandwidth falls within a range of 0.18 to 0.40 μm.

32. The optical recording medium according to claim 23, wherein the optical recording medium is recordable at a wavelength of 600 to 720 nm.

33. An optical recording medium comprising a substrate and at least a recording layer disposed on the substrate, the recording layer comprising:
at least one squarylium compound; and
at least one formazan metal chelate compound which comprises a metal and at least one of formazan compounds expressed by one of the following formula (D-I) or (D-II):

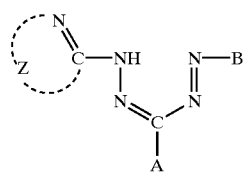

(D-I)

where, Z expresses a residue forming a 5-membered or 6-membered nitrogen-containing heterocyclic ring which may have a substituent by combination with both the carbon atom and the nitrogen atom bonded to Z, and may be condensed with another aromatic ring; A expresses an alkyl group which may have a substituent, an aryl group which may have a substituent, an alkylcarbonyl group which may have a substituent, an arylcarbonyl group which may have a substituent, an alkenyl group which may have a substituent, a heterocyclic ring residue which may have a substituent, or an alkoxycarbonyl group which may have a substituent; and B expresses an alkyl group which may have a substituent, or aryl group which may have a substituent;

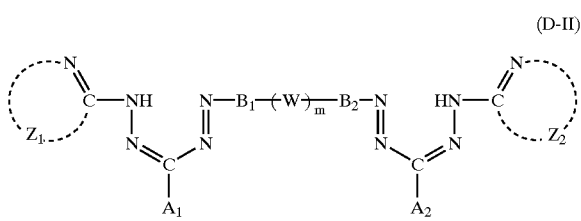

(D-II)

where, $Z_1$ and $Z_2$ each express a residue forming a 5-membered or 6-membered nitrogen-containing heterocyclic ring which may have a substituent by combination with both the carbon atom and the nitrogen atom bonded to $Z_1$ and $Z_2$, respectively, and may be condensed with another aromatic ring; $A_1$ and $A_2$ each independently express an alkyl group which may have a substituent, an aryl group which may have a substituent, an alkylcarbonyl group which may have a substituent, an arylcarbonyl group which may have a substituent, an alkenyl group which may have a substituent, a heterocyclic ring residue which may have a substituent, or an alkoxycarbonyl group which may have a substituent; $B_1$ and $B_2$ each independently express an alkylene group which may have a substituent or an arylene group which may have a substituent; W expresses —$CH_2$— or —$SO_2$—; and m stands for an integer of 0 or 1.

34. The optical recording medium according to claim 33, wherein the squarylium compound and the formazan metal chelate compound are contained in the recording layer at a weight ratio of 90:10 to 50:50.

35. The optical recording medium according to claim 33, wherein the metal atom in the formazan metal chelate compound is at least one metal atom selected from the group consisting of vanadium, manganese, iron, cobalt, nickel, copper, zinc and palladium, and oxides or halides thereof.

36. The optical recording medium according to claim 33, wherein the squarylium compound is at least one of the compounds expressed by one of the following formulae (D-III) and (D-VI):

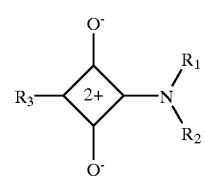

(D-III)

where, $R_1$ and $R_2$ may be the same or may be different, and each expresses a hydrogen atom, an alkyl group which may have a substituent, an aralkyl group which may have a substituent, an aryl group which may have a substituent, or a heterocyclic ring residue which may have a substituent, or $R_1$ and $R_2$ may form a heterocyclic ring which may have a substituent by combination with the adjacent nitrogen atom; and $R_3$ is a group expressed by one of the following formulae (D-IV) and (D-V):

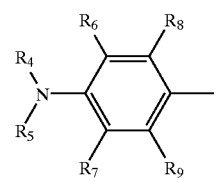

(D-IV)

where, $R_4$ and $R_5$ may be the same or may be different and each expresses a hydrogen atom or an alkyl group which may have a substituent, or $R_4$ and $R_5$ may form a heterocyclic ring which may have a substituent by combination with the adjacent nitrogen atom; and $R_6$, $R_7$, $R_8$ and $R_9$ may be the same or may be different and each expresses a hydrogen atom, an alkyl group which may have a substituent, an alkoxy group which may have a substituent, a hydroxyl group or a halogen atom, and a pair $R_4$ and $R_6$ or a pair $R_5$ and $R_7$ may form a nitrogen-containing heterocyclic ring by combination with the adjacent N—C—C, which may have a substituent:

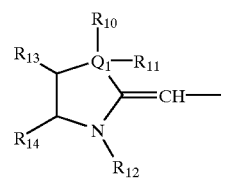

(D-V)

where, $Q_1$ expresses a carbon atom or a nitrogen atom, $R_{10}$ and $R_{11}$ may be the same or may be different and each expresses a hydrogen atom an alkyl group which may have a substituent, an aryl group which may have a substituent, an aralkyl group which may have a substituent or a hydroxyl group, with the proviso that when $Q_1$ expresses a nitrogen atom, $R_{11}$ does not exist; $R_{12}$ expresses a hydrogen atom, an alkyl group which may have a substituent, an aryl group which may have a substituent or an aralkyl group which may have a substituent; $R_{13}$ and $R_{14}$ may be the same or may be different and each expresses a hydrogen atom, an alkyl group which may have a substituent, an alkoxy group which may have a substituent or a halogen atom, or $R_{13}$ and $R_{14}$ may form an alicyclic hydrocarbon ring, an aromatic ring which may have a substituent, or a heterocyclic ring which may have a substituent by combination with the adjacent two carbon atoms;

(D-VI)

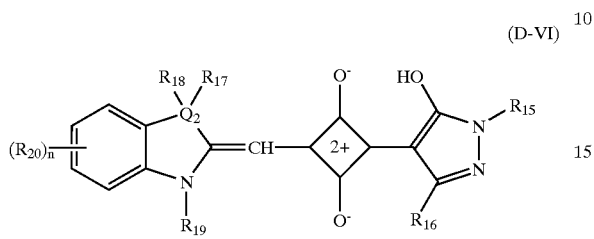

where, $Q_2$ expresses a carbon atom or a nitrogen atom; $R_{15}$ expresses a hydrogen atom, an alkyl group which may have a substituent, an aryl group which may have a substituent or a heterocyclic group which may have a substituent; $R_{16}$ expresses a hydrogen atom, a halogen atom, an alkyl group which may have a substituent, an alkoxy group which may have a substituent, an aralkyl group which may have a substituent, an aryl group which may have a substituent, an amino group which may have a substituent or a heterocyclic group which may have a substituent; $R_{17}$ and $R_{18}$ may be the same or may be different and each expresses an alkyl group which may have a substituent, or $R_{17}$ and $R_{18}$ may form an alicyclic hydrocarbon ring or a heterocyclic ring which may have a substituent by combination with the adjacent carbon atom, with the proviso that when $Q_2$ expresses a nitrogen atom, $R_{18}$ does not exist; $R_{19}$ expresses a hydrogen atom, an alkyl group which may have a substituent, an aralkyl group which may have a substituent; or an aryl group which may have a substituent; and $R_{20}$ expresses a halogen atom, an alkyl group which may have a substituent, an aralkyl group which may have a substituent, an aryl group which may have a substituent, a trifluoromethyl group, a nitro group, a cyano group, or an alkoxy group which may have a substituent; n stands for an integer of 0 to 4 with the proviso that when n stands for an integer of 2 to 4, $R_{20}$s may be the same or may be different from each other and any adjacent two $R_{20}$s by combination with the adjacent two carbon atoms may form an aromatic ring which may have a substituent.

37. The optical recording medium according to claim 33, wherein a refractive index (n) of a single layer of the recording layer is $1.5 \leq n \leq 3.0$ and an extinction coefficient (k) is $0.02 \leq k \leq 0.3$ against the light having a wavelength in the range of a recording or reproducing wavelength ±5 nm.

38. The optical recording medium according to claim 33, further comprising a reflective layer containing gold, silver, copper, or aluminum, or an alloy thereof.

39. The optical recording medium according to claim 33, wherein a track pitch on the substrate falls within a range of 0.7 to 0.8 μm, and a groove width at a half bandwidth falls within a range of 0.18 to 0.40 μm.

40. The optical recording medium according to claim 33, wherein the optical recoding medium is recordable at a wavelength of 600 to 720 nm.

41. An optical recording method comprising:
a step for exposing an optical recording medium to a light beam having a wavelength of 600 to 720 nm to carry out recording;
wherein the optical recording medium comprises a substrate and at least a recording layer disposed on the substrate, the recording layer comprising at least one squarylium metal chelate compound which comprises a squarylium compound and a metal and at least one azo metal chelate compound which comprises another metal and an azo compound expressed by the following formula (A-1):

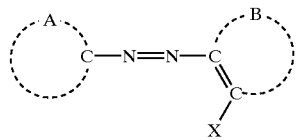

(A-I)

where, A and B each independently expresses a residue forming an aromatic ring which may have a substituent or a heterocyclic ring which may have a substituent, by combination with the carbon atoms to which A or B is bonded, and X expresses an active-hydrogen-containing substituent group.

42. The optical recording method according to claim 41, wherein the squarylium metal chelate compound is expressed by the following formula (A-II):

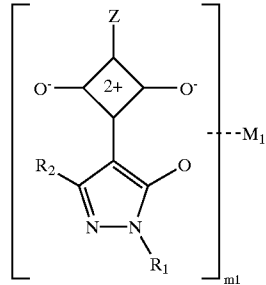

(A-II)

where, $R_1$ and $R_2$ are substituent groups which may be the same or may be different, and each expresses a hydrogen atom, an alkyl group which may have a substituent, an aralkyl group which may have a substituent, an aryl group which may have a substituent, or a heterocyclic group which may have a substituent; $M_1$ expresses a metal atom having a coordination capacity; Z expresses an aryl group which may have a substituent, a heterocyclic group which may have a substituent, or Y=CH— (Y expresses a heterocyclic group which may have a substituent); and m1 stands for an integer of 2 or 3.

43. An optical recording method comprising:
a step for exposing an optical recording medium to a light beam having a wavelength of 600 to 720 nm to carry out recording,
wherein the optical recording medium comprises a substrate and at least a recording layer disposed on the substrate, the recording layer comprises at least one squarylium metal chelate compound which comprises a squarylium compound and a metal and at least one azo metal chelate compound which comprises another metal an azo compound expressed by the following formula (B-I):

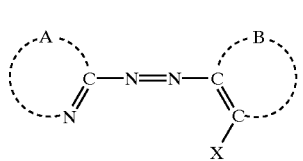

(B-I)

where A expresses a residue forming a heterocyclic ring which may have a substituent by combination with both the carbon atom and the nitrogen atom bonded to A, and B expresses a residue forming one of a) an aromatic ring which may have a substituent and b) a heterocyclic ring which may have a substituent, by combination with the two carbon atoms bonded to B, and X expresses an active-hydrogen-containing substituent group.

44. The optical recording method according to claim 43, wherein the squarylium metal chelate compound is expressed by the following formula (A-II):

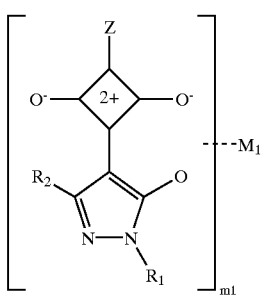

(A-II)

where, $R_1$ and $R_2$ are substituent groups which may be the same or may be different, and each expresses a hydrogen atom, an alkyl group which may have a substituent, an aralkyl group which may have a substituent, an aryl group which may have a substituent, or a heterocyclic group which may have a substituent; $M_1$ expresses a metal atom having a coordination capacity; Z expresses an aryl group which may have a substituent, a heterocyclic group which may have a substituent, or Y=CH— (Y expresses a heterocyclic group which may have a substituent); and m1 stands for an integer of 2 or 3.

45. An optical recording method comprising:

A step for exposing an optical recording medium to a light beam having a wavelength of 600 to 720 nm to carry out recording;

wherein the optical recording medium comprises a substrate and at least a recording layer disposed on the substrate, the recording layer containing at least one squarylium metal chelate compound which comprises a squarylium compound and a metal, and at least one formazan metal chelate compound which comprises another metal and at least one of a formazan compound expressed by one of the following formulae (C-I) and (C-II):

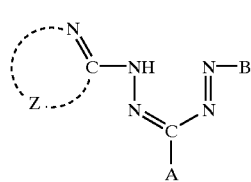

(C-I)

where, Z expresses a residue forming a 5-membered or 6-membered nitrogen-containing heterocyclic ring which may have a substituent by combination with both the carbon atom and the nitrogen atom bonded to Z, and may be condensed with another aromatic ring, A expresses a n alkyl group which may have a substituent, an aryl group which may have a substituent, an alkylcarbonyl group which may have a substituent, an arylcarbonyl group which may have a substituent, an alkenyl group which may have a substituent, a heterocyclic residue which may have a substituent, or an alkoxycarbonyl group which may have a substituent, and B expresses an alkyl group which may have a substituent, an alkenyl group which may have a substituent or an aryl group which may have a substituent;

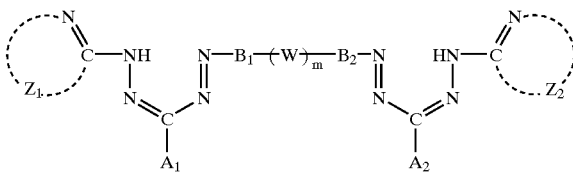

(C-II)

where, $Z_1$ and $Z_2$ each expresses a residue forming a 5-membered or 6-membered nitrogen-containing heterocyclic ring which may have a substituent by combination with both the carbon atom and the nitrogen atom bonded to $Z_1$ and $Z_2$, respectively, and may be condensed with another aromatic ring, $A_1$ and $A_2$ each independently expresses an alkyl group which may have a substituent, an aryl group which may have a substituent, an alkylcarbonyl group which may have a substituent, an arylcarbonyl group which may have a substituent, an alkenyl group which may have a substituent, a heterocyclic residue which may have a substituent, or an alkoxycarbonyl group which may have a substituent, $B_1$ and $B_2$ each independently expresses an alkylene group which may have a substituent or an arylene group which may have a substituent; W expresses —$CH_2$— or —$SO_2$—, and n stands for an integer of 0 or 1.

46. The optical recording method according to claim 45, wherein the squarylium metal chelate compound is expressed by the following formula (A-II):

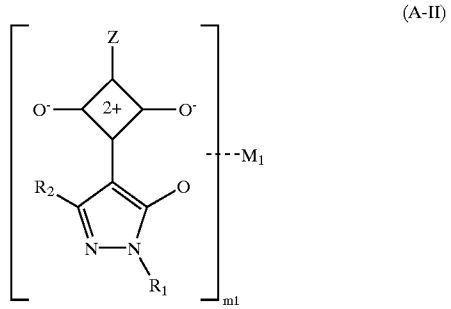

(A-II)

where, $R_1$ and $R_2$ are substituent groups which may be the same or may be different, and each expresses a hydrogen atom, an alkyl group which may have a substituent, an aralkyl group which may have a substituent, an aryl group which may have a substituent, or a heterocyclic group which may have a substituent; $M_1$ expresses a metal atom having a coordination capacity; Z expresses an aryl group which may have a substituent, a heterocyclic group which may have a substituent, or Y=CH— (Y expresses a heterocyclic group which may have a substituent); and m1 stands for an integer of 2 or 3.

47. An optical recording method comprising:
a step for exposing an optical recording medium to a light beam having a wavelength of 600 to 720 nm to carry out recording,
wherein the optical recording medium comprises a substrate and at least a recording layer disposed on the substrate, the recording layer containing at least one squarylium compound, and at least one formazan metal chelate compound which comprises a metal and at least one of a formazan compound expressed by one of the following formulae (D-I) and (D-II):

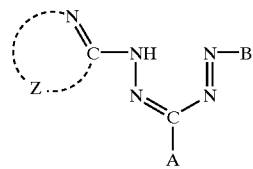

(D-I)

where, Z expresses a residue forming a 5-membered or 6-membered nitrogen-containing heterocyclic ring which may have a substituent by combination with both the carbon atom and the nitrogen atom bonded to Z, and may be condensed with another aromatic ring, A expresses an alkyl group which may have a substituent, an aryl group which may have a substituent, an alkylcarbonyl group which may have a substituent, an arylcarbonyl group which may have a substituent, an alkenyl group which may have a substituent, a heterocyclic residue which may have a substituent, or an alkoxycarbonyl group which may have a substituent, and B expresses an alkyl group which may have a substituent, or an aryl group which may have a substituent;

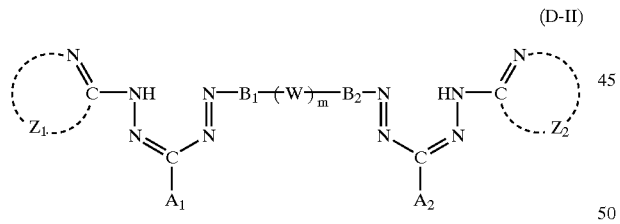

(D-II)

where, $Z_1$ and $Z_2$ each expresses a residue forming a 5-membered or 6-membered nitrogen-containing heterocyclic ring which may have a substituent by combination with both the carbon atom and the nitrogen atom bonded to $Z_1$ and $Z_2$, and may be condensed with another aromatic ring, $A_1$ and $A_2$ each independently expresses an alkyl group which may have a substituent, an aryl group which may have a substituent, an alkylcarbonyl group which may have a substituent, an arylcarbonyl group which may have a substituent, an alkenyl group which may have a substituent, a heterocyclic residue which may have a substituent, or an alkoxycarbonyl group which may have a substituent, $B_1$ and $B_2$ each independently expresses an alkylene group which may have a substituent or an arylene group which may have a substituent; W expresses —$CH_2$— or —$SO_2$—, and m stands for an integer of 0 or 1.

48. The optical recording method according to claim 47, wherein the squarylium compound is at least one of the compounds expressed by one of the following formulae (D-III) and (D-VI):

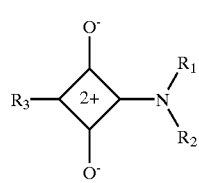

(D-III)

where, $R_1$ and $R_2$ may be the same or may be different, and each expresses a hydrogen atom, an alkyl group which may have a substituent, an aralkyl group which may have a substituent, an aryl group which may have a substituent, or a heterocyclic ring residue which may have a substituent, or $R_1$ and $R_2$ may form a heterocyclic ring which may have a substituent by combination with the adjacent nitrogen atom; and $R_3$ is a group expressed by one of the following formulae (D-IV) and (D-V):

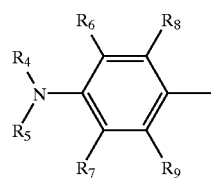

(D-IV)

where, $R_4$ and $R_5$ may be the same or may be different and each expresses a hydrogen atom or an alkyl group which may have a substituent, or $R_4$ and $R_5$ may form a heterocyclic ring which may have a substituent by combination with the adjacent nitrogen atom; and $R_6$, $R_7$, $R_8$ and $R_9$ may be the same or may be different and each expresses a hydrogen atom, an alkyl group which may have a substituent, an alkoxy group which may have a substituent, a hydroxyl group or a halogen atom, and a pair $R_4$ and $R_6$ or a pair $R_5$ and $R_7$ may form a nitrogen-containing heterocyclic ring by combination with the adjacent N—C—C, which may have a substituent:

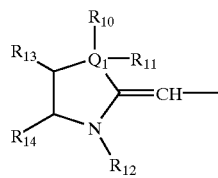

(D-V)

where, $Q_1$ expresses a carbon atom or a nitrogen atom, $R_{10}$ and $R_{11}$ may be the same or may be different and each expresses a hydrogen atom an alkyl group which may have a substituent, an aryl group which may have a substituent, an aralkyl group which may have a substituent or a hydroxyl group, with the proviso that when $Q_1$ expresses a nitrogen atom, $R_{11}$ does not exist; $R_{12}$ expresses a hydrogen atom, an alkyl group which may have a substituent, an aryl group which may have a substituent or an aralkyl group which may have a substituent; $R_{13}$ and $R_{14}$ may be the same or may be different and each expresses a hydrogen atom, an alkyl group which may have a substituent, an alkoxy group which may have a substituent or a halogen atom, or $R_{13}$ and $R_{14}$ may form an alicyclic hydrocarbon ring, an aromatic ring which may have a substituent, or a heterocyclic ring which may have a substituent by combination with the adjacent two carbon atoms;

(D-VI)

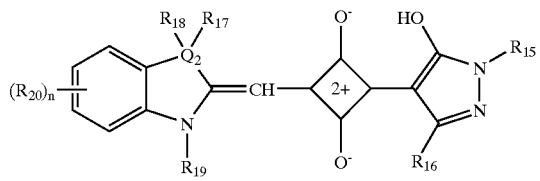

where, $Q_2$ expresses a carbon atom or a nitrogen atom; $R_{15}$ expresses a hydrogen atom, an alkyl group which may have a substituent, an aryl group which may have a substituent or a heterocyclic group which may have a substituent; $R_{16}$ expresses a hydrogen atom, a halogen atom, an alkyl group which may have a substituent, an alkoxy group which may have a substituent, an aralkyl group which may have a substituent, an aryl group which may have a substituent, an amino group which may have a substituent or a heterocyclic group which may have a substituent; $R_{17}$ and $R_{18}$ may be the same or may be different and each expresses an alkyl group which may have a substituent, or $R_{17}$ and $R_{18}$ may form an alicyclic hydrocarbon ring or a heterocyclic ring which may have a substituent by combination with the adjacent carbon atom, with the proviso that when $Q_2$ expresses a nitrogen atom, $R_{18}$ does not exist; $R_{19}$ expresses a hydrogen atom, an alkyl group which may have a substituent, an aralkyl group which may have a substituent; or an aryl group which may have a substituent; and $R_{20}$ expresses a halogen atom, an alkyl group which may have a substituent, an aralkyl group which may have a substituent, an aryl group which may have a substituent, a trifluoromethyl group, a nitro group, a cyano group, or an alkoxy group which may have a substituent; n stands for an integer of 0 to 4 with the proviso that when n stands for an integer of 2 to 4, $R_{20}$s may be the same or may be different from each other and any adjacent two $R_{20}$s by combination with the adjacent two carbon atoms may form an aromatic ring which may have a substituent.

49. An optical recording device comprising an optical recording medium, wherein the optical recording medium comprises at least a recording layer disposed on the substrate, the recording layer containing at least one squarylium metal chelate compound which comprises a squarylium compound and a metal and at least one azo metal chelate compound which comprises another metal and an azo compound expressed by the following formula (A-I):

(A-I)

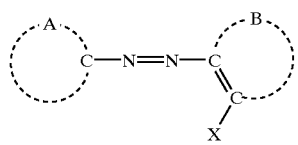

where, A and B each independently expresses a residue which by combination with the carbon atom to which A or B is bonded form an aromatic ring which may have a substituent or a heterocyclic ring which may have a substituent, and X expresses an active-hydrogen-containing substituent group.

50. An optical recording device comprising an optical recording medium, wherein the optical recording medium comprises a substrate and at least a recording layer disposed on the substrate, the recording layer containing at least one squarylium metal chelate compound which comprises a squarylium compound and a metal and at least one azo metal chelate compound which comprises another metal an azo compound expressed by the following formula (B-I):

(B-I)

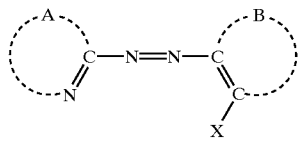

where, A expresses a residue which by combination with the carbon atom and nitrogen atom to which A is bonded to form a heterocyclic ring which may have a substituent, B expresses a residue which by combination with the two carbon atoms bonded to B form an aromatic ring which may have a substituent or a heterocyclic ring which may have a substituent, and X expresses an active-hydrogen-containing substituent group.

51. An optical recording device comprising an optical recording medium, wherein the optical recording medium comprises a substrate and at least a recording layer disposed on the substrate, the recording layer containing at least one squarylium metal chelate compound which comprises a squarylium compound and a metal, and at least one formazan metal chelate compound which comprises another metal and at least one of a formazan compound expressed by one of the following formulae (C-I) and (C-II):

(C-I)

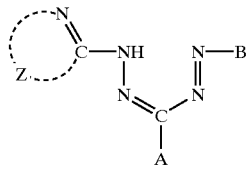

where, Z expresses a residue forming a 5-membered or 6-membered nitrogen-containing heterocyclic ring which may have a substituent by combination with the carbon atom and the nitrogen atom bonded to Z, and may be condensed with another aromatic ring, A expresses a n alkyl group which may have a substituent, an aryl group which may have a substituent, an alkylcarbonyl group which may have a substituent, an arylcarbonyl group which may have a substituent, an alkenyl group which may have a substituent, a heterocyclic residue which may have a substituent, or an alkoxycarbonyl group which may have a substituent, and B expresses an alkyl group which may have a substituent, an alkenyl group which may have a substituent or an aryl group which may have a substituent:

(C-II)

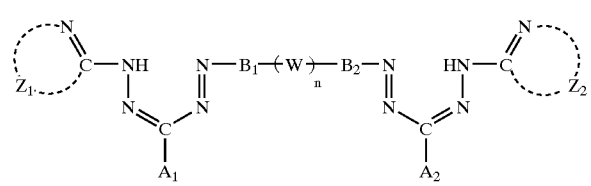

where, $Z_1$ and $Z_2$ each expresses a residue forming a 5-membered or 6-membered nitrogen-containing heterocyclic ring which may have a substituent by combination with the carbon atom and the nitrogen atom bonded to $Z_1$ and $Z_2$, respectively, and may be condensed with another aromatic ring, $A_1$ and $A_2$ each independently expresses an alkyl group which may have a substituent, an aryl group which may have a substituent, an alkylcarbonyl group which may have a substituent, an arylcarbonyl group which may have a substituent, an alkenyl group which may have a substituent, a heterocyclic residue which may have a substituent, or an alkoxycarbonyl group which may have a substituent, $B_1$ and $B_2$ each independently expresses an alkylene group which may have a substituent or an arylene group which may have a substituent; W expresses —$CH_2$— or —$SO_2$—, and n stands for an integer of 0 or 1.

52. An optical recording device comprising an optical recording medium, wherein the optical recording medium comprises a substrate and at least a recording layer disposed on the substrate, the recording layer containing at least one squarylium compound, and at least one formazan metal chelate compound which comprises a metal and at least one of a formazan compound expressed by one of the following formulae (D-I) and (D-II):

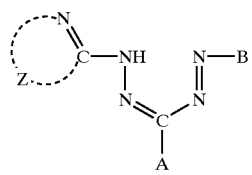

(D-I)

where, Z expresses a residue forming a 5-membered or 6-membered nitrogen-containing heterocyclic ring which may have a substituent by combination with the carbon atom and the nitrogen atom bonded to Z, and may be condensed with another aromatic ring, A expresses an alkyl group which may have a substituent, an aryl group which may have a substituent, an alkylcarbonyl group which may have a substituent, an arylcarbonyl group which may have a substituent, an alkenyl group which may have a substituent, a heterocyclic residue which may have a substituent, or an alkoxycarbonyl group which may have a substituent, and B expresses an alkyl group which may have a substituent, or an aryl group which may have a substituent;

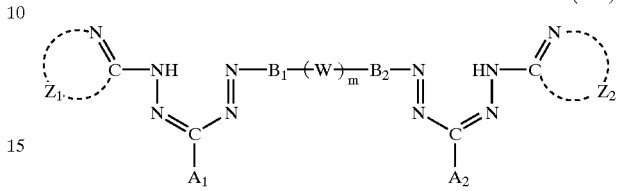

(D-II)

where, $Z_1$ and $Z_2$ each expresses a residue forming a 5-membered or 6-membered nitrogen-containing heterocyclic ring which may have a substituent by combination with the carbon atom and the nitrogen atom bonded to $Z_1$ and $Z_2$, respectively, and may be condensed with another aromatic ring, $A_1$ and $A_2$ each independently expresses an alkyl group which may have a substituent, an aryl group which may have a substituent, an alkylcarbonyl group which may have a substituent, an arylcarbonyl group which may have a substituent, an alkenyl group which may have a substituent, a heterocyclic residue which may have a substituent, or an alkoxycarbonyl group which may have a substituent, $B_1$ and $B_2$ each independently expresses an alkylene group which may have a substituent or an arylene group which may have a substituent; W expresses —$CH_2$— or —$SO_2$—, and m stands for an integer of 0 or 1.

* * * * *

UNITED STATES PATENT AND TRADEMARK OFFICE
CERTIFICATE OF CORRECTION

| | |
|---|---|
| PATENT NO. | : 6,737,143 B2 |
| APPLICATION NO. | : 10/166742 |
| DATED | : May 18, 2004 |
| INVENTOR(S) | : Soh Noguchi et al. |

It is certified that error appears in the above-identified patent and that said Letters Patent is hereby corrected as shown below:

Replace the Assignee section on the cover page of the patent, with the following:

-- (73) Assignee: Ricoh Company, Ltd., Tokyo (JP) ; Kyowa Hakko Kogyo Co., Ltd., Tokyo (JP) ; Kyowa Yuka Co., Ltd., Tokyo (JP) . --

Signed and Sealed this

Fifth Day of December, 2006

JON W. DUDAS
*Director of the United States Patent and Trademark Office*